US010255751B2

(12) United States Patent
Boese et al.

(10) Patent No.: US 10,255,751 B2
(45) **Date of Patent: *Apr. 9, 2019**

(54) ELECTRONIC GAMING DEVICE WITH BONUS GAME EXTENDED REEL FUNCTIONALITY

(71) Applicant: AGS LLC, Las Vegas, NV (US)

(72) Inventors: Eric Steven Boese, Decatur, GA (US); Jason Prometheus Pawloski, Atlanta, GA (US); Bradley Donald Schultz, Suwanee, GA (US); Keith James Menchin, Atlanta, GA (US)

(73) Assignee: AGS LLC, Las Vegas, NV (US)

( * ) Notice: Subject to any disclaimer, the term of this patent is extended or adjusted under 35 U.S.C. 154(b) by 571 days.

This patent is subject to a terminal disclaimer.

(21) Appl. No.: 14/836,838

(22) Filed: Aug. 26, 2015

(65) Prior Publication Data

US 2017/0024957 A1 Jan. 26, 2017

Related U.S. Application Data

(63) Continuation-in-part of application No. 14/807,962, filed on Jul. 24, 2015, now Pat. No. 9,805,541.

(51) Int. Cl.

*A63F 9/24* (2006.01)
*A63F 13/00* (2014.01)
(Continued)

(52) U.S. Cl.

CPC ............ *G07F 17/3213* (2013.01); *A63F 9/24* (2013.01); *A63F 2009/2457* (2013.01)

(58) Field of Classification Search

USPC .................................... 463/1, 20, 22, 25, 30
See application file for complete search history.

(56) References Cited

U.S. PATENT DOCUMENTS 5,890,962 A 4/1999 Takemoto
6,544,120 B2 4/2003 Ainsworth
(Continued)

FOREIGN PATENT DOCUMENTS

AU 2007202050 8/2007
AU 2007201998 11/2007
(Continued)

OTHER PUBLICATIONS

Aristocrat, video of Aristocrat "Buffalo Starnpede" game, https://www.youtube.com/watch?v=C-P0WkDbr8Y, Jul. 12, 2013, 1 page.
(Continued)

*Primary Examiner* — Adetokunbo O Torimiro
(74) *Attorney, Agent, or Firm* — Weide & Miller, Ltd.

(57) ABSTRACT

Examples disclosed herein relate to a gaming device including a memory, a processor, a plurality of reels, and a display. The display includes active areas and inactive areas where the active areas are utilized for payout determinations and bonus game initiation determinations and where the inactive areas are not utilized for payout determinations and bonus game initiation determinations. The processor may initiate a base game play, a bonus game, and a secondary base game. The base game play may include a spin to display at least a portion of the plurality of reels in the base reel active areas and expanded reel active areas. The processor may initiate a bonus game utilizing the base reel active areas and the expanded reel active area.

16 Claims, 75 Drawing Sheets

(51) Int. Cl.

| | |
|---|---|
| ***G06F 17/00*** | (2006.01) |
| ***G06F 19/00*** | (2018.01) |
| ***G07F 17/32*** | (2006.01) |

(56) References Cited

U.S. PATENT DOCUMENTS

| | | | | |
|---|---|---|---|---|
| 7,601,062 | B2 | 10/2009 | Cole et al. | |
| 7,654,895 | B2 | 2/2010 | Pacey | |
| 8,246,442 | B1 | 8/2012 | Barrie | |
| 8,512,124 | B2 | 8/2013 | Bramble et al. | |
| 8,602,868 | B2 | 12/2013 | Johnson et al. | |
| 8,795,059 | B2 | 8/2014 | Aoki et al. | |
| 2005/0159208 | A1 | 7/2005 | Pacey | |
| 2006/0063588 | A1 | 3/2006 | Poole | |
| 2006/0247002 | A1 | 11/2006 | Yoshimi et al. | |
| 2007/0060255 | A1 | 3/2007 | Bearlocher et al. | |
| 2007/0281784 | A1 | 12/2007 | Seelig | |
| 2008/0108408 | A1 | 5/2008 | Wolf | |
| 2009/0156287 | A1 | 6/2009 | Baumgartner | |
| 2010/0113133 | A1 | 5/2010 | Leupp | |
| 2010/0203948 | A1 | 8/2010 | Falciglia, Sr. | |
| 2011/0244943 | A1 | 10/2011 | Milford et al. | |
| 2012/0015707 | A1 | 1/2012 | Hornik et al. | |
| 2012/0077564 | A1 | 3/2012 | Collette et al. | |
| 2012/0094738 | A1 | 4/2012 | Aoki et al. | |
| 2013/0065663 | A1* | 3/2013 | Johnson | G07F 17/3213 463/20 |
| 2013/0102375 | A1* | 4/2013 | Aoki | G07F 17/32 463/20 |
| 2013/0260861 | A1 | 10/2013 | Vann et al. | |
| 2015/0206386 | A1 | 7/2015 | Jaffe et al. | |
| 2015/0379831 | A1 | 12/2015 | Lee | |
| 2016/0042597 | A1 | 2/2016 | Olive | |
| 2016/0155303 | A1 | 6/2016 | Aoki et al. | |

FOREIGN PATENT DOCUMENTS

| | | |
|---|---|---|
| AU | 2007202816 | 2/2008 |
| AU | 2008203119 | 3/2009 |
| AU | 2008246265 | 6/2009 |
| AU | 2009201685 | 11/2009 |
| AU | 2009202582 | 1/2010 |
| AU | 2009230736 | 5/2010 |
| AU | 2011200159 | 2/2011 |
| AU | 2011265432 | 1/2012 |
| AU | 2011265544 | 2/2012 |
| AU | 2013200813 | 2/2012 |
| GB | 2353128 | 2/2001 |

OTHER PUBLICATIONS

Random $$ Slots, video of Multi Media Games “Thundering Herd” game, https://www.youtube.com/watch?v=_s1EPR93y9U, Sep. 5, 2015, 1 page.

* cited by examiner

ELECTRONIC GAMING DEVICE WITH BONUS GAME EXTENDED REEL FUNCTIONALITY

CROSS-REFERENCE TO RELATED PATENT APPLICATION

This application claims priority to and is a continuation in part of U.S. patent application Ser. No. 14/807,962 entitled "ELECTRONIC GAMING DEVICE WITH SECOND CHANCE FUNCTIONALITY", filed on Jul. 24, 2015, which is incorporated herein by reference in its entirety.

FIELD

The subject matter disclosed herein relates to an electronic gaming device. More specifically, the disclosure relates to providing one or more second chance and/or bonus game extended reel functionalities on a gaming device.

INFORMATION

The gaming industry has numerous casinos located both worldwide and in the United States. Further, numerous gaming entities have one or more online (e.g., non-physical) locations on the internet and/or on the worldwide web and/or on mobile gaming applications (e.g., hand held computers, notebook, etc.). A client of a casino or other gaming entity can gamble via various games of chance. For example, craps, roulette, baccarat, blackjack, and electronic games (e.g., a slot machine, online games of chances, online slot machines, etc.) are games of chance where a person may gamble on an outcome.

Paylines of an electronic gaming device (e.g., a slot machine, online games of chances, online slot machines, etc.) are one way utilized to determine when predetermined winning symbol combinations are aligned in a predetermined pattern to form a winning combination. A winning event occurs when the player successfully matches the predetermined winning symbols in one of the predetermined patterns. A bonus game may be triggered when a predetermined number of predetermined symbols are displayed (and/or any other triggering event). Further, the bonus game may have extended reels where the extended reels where utilized in a secondary base game.

A player's entertainment while playing one or more games may be enhanced by utilizing one or more second chance functionalities on the gaming device. By increasing the player's entertainment level, the player's enjoyment of the game may be enhanced, which may increase a player's game playing period.

A player may play a non-second chance game which includes both a base game and a bonus game. The base game is the first game play action which normally includes a first spinning of one or more reels and is based on a first wager. Whereas, a bonus game may be triggered (e.g., by obtaining the requirements of the bonus game triggering event—number of symbols, etc.) during the base game. There is no additional wager required for the initiation of the bonus game and when the bonus game includes free spins the one or more reels are respun for each free spin. In addition, the bonus game utilizes the same active areas as the base game. In another example, the bonus game may utilize the same active areas utilized in a secondary base game. Further, free spins may respin the one or more reels in their entirety. Further, a secondary base game (e.g., a second chance mode) may reveal one or more additional non-active reel areas after the completion of the first spin in the base game play mode to allow these non-active reel areas to become active and potentially generate one or more payouts and/or one or more bonus game initiating events. In addition, these newly active reel areas utilized for the secondary base game may be carried over (utilized) during the bonus game play.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
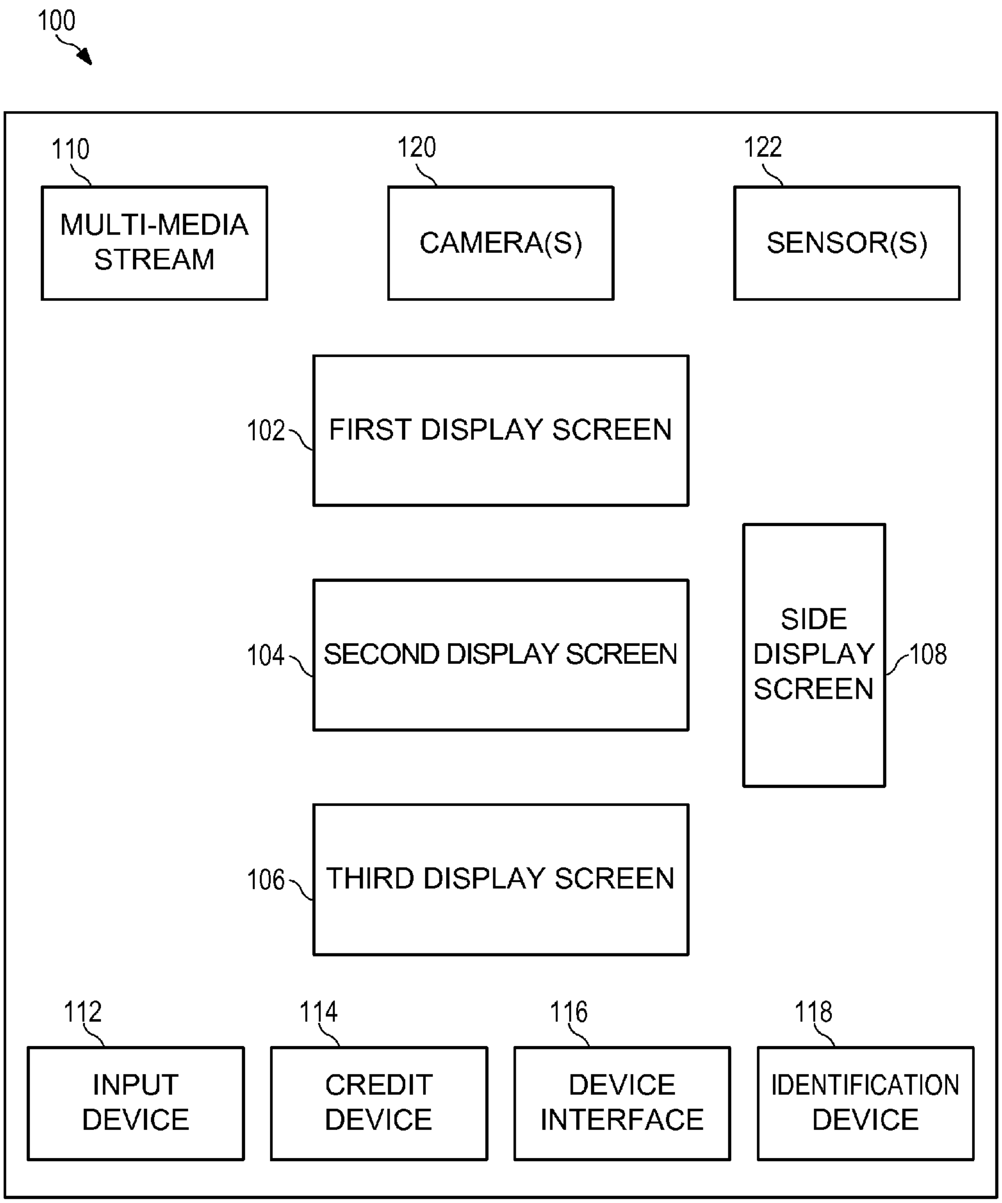
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for a casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to select one or more second chance base gaming options, to make a wager, to make a second chance base game wager, to control any object, to select one or more pattern gaming options, to obtain data relating to historical payouts, to select a row and/or column to move, to select a row area to move, to select a column area to move, to select a symbol (or image) to move, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), and/or any combination thereof. These selections may occur via any other input device (e.g., a touch screen, voice commands, etc.). Input device 112 may be any control panel. A secondary base game (e.g., a second chance mode) may reveal one or more additional non-active reel areas after the completion of the first spin in base game play mode to allow these non-active reel areas to become active and generate one or more payouts and/or one or more bonus game initiating events.

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more game functionalities (e.g., game type 1, game type 2, game type 3, etc.) may be presented, a second chance base gaming option may be presented, a repeat payline gaming option may be presented, a pattern gaming option may be presented, historical gaming data may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, the player may only want to play games that include second chance base gaming options only. Therefore, only games which include second chance base gaming options would be presented to the player. In another example, the player may only want to play games that include historical information relating to game play. Therefore, only games which include historical gaming data would be presented to the player. These examples may be combined.

Identification device 118 may utilize biometrics (e.g., thumb print, retinal scan, or other biometric). Identification device 118 may include a card entry slot utilized with input device 112. Identification device 118 may include a keypad with an assigned pin number for verification. Identification device 118 may include multiple layers of identification for added security. For example, a player could be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games (e.g., base game, secondary base game) and/or bonus games (e.g., free spins of base game), to display one or more warnings relating to one or more audio devices, one or more display devices, one or more electrical wires, one or more springs, one or more motors, one or more adjustable devices, and/or one or more sensors, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

For example, a single large image could be partially displayed on second display screen 104 and partially displayed on third display screen 106, so that when both display screens are put together they complete one image. Electronic gaming device 100 may stream or play prerecorded multimedia data, which may be displayed on any display combination.

One or more cameras 120 and/or one or more sensors 122 may be utilized as one or more depth image sensing devices, which may be located in various locations, including but not limited to, above the base display, above second display, in one or more locations on gaming cabinet front, on a side of the gaming cabinet other than gaming cabinet front, and/or any other location.

In one embodiment, electronic gaming device 100 may not include separate one or more input devices, but instead may only utilize one or more depth image sensing devices. In another embodiment, a player may utilize one or more input devices and/or may utilize gestures that electronic gaming device 100, via one or more depth image sensing devices, recognizes in order to make inputs for a play of a game. A player may interact with electronic gaming device 100 via one or more depth image sensing devices for a plurality of various player inputs.

In one embodiment, one or more depth image sensing devices may include at least two similar devices. For example, each of the at least two similar devices may independently sense depth and/or image of a scene. In another example, such similar depth image sensing devices may then communicate information to one or more processors, which may utilize the information from each of the similar depth image sensing devices to determine the relative depth of an image from a captured scene.

In another embodiment, one or more depth image sensing devices may include at least two different devices. For example, and discussed in more detail below, one of the at least two different devices may be an active device and/or one of the at least two different devices may be a passive device. In one example, such an active device may generate a wave of measurable energy (e.g., light, radio, etc.). In another example, such a passive device may be able to detect reflected waves generated by such an active device. In another example, such an active device and such a passive device may each communicate data related to their respective activity to a processor, and such processor may translate such data in order to determine the depth and/or image of a scene occurring near electronic gaming device 100.

Electronic gaming device 100 may include at least one display device. Electronic gaming device 100 may include a base display and/or a second display. In one embodiment, base display may be the primary display for a first game and/or one or more second chance games. In another embodiment, second display may be the primary display for a second bonus game and/or one or more second chance base games. For example, base display may display: a reel-type video slot game; and upon a secondary base game triggering condition; second display may display a secondary base game; and/or upon a second chance game feature triggering event; first and/or second display (and/or Nth displays) may display a second chance game feature. In various examples, a reserving an electronic gaming device function may be initiated and/or displayed on a first screen, a second screen, an Nth screen, and/or any combination thereof. In one example, the reserved game play function for a first player may be initiated, displayed, and played on a first screen of the electronic gaming device while a normal game play function for a second player may be initiated, displayed, and played on a second screen of the electronic gaming device. The reserving function may be an automated game play where the player can play the electronic gaming device automatically and/or remotely. Further, the reserving function may be where a player holds an electronic gaming device for a specific period of time until they are able to start playing the electronic gaming device. For example, a player wants to play game X but has to go to the bathroom first. Therefore, the player reserves game X for 5 minutes (and/or any other amount of time).

In one embodiment, base display and second display may display separate portions of a common image. For example, second display may display a top portion of a wheel spinning while base display may display the bottom portion of the same wheel spinning.

Electronic gaming device 100 may also include one or more speakers. In one embodiment, one or more speakers may work in a synchronized manner to provide a surround sound effect. For example, as an object is displayed moving across the base display from left to right, one or more speakers may produce sound in such a manner as to create an audible sense of similar left to right movement. In another embodiment, one or more speakers may work asynchronously. In a further embodiment, a first speaker may produce sounds associated with a first symbol appearing in a play of a game, and a second speaker may produce sounds associated with a second symbol appearing in a play of the game.

Figure 2:
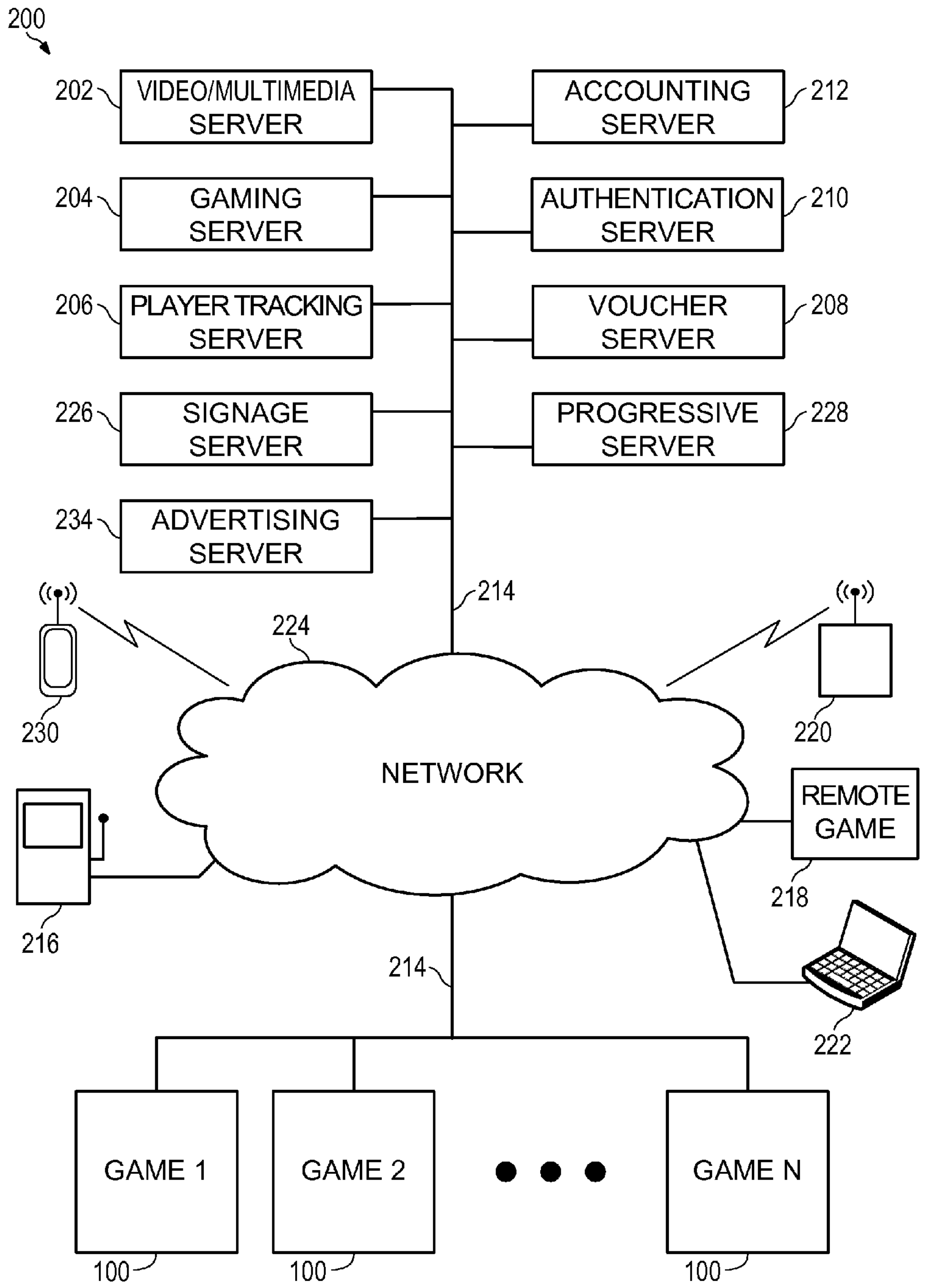
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, an accounting server 212, a signage server 226 a progressive server 228, and an advertising server 234.

Electronic gaming system 200 may include video/multimedia server 202, which may be coupled to network 224 via a network link 214. Network 224 may be the Internet, a private network, and/or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities (including second chance wagers) to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes. Gaming server 204 may provide one or more of: a second chance game feature functionality; a second chance game feature evaluation functionality; a payout functionality; a base and/or bonus game play functionality; a base game evaluation functionality, a secondary base game evaluation functionality, and/or bonus game play evaluation functionality, other game functionality, and/or any other virtual game functionality. There are at least three types of game play in this disclosure which are a base game play, a secondary base game play, and a bonus game play. A player may play a non-second chance game which includes both a base game and a bonus game but does not include a secondary base game. The base game is the first game play action which normally includes a first spinning of one or more reels and is based on a first wager. Whereas, a bonus game may be triggered (e.g., by obtaining the requirements of the bonus game—# of symbols, etc.) during the base game. There is no additional wager required for the initiation of the bonus game and when the bonus game includes free spins the one or more reels are respun for each free spin. Further, free spins may respin the one or more reels in their entirety. In another example, the system, device, and/or method may include a base game, a bonus game, and a secondary base game. The secondary base game (e.g., a second chance mode) may reveal one or more additional non-active reel areas after the completion of the first spin in base game play mode to allow these non-active reel areas to become active and generate one or more payouts and/or one or more bonus game initiating events. Therefore, in one example, a base game play is the first game play which requires a wager by the player to initiate base game play. In this example, a secondary base game play may be initiated when the base game play does not initiate one or more bonus games. In this example, the secondary base game play allows the base game to continue and provides an additional opportunity for the base game to activate one or more payouts and/or one or more bonus games. Further, in this example, a bonus game play may initiate a new base game (e.g., spin) without the required wager and/or provide a chance to obtain a prize without any required wager.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include second chance wagering data and/or payline structure option selections. In addition, the voucher may include game play data (or similar game play data), repeat payline data, pattern data, historical payout data, column data, row data, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, second chance wagering data, and/or other transaction data. Transaction data may include the number of wagers, the size of these wagers, the date and time for these wagers, the identity of the players making these wagers, the frequency of the wagers, and/or verification data, and/or confirmation data. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components, such as network interface cards, repeaters and hubs, bridges, switches, routers, firewalls, or any combination thereof may also be part of network 224.

A statistics server 226 may be used to maintain data relating to historical game play and/or second chance wagering data for one or more electronic gaming devices 100 and/or other events. This historical data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Searching server may implement a search on one or more gaming devices to obtain gaming data. Searching server may implement a messaging function, which may transmit a message to a third party (e.g., a player) relating to a search, a search status update, a game status update, a wager status update, a confirmation of a wager, a confirmation of a money transfer, and/or any other data relating to the player's account. The message can take the form of a text display on the gaming device, a pop up window, a text message, an email, a voice message, a video message and the like. Searching server may implement a wagering function, which may be an automatic wagering mechanism. These functions of searching server may be integrated into one or more servers.

Searching server may include one or more searching structures, one or more searching algorithms, and/or any other searching mechanisms. In general, the search structures may cover which EGMs paid out the most money during a time period, which EGMs kept the most money from players during a time period, which EGMs are the most popular (e.g., top games), which EGMs are the least popular, which EGMs have the most amount of money bet during a period, which EGMs have the highest bet volume, which EGMs are more volatile (e.g., volatility, or deviation from the statistical norms of bet volume, bet amount, pay out, etc.) during a time period, and the like. These searches may also be associated with location queries, time queries, and/or people queries (e.g., where are the electronic gaming machines that allow persistent game play options and/or allow secondary base game play mode, where are the table games that most of my friends bet on, where are my favorite EGMs, what are players betting on the most today, when are most bets placed, etc.).

The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, all) of the devices. In another example, the search may be based on a predetermined number of devices to be searched in combination with a predetermined number of search results to be obtained. In this example, the search structure may be a minimum of ten devices to be searched, along with a minimum of five gaming options to be determined.

In another example, the searching structures may be based on one or more specific games (e.g., a first EGM type, a second EGM type, etc.). Searching structure may search one or more of these games. In one example, a player may utilize a searching function to find one or more games that allow second chance function options and/or persistent game play options and/or to find one or more specific game types (e.g., game theme 1). The player may utilize the search feature to reload their persistent game configuration data and/or to restart a specific game type game play.

In another example, the searching structure may be based on a player's preferences, past transactional history, player input, a particular EGM, a particular casino, a particular location within a casino, game outcomes over a time period, payout over a time period, and/or any other criteria.

Figure 3:
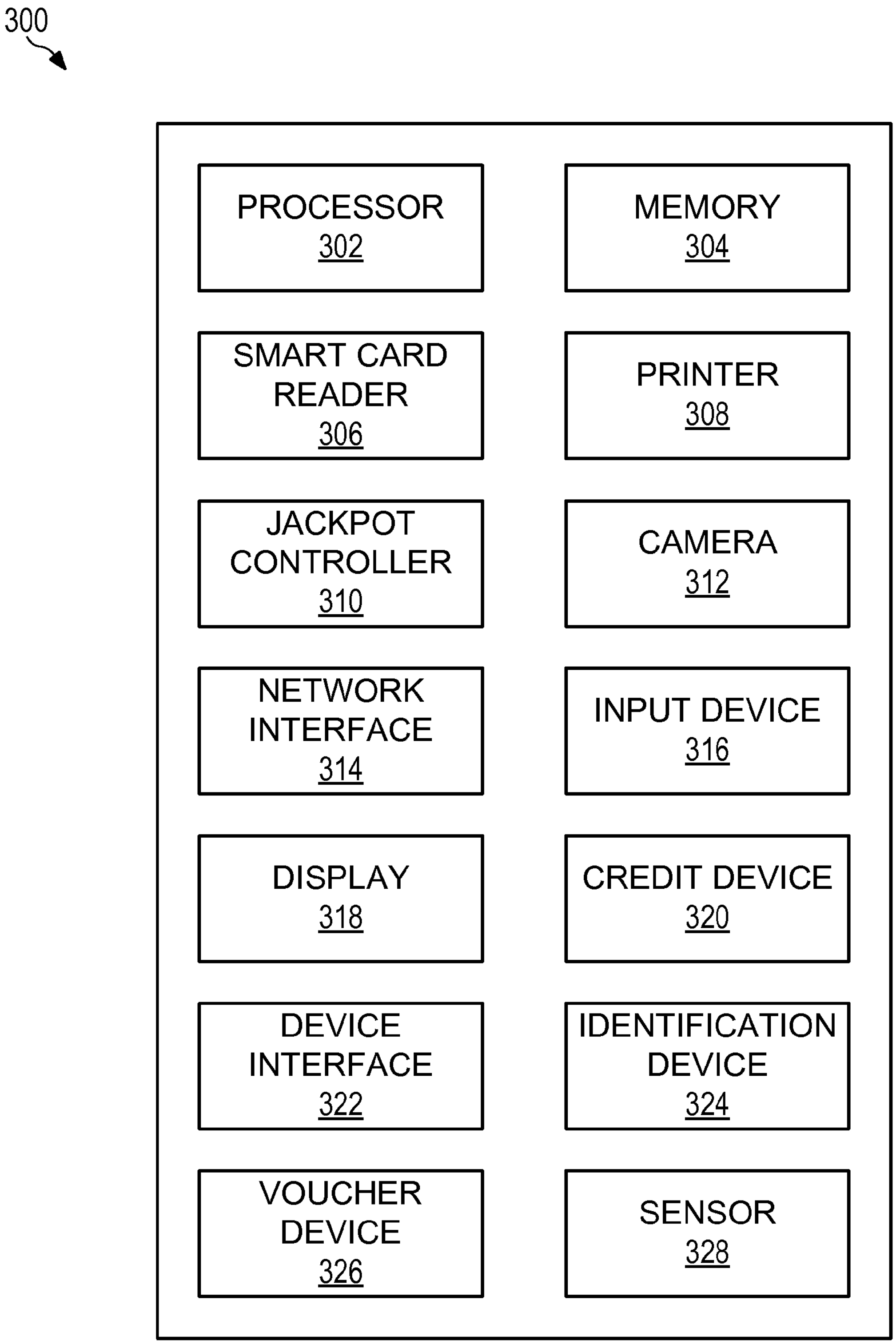
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, a voucher device 326, and/or a sensor 328.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher and/or a persistent game play receipt (and/or any other form). Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., and/or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, persistent game play data receipts, second chance wager payouts, second chance wagering vouchers, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine his or her picture may be taken to include his or her image into the game play. A picture of a player may be an actual image as taken by camera 312. A picture of a player may be a computerized caricature (i.e., avatar) of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes and/or a validating procedure (e.g., persistent gaming receipt validation, etc.). For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, and/or accounting server 212, and/or any other second chance wagering related server (e.g., server to confirm another event (e.g., a horse race, football game, etc.)).

Input device 316 may be mechanical buttons, electronic buttons, a touch screen, and/or any combination thereof. Input device 316 may be utilized to make a wager, to make a second chance wager, to select one or more game elements, to select one or more gaming options, to make an offer to buy or sell a voucher, to determine a voucher's worth, to cash in a voucher, to modify electronic gaming device 100 (e.g., change sound level, configuration, font, language, etc.), to modify one of one or more audio devices, one or more display devices, one or more electrical wires, one or more springs, one or more motors, one or more adjustable devices, and/or one or more sensors, to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with his or her mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

Sensor 328 may be one or more sensors which may be utilized to obtain data from around the gaming device, one or more player inputs, and/or utilized for security and/or maintenance purposes.

Figure 4:
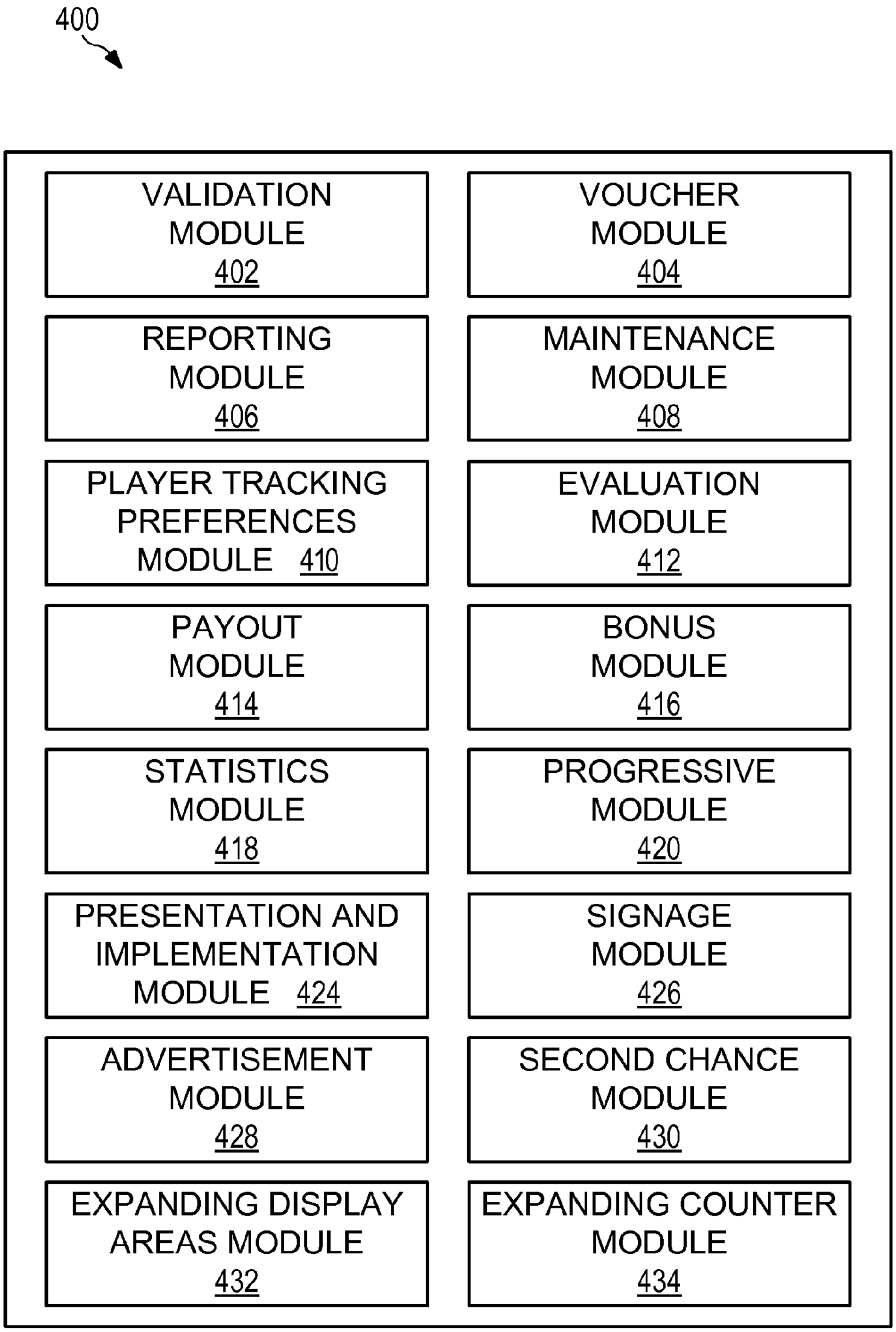
FIG. 4 is another block diagram of the electronic gaming device, according to one embodiment.

FIG. 4 shows a block diagram of memory 400, which includes various modules. Memory 400 may include a validation module 402, a voucher module 404, a reporting module 406, a maintenance module 408, a player tracking preferences module 410, an animation module, a game evaluation module 412 (e.g., base game, secondary base game, and/or bonus game), a payout module 414, a sensor module, a scene module, a sensor and scene evaluation module, a sensor and scene output module, a reference models module, an audio module, an audio device adjustment module, a display device adjustment module, a bonus module 416, a statistics module 418, a progressive module 420, a persistence game module, a presentation and implementation module 424, a tracking module, a signage module 426, an advertisement module 428, a subscription-based progressive module, a 3D gesturing module, a pseudo module, a skill-based module, a scatter module, a wild module, a mobile device module, a game configuration module, a second chance module 430 (e.g., secondary base game), an expanding display areas module 432, and/or an expanding counter module 434.

Validation module 402 may utilize data received from voucher device 326 to confirm the validity of the voucher and/or a persistent gaming data (e.g., a persistent gaming receipt validation procedure).

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Animation module may generate, compile, transmit, and/or store one or more animations and/or presentations based on one or more scene data, one or more scenes, one or more reference models, one or more game play data, one or more player profiles, and/or any combination thereof.

Game evaluation module 412 may evaluate one or more outcomes for one or more events relating to game play.

Payout module 414 may determine one or more payouts which may relate to one or more inputs received from the player, electronic gaming device 100, and/or electronic gaming system 200.

Sensor module may generate, compile, transmit, and/or store any data relating to one or more scene data, one or more scene, and/or any other sensor data. This data may include one or more gestures (e.g., body movement made by one or more players).

Scene module may generate, compile, transmit, and/or store on one or more scene data, one or more scenes, one or more reference models, one or more game play data, one or more player profiles, and/or any combination thereof.

Sensor and scene evaluation module may evaluate any data stored on, transmitted to, and/or transmitted from sensor module and scene module. Sensor and scene evaluation module may obtain data including one or more gestures (e.g., body movement made by one or more players) from sensor module and compare this data to one or more body reference models, body part reference models, device reference models, gaming device reference models, floor plan reference models, and/or any other reference models from reference models module to determine one or more actions.

Sensor and scene output module may evaluate the combined output of sensor module and scene module.

Reference models module may generate, compile, transmit, and/or store one or more body reference models, body part reference models, device reference models, gaming device reference models, floor plan reference models, and/or any other reference models which can be utilized by any of the other modules.

Audio module may generate, compile, transmit, and/or store one or more audio structures, sound wave configurations, and/or any other audio data.

Audio device adjustment module may adjust one or more audio devices. These devices may be adjusted physically (e.g., moved) and/or by changing one or more device characteristics.

Display device adjustment module may adjust one or more display devices. These devices may be adjusted physically (e.g., moved) and/or by changing one or more device characteristics.

Bonus module 416 may generate a bonus game, evaluate the results of the bonus game, trigger bonus game presentations, generate bonus game payouts, and/or display any data relating to the bonus game. A player may play a non-second chance game which includes both a base game and a bonus game but does not include a secondary base game. The base game is the first game play action which normally includes a first spinning of one or more reels and is based on a first wager. Whereas, a bonus game may be triggered (e.g., by obtaining the requirements of the bonus game—# of symbols, etc.) during the base game. There is no additional wager required for the initiation of the bonus game and when the bonus game includes free spins the one or more reels are respun for each free spin. Further, free spins may respin the one or more reels in their entirety. In another embodiment, a secondary base game (e.g., a second chance mode) may reveal one or more additional non-active reel areas after the completion of the first spin in base game play mode to allow these non-active reel areas to become active and generate one or more payouts and/or one or more bonus game initiating events. Therefore, in one example, a base game play is the first game play which requires a wager by the player to initiate base game play. In this example, a secondary base game play may be initiated when the base game play does not initiate one or more bonus games. In this example, the secondary base game play allows the base game to continue and provides an additional opportunity for the base game to activate one or more payouts and/or one or more bonus games. Further, in this example, a bonus game play may initiate a new base game without the required wager and/or provide a chance to obtain a prize without any required wager.

Statistics module 418 may be used to maintain data relating to historical game play (including second chance wagering data—(dollar amount, credit amount, spins, credits per line bet, time period, maximum win amount, one or more triggering events to stop game play, etc.)) for one or more electronic gaming devices 100. This historical data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play. In one example, the system, device, and/or method may track the percentage of secondary base game winning events and/or secondary base game triggering events.

Progressive module 420 may generate, transmit, compile, and/or store one or more data points relating to one or more progressives and/or subscription progressives (e.g., a progressive a player selects and pays to enter). For example, a normal progressive is where the player enters the progressive and has no choice. If the player plays game X, then they are part of the progressive. However, a subscription progressive allows the player to select whether to be part of the progressive game play or not. In other words, a player can choice to be part of progressive A for a first spin of a game play, then progressive B for a second spin of a game play, and then no progressive for a third spin of a game play on the electronic gaming device.

Persistence game module may generate, transmit, compile, and/or store one or more data points and/or presentations relating to one or more persistence gaming options and/or persistence gaming wagers.

Presentation and implementation module 424 may generate, transmit, compile, implement, and/or store one or more presentations.

Tracking module may generate, transmit, compile, and/or store one or more data points related to tracking one or more second chance wagers and/or second chance wager players.

Signage module 426 may generate, transmit, compile, initiate, and/or store one or more presentations for one or more signs.

Advertisement module 428 may generate, transmit, compile, present, implement, initiate, and/or store one or more advertisements. Advertisement module 428 may generate, compile, transmit, and/or store advertisement information relating to one or more second chance, subscription based progressive, and/or any other gaming feature. These advertisements may be presented on one or more display screens, an internet website, and/or any other advertisement avenue.

Searching module may implement a search on one or more gaming devices to obtain gaming data. Searching module may implement a messaging function, which may transmit a message to a third party (e.g., a player) relating to a search, a search status update, a game status update, a wager status update, a confirmation of a wager, a confirmation of a money transfer, and/or any other data relating to the player's account. The message can take the form of a text display on the gaming device, a pop up window, a text message, an email, a voice message, a video message and the like. Searching module may implement a wagering function, which may be an automatic wagering mechanism. These functions of searching module may be integrated into one or more servers.

Searching module may include one or more searching structures, one or more searching algorithms, and/or any other searching mechanisms. In general, the search structures may cover which EGMs paid out the most money during a time period, which EGMs kept the most money from players during a time period, which EGMs are the most popular (e.g., top games), which EGMs are the least popular, which EGMs have the most amount of money bet during a period, which EGMs have the highest bet volume, which EGMs are more volatile (e.g., volatility, or deviation from the statistical norms of bet volume, bet amount, pay out, etc.) during a time period, and the like. These searches may also be associated with location queries, time queries, and/or people queries (e.g., where are the second chance base game play functionality games, where are theme 1 gaming machines, where are the table games that most of my friends bet on, where are my favorite EGMs, what are players betting on the most today, when are most bets placed, etc.).

The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, all) of the devices. In another example, the search may be based on a predetermined number of devices to be searched in combination with a predetermined number of search results to be obtained. In this example, the search structure may be a minimum of ten devices to be searched, along with a minimum of five gaming options to be determined. For example, a player may want to search for games that have not won a prize over $100 during the last 100 spins. The search may look at the first 10 devices and only find two gaming options. Therefore, the search would continue until five gaming options where discovered which meant that 56 devices needed to be examined.

In another example, the searching structures may be based on one or more specific games (e.g., a first EGM type, a second EGM type, etc.). Searching structure may search one or more of these games.

In another example, the searching structure may be based on a player's preferences, past transactional history, player input, a particular EGM, a particular casino, a particular location within a casino, game outcomes over a time period, payout over a time period, and/or any other criteria.

Wild module may generate a wild game, evaluate the results of the wild game, trigger wild game presentations, generate wild game payouts, and/or display any data relating to the wild game. Further, wild module may determine one or more outcomes of one or more interactions (e.g., collisions of one or more symbols).

Scatter module may generate a scatter game, evaluate the results of the scatter game, trigger scatter game presentations, generate scatter game payouts, and/or display any data relating to the scatter game.

Subscription-based progressive module may generate, compile, transmit, and/or store one or more subscription based progressive structures and/or any other data relating to one or more subscription based progressive structures and/or subscription based second chance base game play.

3D gesturing module may generate, compile, transmit, and/or store one or more data points, presentations, reference modules, and/or structure relating to any aspect of 3D gesturing.

Pseudo module may generate, transmit, compile, and/or store one or more data points and/or presentations relating to one or more pseudo gaming options and/or pseudo gaming wagers.

Skill-based module may generate, compile, store, and/or transmit one or more skill-based structures and/or one or more skill-based tournament structures. Skill-based evaluation module may evaluation one or more outcomes of one or more skill-based games and/or skill-based tournament games.

Mobile device module may generate, compile, store, and/or transmit one or more data relating to the mobile device. Further, mobile device module may interact and communicate with mobile device to transfer and/or receive data from and/or to mobile device.

Game configuration module may generate, compile, store, and/or transmit one or more game configuration data. Further, mobile device may also include a game configuration module.

Installation verification module may verify the installation parameters on one or more of audio devices, one or more display devices, one or more electrical wires, one or more springs, one or more motors, one or more adjustable devices, and/or one or more sensors to one or more reference data points. Installation verification module may generate a warning when the data points are outside of a specific parameter range. One or more warnings may be transmitted to an external device, a server, a mobile device, and/or a warning display on electronic gaming device 100 based on the verification data.

Locking module may control the locking mechanism for one or more audio devices, one or more display devices, one or more electrical wires, one or more springs, one or more motors, one or more adjustable devices, and/or one or more sensors. Locking module may control any locking mechanism for electronic gaming device 100. Locking module may generate a warning when a locking data point is outside of a specific parameter. These warnings may be transmitted to an external device, a server, a mobile device, and/or a warning display on electronic gaming device 100.

It should be noted that one or more modules may be combined into one module. Further, there may be one evaluation module where the determined payout does not depend on whether there were any wild symbols, scatter symbols, base game play, secondary base game play, bonus game play, and/or any other specific symbols. Further, any module, device, and/or logic function in electronic gaming device 100 may be present in electronic gaming system 200. In addition, any module, device, and/or logic function in electronic gaming system 200 may be present in electronic gaming device 100.

In one embodiment, a system, device, and/or method may offer bets that are dependent on a function of a primary slot machine and/or any other device. For example, a second window may open on a primary game screen (and/or any other display and/or any other output device) that offers a wager on the outcome of the next game (e.g., spin, etc.). In one example, the wagering option may be whether the next game (e.g., spin, etc.) will be a winner or a loser. The player may make the wager and play the game. If the results of the game play is consistent with the player's bet, the player wins and is awarded a prize. In one example, the gaming system does not determine the outcome of the future game play before the wager and/or odds are accepted and/or created. In this example, this gaming option may not need to be approved as a gaming device and may not be subject to the rigorous standards of a regulated gaming device. In this example, an accounting system that accepts bets and pays winning bets may be utilized. In these examples, the player is betting on some characteristic of slot machine play and/or another verifiable event outcome.

In one example, the types of wagers that can be accepted are not relegated to the outcomes of the player's slot machine. In various examples, the possibilities for betting options are related to the events and/or occurrences that can be observed, recorded, and/or verified by the system. For example, one wagering option may be whether the progressive jackpot will be triggered and/or hit in the next 3 minutes (specific time period) and/or next 10 spins (specific spin number). In another example, one wagering option may be whether another person (e.g., a friend, a wife, a husband, a stranger, etc.) will win on the next spin. In this example, a loyalty card (and/or some other identification method) may be utilized to identify the player and/or a specific gaming device identification number may be utilized. In another example, one wagering option may be whether the mystery progressive will be hit (e.g., won) before it reaches a certain number (e.g., $300, $1,000, etc.).

In another example, the credits for the wager and the winnings may be moved to and from the primary gaming device through automatic fund transfer ("AFT") transactions from the system. Further, the system may act as the book maker for the bets. The system may meter and account for all transfers in total and by each game in which pseudo wagers have been made.

In another example, the system may determine the one or more event outcomes via SAS communications, communications with a class II server, and/or other communication protocol and/or other forms of communication methods. The system may record one or more outcomes for the wager and relays the results to the player and/or one or more EGMs. In addition, the system may allow for a ticket to be printed as a pseudo wager receipt but this may not be necessary as the pseudo wager information is already stored on the system. In addition, in cases where the pseudo wager cannot be completed, the pseudo wager may be returned to the player or to the player's account. In various examples, one or more rules may be implemented for pseudo wagers that depend on an event occurring over a time period and/or as other events happen to prevent the player from trying to cancel wagers as a limit is approached. For example, a player may want to cancel a bet that the next four spins will be winner once the second spin was not a winner. However, the system may not allow this.

Second chance module 430 may generate, transmit, compile, and/or store one or more data points and/or presentations relating to one or more second chance features and/or second chance functions. Second chance module 430 may evaluate one or more outcomes for one or more events relating to second chance base game play. Further, second chance module 430 may determine one or more outcomes of one or more interactions. Second chance module 430 may generate one or more presentations for one or more second chance functions. In addition, second chance module 430 may verify that one or more second chance functions are in compliance with one or more second chance base game play parameters.

Dynamic second chance module may generate, transmit, compile, and/or store one or more data points and/or presentations relating to one or more dynamic second chance features and/or dynamic second chance functions where the dynamic second chance is related to one or more stacking functions.

In one example, a dynamic stack may include two identical symbols being located adjacent to each other. Further, the dynamic stack may increase in size from spin-to-spin; decrease in size from spin-to-spin; change symbols from spin-to-spin (e.g., transition from a first symbol for a first spin to a second symbol for a second spin); change from a first symbol to a non-first symbol from spin-to-spin; disappear and reappear from spin-to-spin; change shape from spin-to-spin (e.g., go from an L shape to an X shape from a first spin to a second spin); turn on and off from a first spin to a second spin; and/or any combination thereof. In this example, the expanding sections (e.g., secondary base game play mode) only relate to the areas where one or more stacking symbols were located.

Expanding display areas module 432 may generate, transmit, compile, and/or store one or more data points and/or presentations relating to one or more expanding display areas utilized with the second chance base game (e.g., secondary base game) features and/or functions. In addition, expanding display areas module 432 may generate, transmit, compile, and/or store one or more data points and/or presentations relating to one or more expanding display areas utilized with bonus game.

Expanding counter module 434 may generate, transmit, compile, and/or store one or more data points and/or presentations relating modifying the expanding counter every time a base game occurs without a secondary base game mode being triggered. Further, the expanding counter module 434 may reset the expanding counter once a secondary base game mode is triggered.

Figure 5:
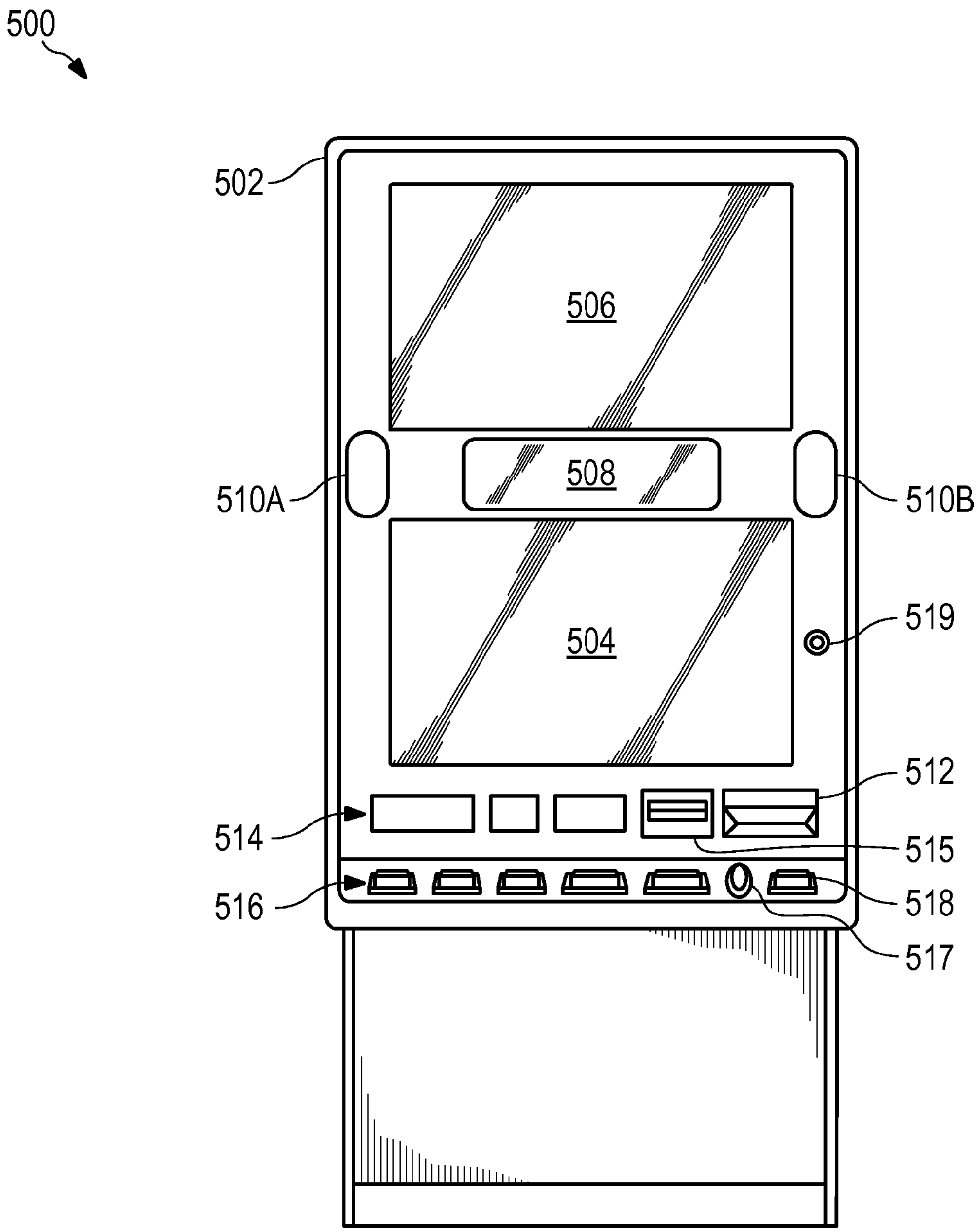
FIG. 5 is an illustration of game play on a gaming device, according to one embodiment.

In FIG. 5, an illustration of a gaming device cabinet 500 is shown, according to one embodiment. A gaming device 502 may include a main game display 504, an overhead display 506, a side display 508, a left speaker 510A, a right speaker 510B, one or more output devices (e.g., a ticket in/ticket out device 512), and/or one or more input devices 516 (e.g., buttons, bill validators, etc.). In one example, overhead display 506 includes a leadership board sponsor and/or a ranking of tournament players. In this example, the XYZ company has sponsored the leadership board and the leadership board states "XYZ LEADER BOARD." In another example, leadership display may include data relating to one or more tournaments, such as, the time remaining (e.g., 1 HOUR 31 MINUTES REMAINING). In this example, side display 508 may display a current mode of operation. For example, a current mode may be a tournament mode, a normal mode, a practice mode, a team mode, an individual mode, a base game mode, a base game with a secondary base game mode, a base game mode with a bonus game, a base game with a secondary base game and a bonus game mode, any combination thereof, etc.

Figure 6A:
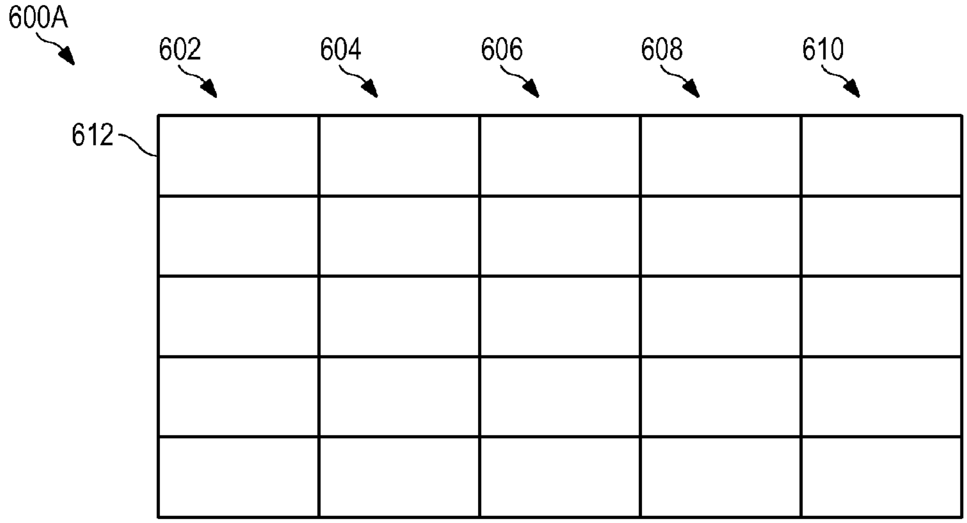
FIG. 6A is an illustration of a base game, a second chance base game, and/or a bonus game structure on a gaming device, according to one embodiment.

In FIG. 6A, another illustration of second chance base game play on a gaming device is shown, according to one embodiment. In this example, the display matrix is a 5 by 5 grid. However, any size grid N×M may be utilized where N=1 to any number and M=1 to any number. For example, the grid may be 3×4; 4×5; 5×4; 5×2; 7×9; 100×50, etc.

Figure 6B:
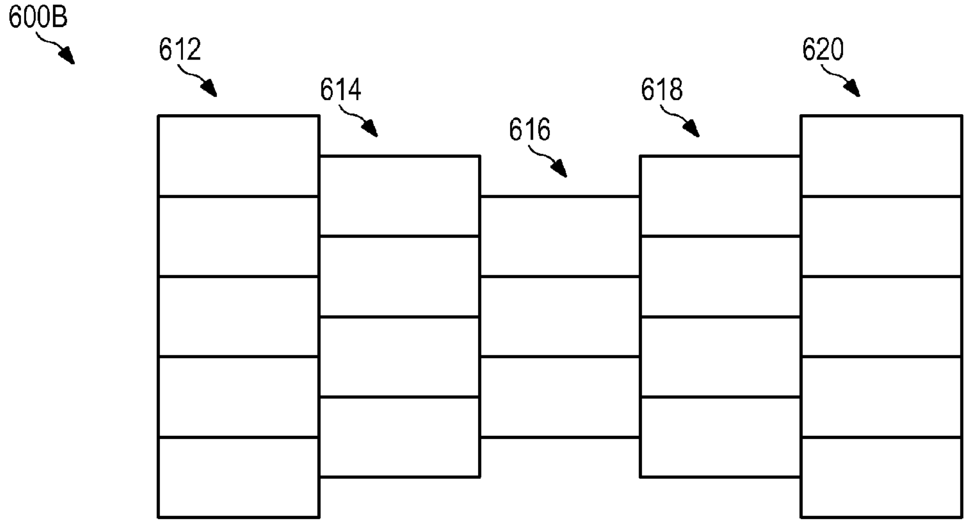
FIG. 6B is another illustration of a base game, a second chance base game, and/or a bonus game structure on a gaming device, according to one embodiment.

In FIG. 6B, another illustration of second chance base game play on a gaming device is shown, according to one embodiment. In this example, the display matrix includes a first column 612 which has 5 rows, a second column 614 which has 4 rows, a third column 616 which has 3 rows, a fourth column 618 which has 4 rows, and a fifth column 620 which has 5 rows. In should be noted that display matrix may have any number (e.g., 1 to N) of columns with any number of rows (e.g., 1 to N).

Figure 6C:
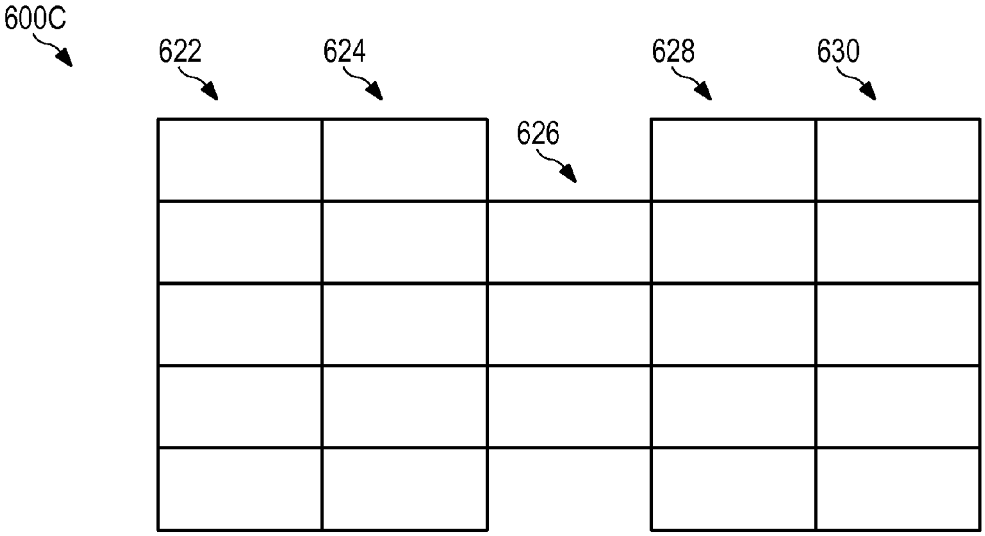
FIG. 6C is another illustration of a base game, a second chance base game, and/or a bonus game structure on a gaming device, according to one embodiment.

In FIG. 6C, another illustration of second chance base game play on a gaming device is shown, according to one embodiment. In this example, the display matrix includes a first column 622 which has 5 rows, a second column 624 which has 5 rows, a third column 626 which has 3 rows, a fourth column 628 which has 5 rows, and a fifth column 630 which has 5 rows.

Figure 6D:
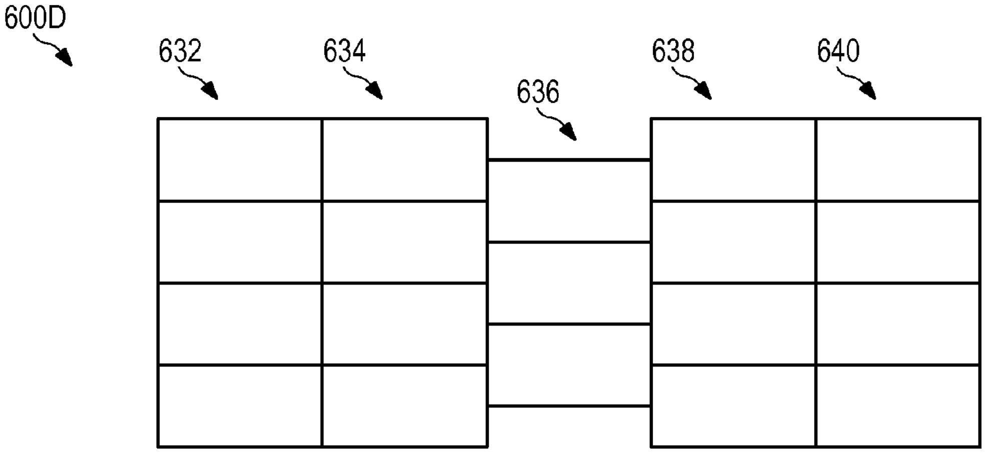
FIG. 6D is another illustration of a base game, a second chance base game, and/or a bonus game structure on a gaming device, according to one embodiment.

In FIG. 6D, another illustration of second chance base game play on a gaming device is shown, according to one embodiment. In this example, the display matrix includes a first column 632 which has 4 rows, a second column 634 which has 4 rows, a third column 636 which has 3 rows, a fourth column 638 which has 4 rows, and a fifth column 640 which has 4 rows.

Figure 6E:
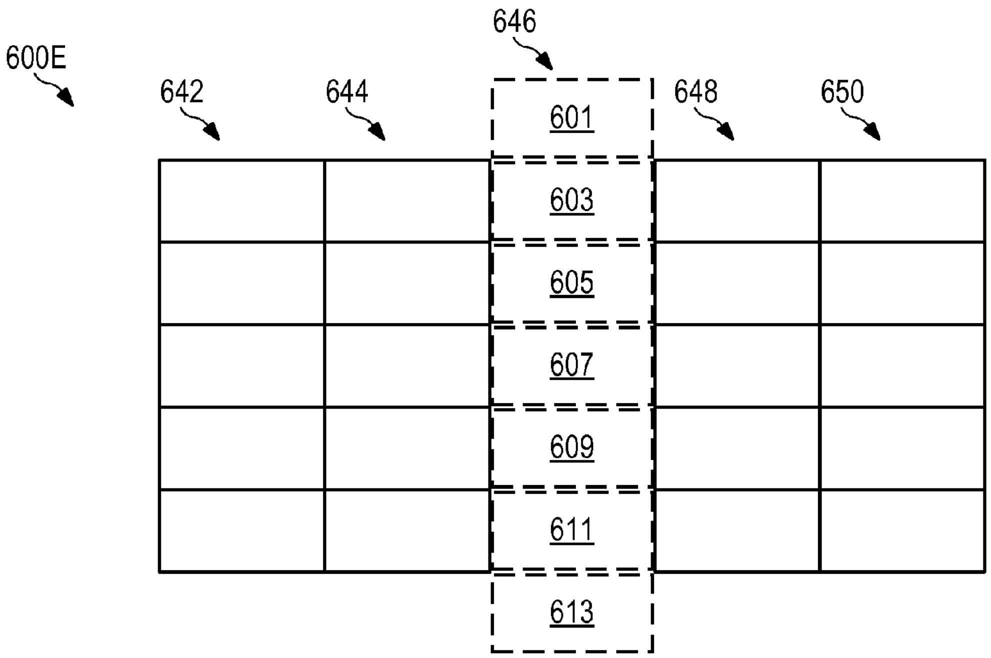
FIG. 6E is another illustration of a base game, a second chance base game, and/or a bonus game structure on a gaming device, according to one embodiment.

In FIG. 6E, another illustration of second chance base game play on a gaming device is shown, according to one embodiment. In this example, the display matrix includes a first column 642 which has 5 rows, a second column 644 which has 5 rows, a third column 646 which has 3 rows, a fourth column 648 which has 5 rows, and a fifth column 650 which has 5 rows. In this example, third column 646 can expand by any number of display units (e.g., 1-N) which may be based on a triggering event, the number of credits wagered, a bonus game, and/or any other criteria. In this example, third column 646 has expanded by four display units. For example, one or more columns and/or display areas may expand based on a maximum wager, a number of lines wagered on, a length of time playing a wagered amount (e.g., maximum wager, number of lines, etc.), a bonus game trigger, the time of day of game play, a loyalty program, a second chance triggering event, etc.

Figure 6F:
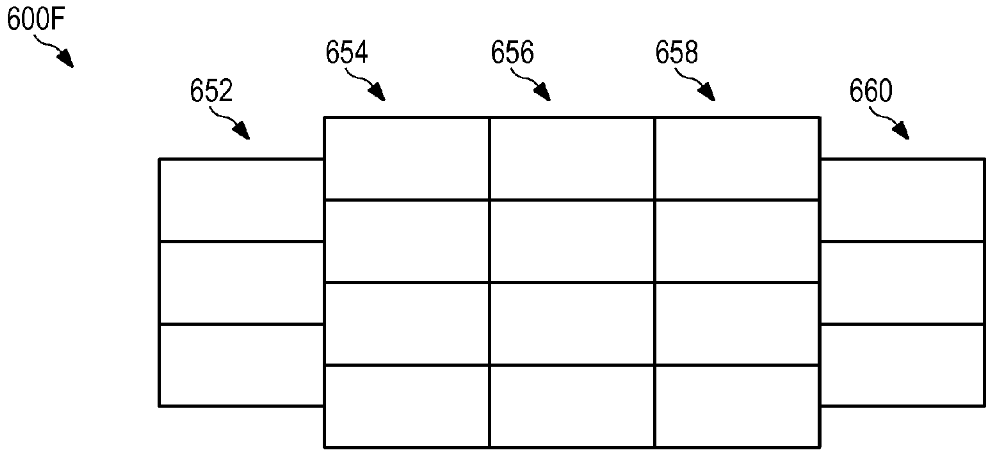
FIG. 6F is another illustration of a base game, a second chance base game, and/or a bonus game structure on a gaming device, according to one embodiment.

In FIG. 6F, another illustration of second chance base game play on a gaming device is shown, according to one embodiment. In this example, the display matrix includes a first column 652 which has 3 rows, a second column 654 which has 4 rows, a third column 656 which has 4 rows, a fourth column 658 which has 4 rows, and a fifth column 660 which has 3 rows. In should be noted that by increasing and/or decreasing the size of a column the probabilities of winning events can be altered (e.g., increased, decreased, enhanced, blocked, etc.).

Figure 6G:
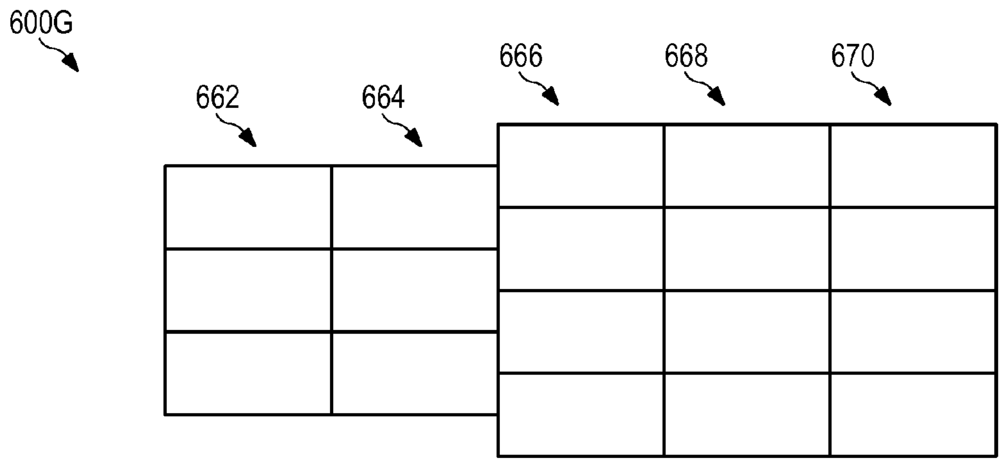
FIG. 6G is another illustration of a base game, a second chance base game, and/or a bonus game structure on a gaming device, according to one embodiment.

In FIG. 6G, another illustration of second chance base game play on a gaming device is shown, according to one embodiment. In this example, the display matrix includes a first column 662 which has 3 rows, a second column 664 which has 3 rows, a third column 666 which has 4 rows, a fourth column 668 which has 4 rows, and a fifth column 670 which has 4 rows.

Figure 6H:
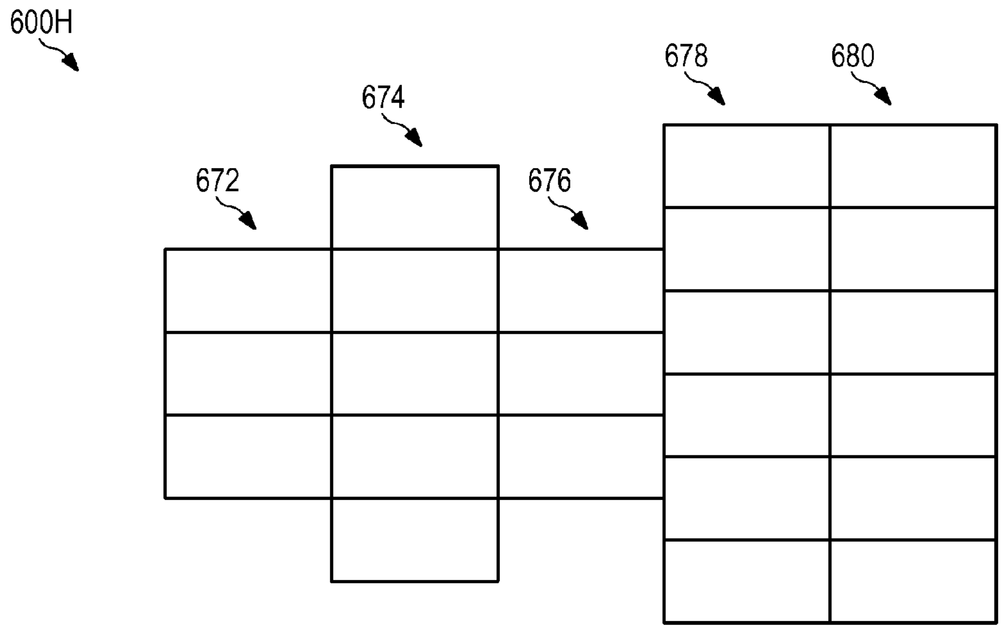
FIG. 6H is another illustration of a base game, a second chance base game, and/or a bonus game structure on a gaming device, according to one embodiment.

In FIG. 6H, another illustration of second chance base game play on a gaming device is shown, according to one embodiment. In this example, the display matrix includes a first column 672 which has 3 rows, a second column 674 which has 5 rows, a third column 676 which has 3 rows, a fourth column 678 which has 6 rows, and a fifth column 680 which has 6 rows.

Figure 6J:
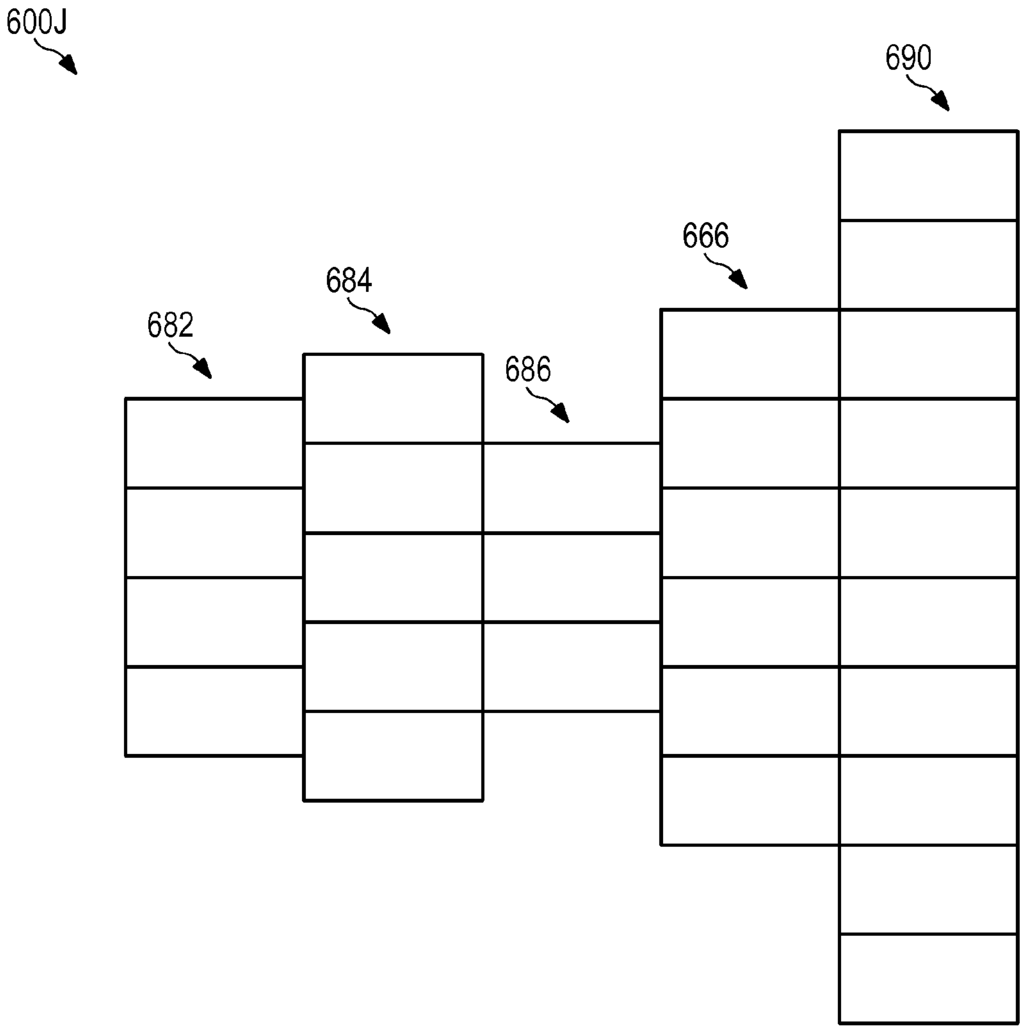
FIG. 6J is another illustration of a base game, a second chance base game, and/or a bonus game structure on a gaming device, according to one embodiment.

In FIG. 6J, another illustration of second chance base game play on a gaming device is shown, according to one embodiment. In this example, the display matrix includes a first column 682 which has 4 rows, a second column 684 which has 5 rows, a third column 686 which has 3 rows, a fourth column 688 which has 6 rows, and a fifth column 690 which has 10 rows. It should be noted that all of the symbols areas in FIGS. 6A to 6J have remain constant in size and shape but in other embodiments may vary in size and shape. Further, FIGS. 6A-6J may be utilized with any payline structure and/or any other disclosure in this document.

Figure 7A:
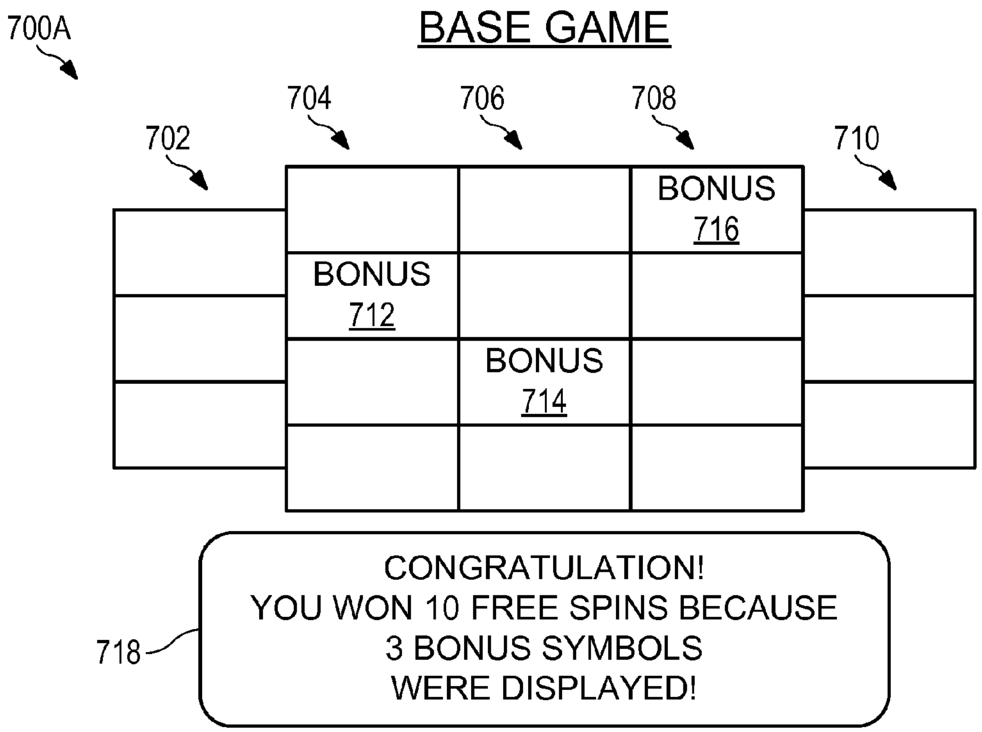
FIG. 7A is an illustration of a base game on a gaming device, according to one embodiment.

In FIG. 7A, an illustration of second chance base game play on a gaming device is shown, according to one embodiment. A first electronic game display area image 700A may include a plurality of display areas including a first active display reel 702, a second active display reel 704, a third active display reel 706, a fourth active display reel 708, and/or a fifth active display reel 710. The active display reel areas are portions of the reels that can be seen by the player and/or utilized to determine one or more winning combinations on one or more active paylines (and/or one or more bonus game triggering events). For example, a reel may consists of 250 reel spaces where each reel space has a specific symbol (e.g., an Ace, a King, a diamond, a wild, a scatter, etc.) located in each reel space. During a reel spin, one or more of these symbols are shown passing one or more active display reel areas until the reel stops spinning and the reel spaces that have stopped onto the active display reel areas are shown and/or utilized to determine one or more payouts and/or winning combinations based on one or more active paylines. In addition, the reel locations outside of the active display reel areas may not be shown to the player and/or may not be utilized to determine one or more payouts and/or one or more winning combinations based on one or more active paylines. In normal game play, the symbols in these areas may not been seen by the player. Further, the reels may be video display reels and/or mechanical display reels. In one example, first electronic game display area image 700A may be a reel area made up of digital reels and/or mechanical reels. Further, one or more active paylines may be paylines that can be utilized for a winning combination.

First electronic game display area image 700A shows a game outcome where a player has won 10 free spins in a bonus game because the 3 bonus symbols (e.g., bonus game triggering symbols) were displayed in second active display reel 704, third active display reel 706, and/or fourth active display area 708. In this example, a first message 718 may state "CONGRATULATIONS! YOU WON 10 FREE SPINS BECAUSE 3 BONUS SYMBOLS WERE DISPLAYED!" It should be noted that any type of bonus game (e.g., free spins, picking game, etc.) may be utilized and/or that any number of free spins (e.g., 1-N) may be utilized. In this example, 3 bonus symbols needed to be displayed on second active display reel 704, third active display reel 706, and/or fourth active display area 708. In this example, a first bonus symbol 712 was displayed on second active display reel 704, a second bonus symbol 714 was displayed on third active display reel 706, and a third bonus symbol 719 was displayed on fourth active display area 708. However, 3 bonus symbols may have been displayed on fourth active display area 708 to obtain the free spins bonus game. In addition, 2 bonus symbols may have been displayed on fourth active display area 708 and 1 bonus symbol may have been displayed on either the third active display reel 706 and/or the second active display reel 704 to obtain the free spins bonus game. Any combination of 3 bonus symbols on any of the designated reels (e.g., reels 2-4) may be utilized. Further, any number of bonus symbols may be required (e.g., 1 to N) to initiate a bonus game and/or any number of reels (e.g., reels 1-5 and/or 1-N) may be utilized. In addition, any combination of reels may be utilized—bonus symbols may only count when they appear on reels 1, 3, 5 and N (and/or reels 2, 3, and 5—and/or reels 3, 4, and 6, etc.). In this example, the player obtained the bonus game utilizing the base game only and did not require a second chance base game play. The second chance base game play may be considered a secondary base game which is utilized with the base game play to enhance the probability of obtaining the bonus game play in a base game mode. The example shown in FIG. 7A may be utilized for base game play.

A player may play a non-second chance base game which includes both a base game and a bonus game but does not include a secondary base game play. The base game is the first game play action which normally includes a first spinning of one or more reels and is based on a first wager. Whereas, a bonus game may be triggered (e.g., by obtaining the requirements of the bonus game—# of symbols, etc.) during the base game. There is no additional wager required for the initiation of the bonus game and when the bonus game includes free spins the one or more reels are respun for each free spin. Further, free spins may respin the one or more reels in their entirety. Further, a secondary base game (e.g., a second chance mode) may reveal one or more additional non-active reel areas after the completion of the first spin in base game play mode to allow these non-active reel areas to become active and generate one or more payouts and/or one or more bonus game initiating events. Therefore, in one example, a base game play is the first game play which requires a wager by the player to initiate base game play. In this example, a secondary base game play may be initiated when the base game play does not initiate one or more bonus games. In this example, the secondary base game play allows the base game to continue and provides an additional opportunity for the base game to activate one or more payouts and/or one or more bonus games. Further, in this example, a bonus game play may initiate a new base game without the required wager and/or provide a chance to obtain a prize without any required wager.

Figure 7B:
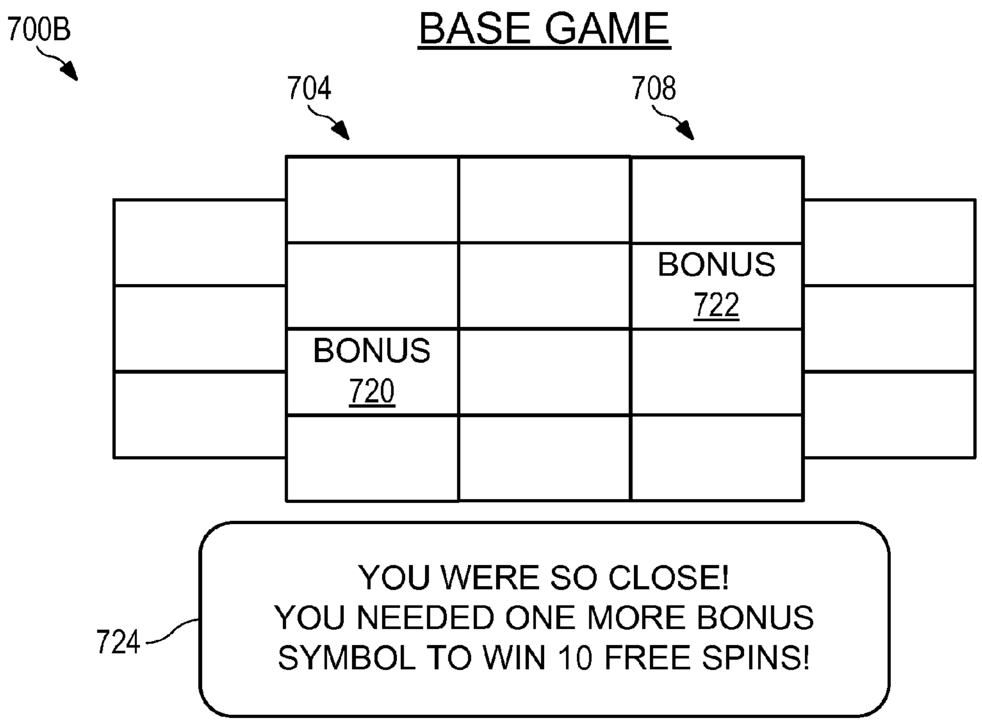
FIG. 7B is another illustration of a base game on a gaming device, according to one embodiment.
Figure 7C:
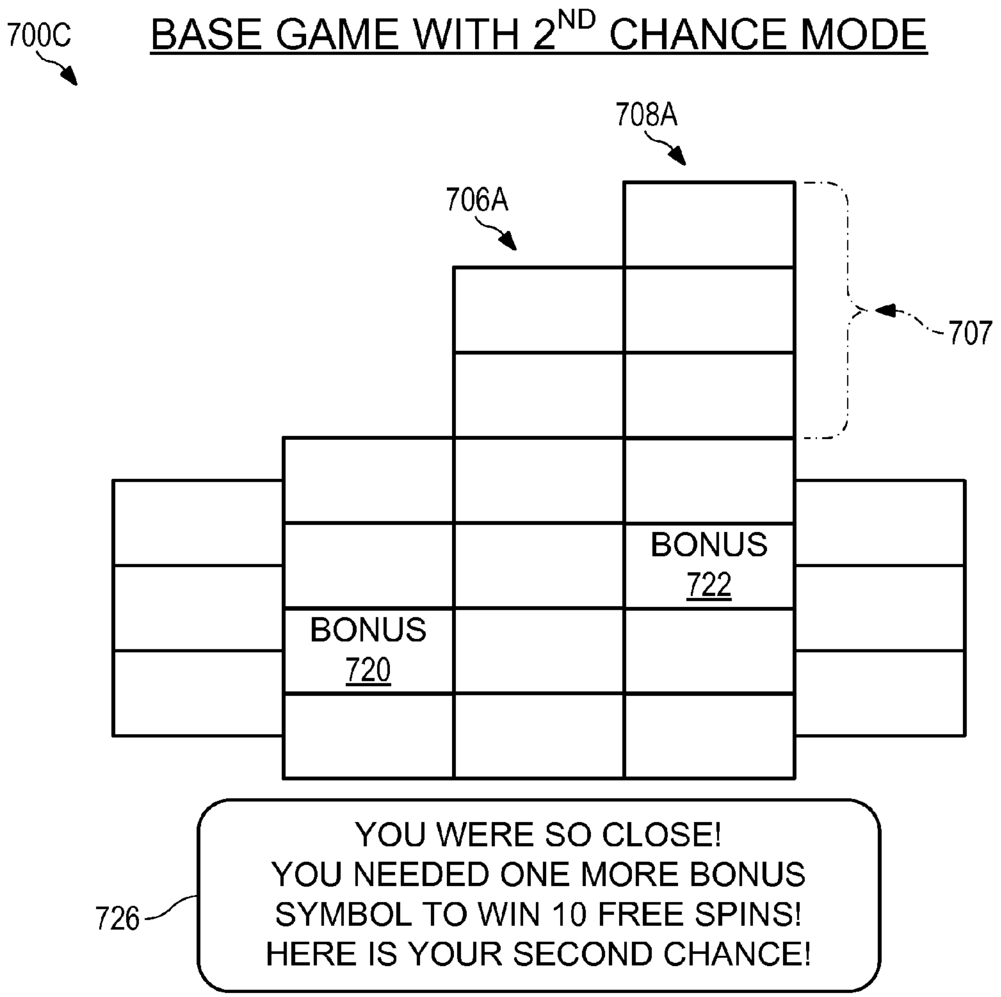
FIG. 7C is an illustration of a base game with a second chance base game on a gaming device, according to one embodiment.
Figure 7D:
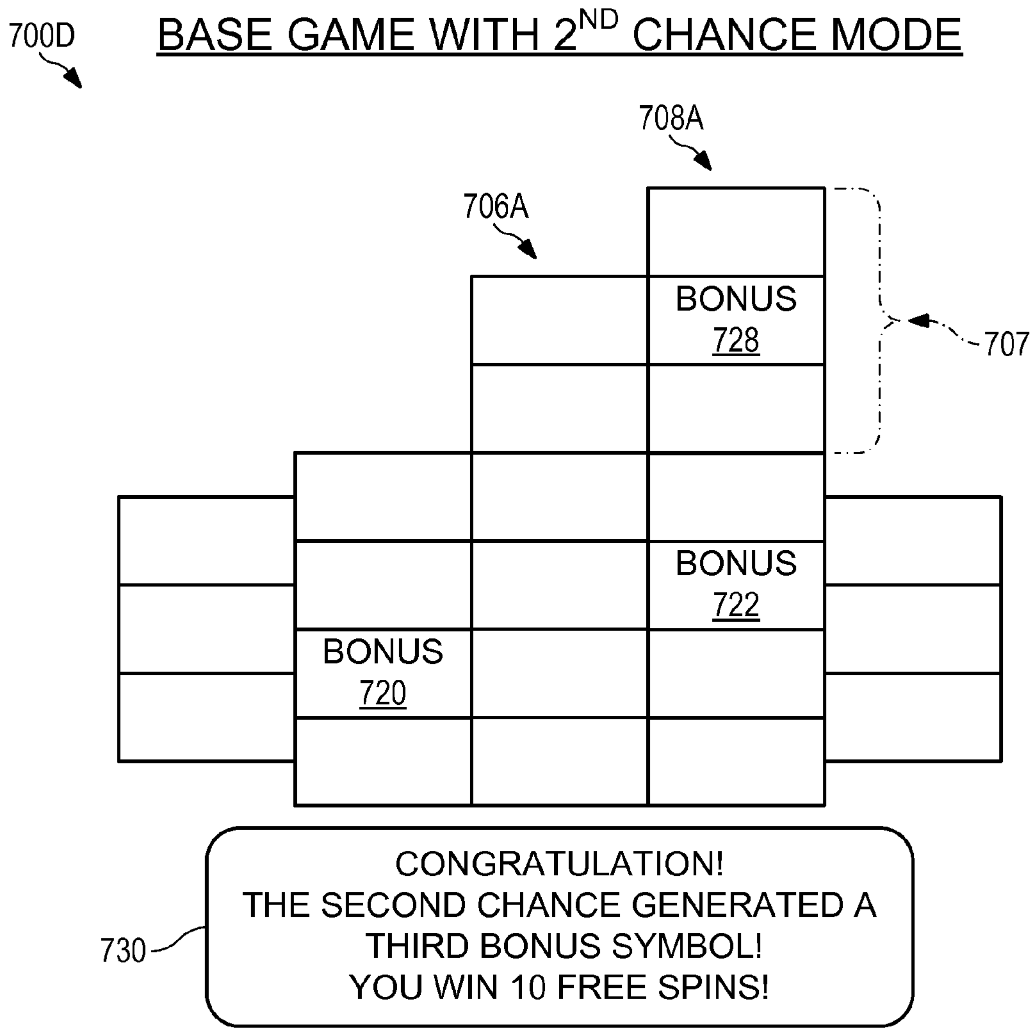
FIG. 7D is another illustration of a base game with a second chance base game on a gaming device, according to one embodiment.

In FIG. 7B, another illustration of second chance base game play on a gaming device, according to one embodiment. A second electronic game display area image 700B may show base game play where the outcome included a first bonus symbol 720 and a second bonus symbol 722 which does not trigger the bonus game because 2 bonus symbols (e.g., bonus game triggering symbols—where 3 of these bonus game triggering symbols is required to trigger the bonus game) were displayed when 3 bonus symbols are required to initiate bonus game play. In this example, a second message 724 may state "YOU WERE SO CLOSE! YOU NEEDED ONE MORE BONUS SYMBOL TO WIN 10 FREE SPINS!" In normal base game play mode, this would end base game play and the player and/or game would move onto the next base game play (e.g., spin). However, this disclosure demonstrates a new secondary base game play mode where the base game is extended to allow for a second chance to trigger one or more bonus games during a secondary base game mode. In this example, the secondary base game play is not the same as a bonus game (e.g., free spins, etc.) because the bonus game is free spins of the entire base game utilizing the same active reel areas from the base game. Whereas, the secondary base game play is a continuation of the base game which unlocks one or more additional reel spaces (e.g., reel areas). The example shown in FIG. 7B may be utilized for base game play. In FIG. 7C, a third electronic game display area image 700C shows the electronic gaming device in a second chance base game play mode. In this example, the base game outcome included first bonus symbol 720 and second bonus symbol 722 which did not trigger the bonus game because 2 bonus symbols were displayed when 3 bonus symbols are required to initiate bonus game play. Therefore, in non-second chance base game play mode, this base game play would be completed and the gaming device would move to the next base game spin However, in this example, a third message 726 may state "YOU WERE SO CLOSE! YOU NEEDED ONE MORE BONUS SYMBOL TO WIN 10 FREE SPINS! HERE IS YOUR SECOND CHANCE!" In this example, once the second chance base game was triggered, game play moves to a second chance base game play mode which may be a secondary base game play mode. In this example of the second chance base game play mode, an extended display reel area 707 is displayed. In this example, the extended display reel area 707 was in an inactive state (e.g., could not be utilized to form a winning outcome and/or utilizing bonus symbols to trigger a bonus game play and/or not shown during base game play, etc.) before the second chance base game play mode and/or before the extended display reel area 707 was shown. In this example, the extended display reel area 707 has increased the third active display area 706 by 2 reel spaces and created an expanded third active display area 706A. Further, the extended display reel area 707 has increased the fourth active display area 708 by 3 reel spaces and created an expanded fourth active display area 708A. These extended and/or expanded areas may now be utilized to form one or more winning payline outcomes and/or to obtain addition bonus symbols to trigger a bonus game. The example shown in FIG. 7C may be utilized for base game play with second chance mode game play. For example in FIG. 7D, a third bonus symbol 728 was displayed in the extended display reel area 707 on one or more expanded reel spaces relating to the expanded fourth active display area 708A. In this example, a fourth message 730 may state "CONGRATULATIONS! THE SECOND CHANCE GENERATED A THIRD BONUS SYMBOL! YOU WIN 10 FREE SPINS!" In this example, third bonus symbol 728 was at the shown location at the end of the base game spin but was not shown in the active area because this location was not shown and/or in the active reel area and could not be utilized to trigger a bonus game and/or one or more payouts. However, once the active area is expanded during the secondary base game play, third bonus symbol 728 was shown and could be utilized to trigger a bonus game. In addition, the symbols in the expanded area may be reshuffled and/or respun (see FIG. 20A-20B). In addition, the second chance base game may be triggered based on a random number generated, a predetermined pattern, a length of game play by a player, a time of day, an amount of credits played since the last second chance triggering event, and/or any combination thereof. For example, a secondary base game may be triggered via a generation of a random number. In another example, the secondary base game may be triggered on every 10 play. Further, the secondary base game may be triggered after 10 minutes of game play. In addition, the secondary base game may be triggered after 1,000 credits have been played. The example shown in FIG. 7D may be utilized for base game play with second chance mode game play.

Figure 7E:
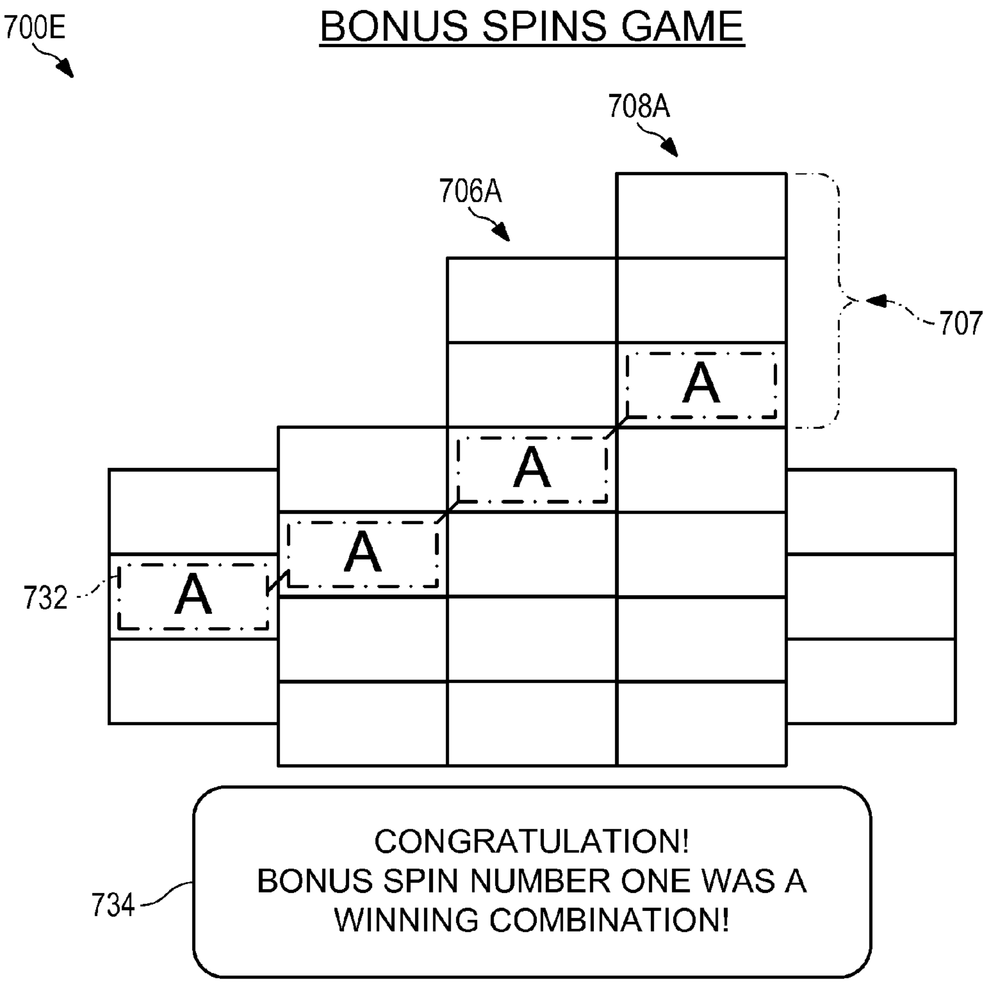
FIG. 7E is an illustration of bonus game with extended reels on a gaming device, according to one embodiment.
Figure 7F:
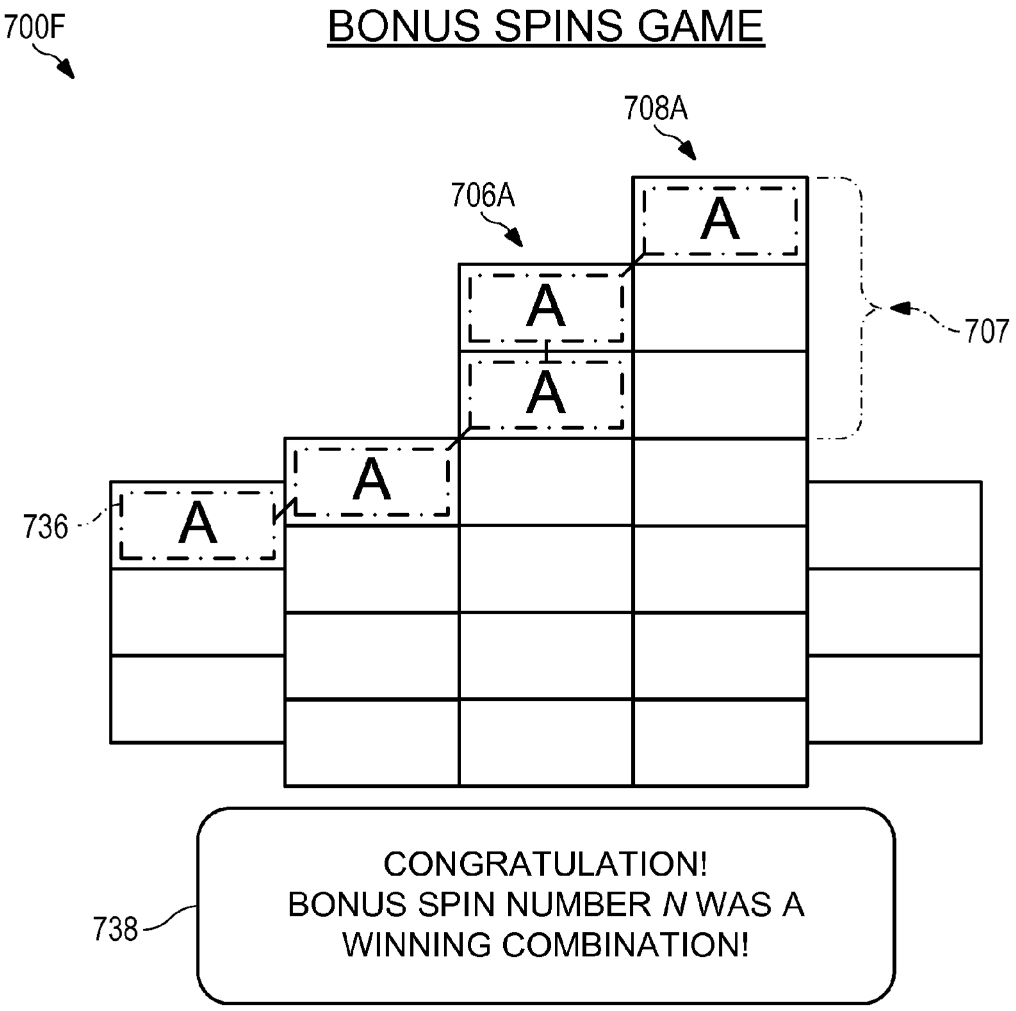
FIG. 7F is another illustration of bonus game with extended reels on a gaming device, according to one embodiment.

In FIG. 7E, a bonus game play is shown, according to one embodiment. A first bonus game play image 700E may include a base game area (the area utilized in FIG. 6F) which is utilized with extended display reel area 707 during a bonus game play. In this example, the extended display reel area 707 has increased the third active display area 706 by 2 reel spaces and created an expanded third active display area 706A. Further, the extended display reel area 707 has increased the fourth active display area 708 by 3 reel spaces and created an expanded fourth active display area 708A. These extended and/or expanded areas may now be utilized to form one or more winning payline outcomes. In this example, a first winning outcome 732 included three A symbols in the base game area (the area utilized in FIG. 6F) and one A symbol in the extended display reel area 707 to form a winning outcome with 4 A symbols which had a first prize amount. It should be noted that if the bonus game did not include the expanded areas, then the first winning outcome 732 may have included only three A symbols in the base game area (the area utilized in FIG. 6F) which had a second prize amount which would be less than the first prize amount. In another example, the first winning outcome 732 may not have been a winning outcome if the extended display reel area 707 was not utilized when game play requires that four A symbols are generated to form a winning outcome. In FIG. 7F, another bonus game play is shown, according to one embodiment. A second bonus game play image 700F may include a base game area (the area utilized in FIG. 6F) which is utilized with extended display reel area 707 during a bonus game play. In this example, the extended display reel area 707 has increased the third active display area 706 by 2 reel spaces and created an expanded third active display area 706A. Further, the extended display reel area 707 has increased the fourth active display area 708 by 3 reel spaces and created an expanded fourth active display area 708A. These extended and/or expanded areas may now be utilized to form one or more winning payline outcomes. In this example, a second winning outcome 736 included two A symbols in the base game area (the area utilized in FIG. 6F) and three A symbols in the extended display reel area 707 to form a winning outcome with 5 A symbols which had a first prize amount. It should be noted that if the bonus game did not include the expanded areas, then the second winning outcome 736 may have included only two A symbols in the base game area (the area utilized in FIG. 6F) which had a second prize amount which would be less than the first prize amount. In another example, the second winning outcome 736 may not have been a winning outcome if the extended display reel area 707 was not utilized when game play requires that three A symbols are generated to form a winning outcome.

Figure 7G:
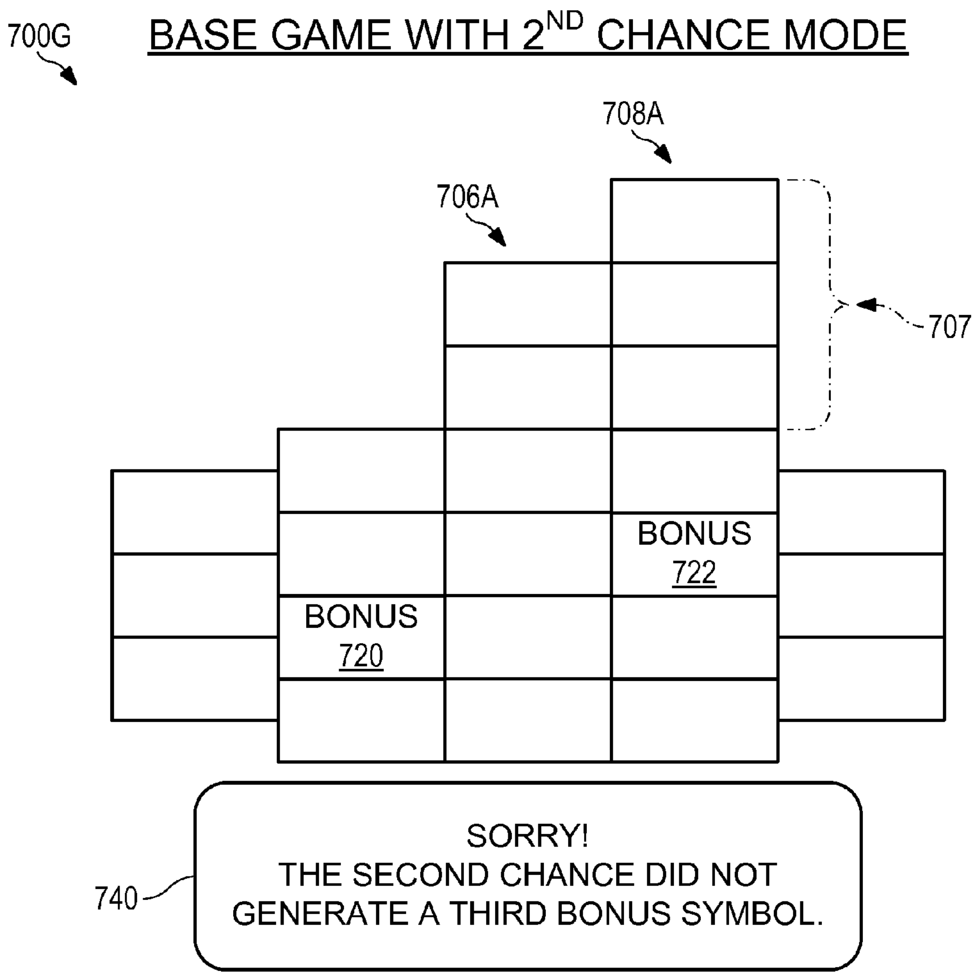
FIG. 7G is another illustration of a base game with a second chance base game on a gaming device, according to one embodiment.

In another example, the second chance base game play mode may not result in a third bonus symbol (and/or any item required for the generation of a bonus game play and/or a winning event) as seen in FIG. 7G. In this example, a fifth message 732 may state "SORRY! THE SECOND CHANCE DID NOT GENERATE A THIRD BONUS SYMBOL!" In this example, no bonus game play was triggered because none of the expanded reel area spaces had a bonus symbol to complete 3 bonus symbols required to trigger the bonus game. The example shown in FIG. 7G may be utilized for base game play with second chance mode game play.

Figure 7H:
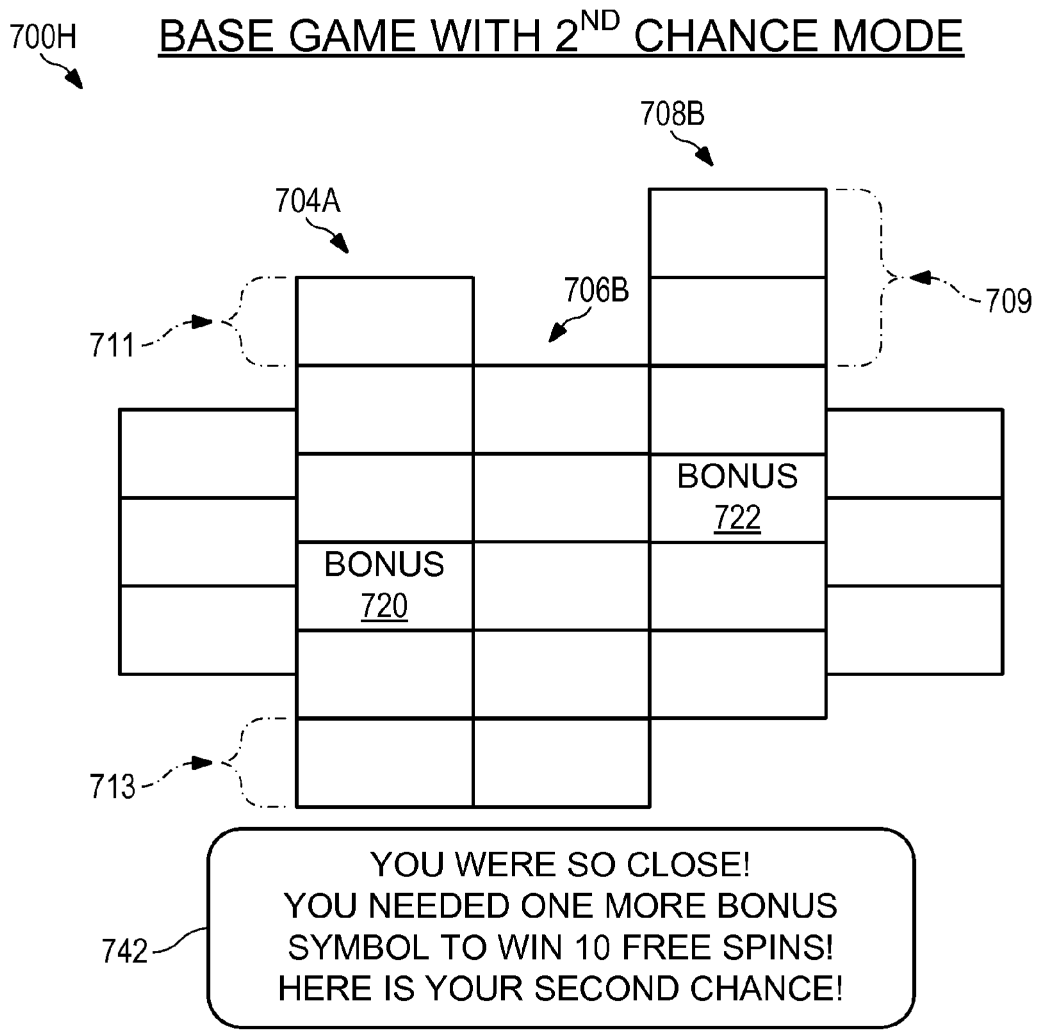
FIG. 7H is another illustration of a base game with a second chance base game on a gaming device, according to one embodiment.
Figure 7J:
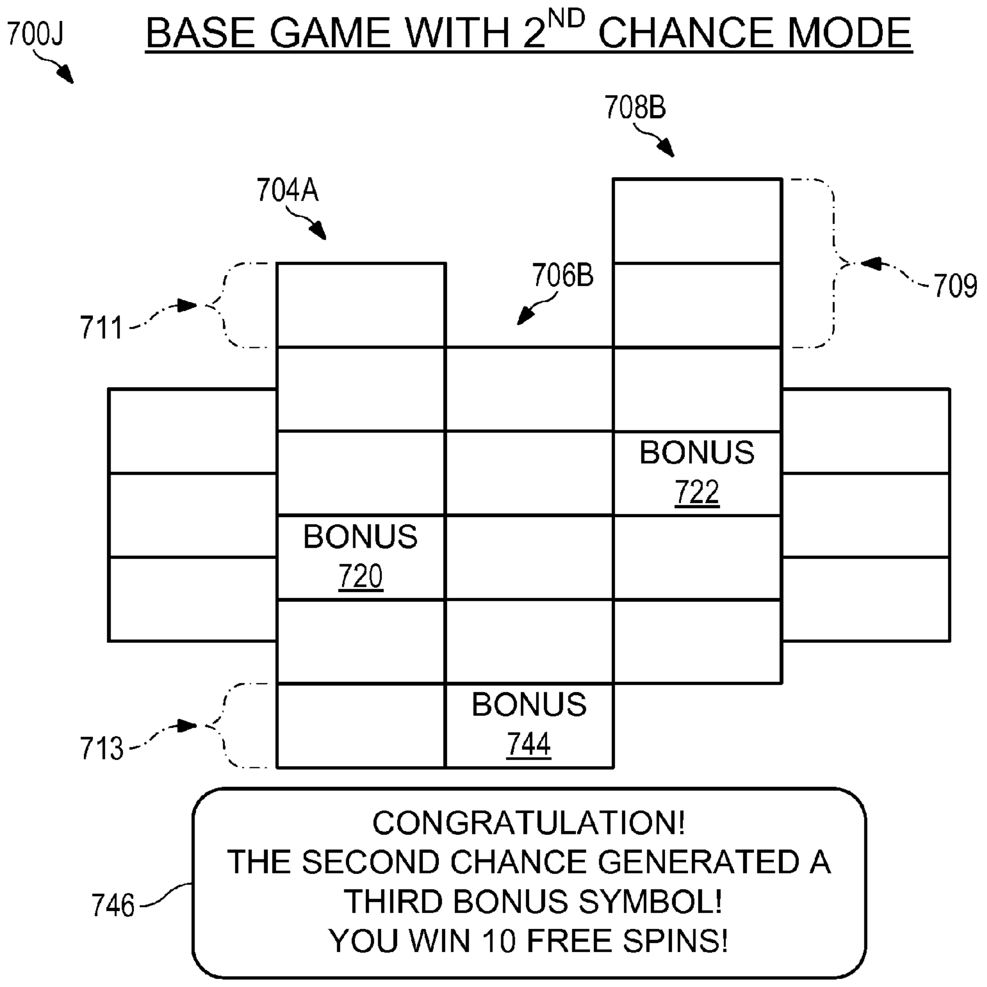
FIG. 7J is another illustration of a base game with a second chance base game on a gaming device, according to one embodiment.

In FIG. 7H, another illustration of second chance base game play on a gaming device is shown, according to one embodiment. A sixth electronic game display area image 700H may show a base game being completed where first bonus symbol 720 and second bonus symbol 722 were displayed but did not trigger a bonus game because 3 bonus symbols are required to be shown in this example to trigger one or more bonus games. In this example, a second chance base game play mode was triggered where a first expanded reel area 709, a second expanded reel area 711, and a third expanded reel area 713 are displayed and/or become active display areas which may be utilized to form a winning outcome and/or to trigger one or more bonus games. In this example, first expanded reel area 709 added two reel areas at the top of fourth active display area 708 to form an expanded fourth active display area 708B. Second expanded reel area 711 added one reel area at the top of second active display area 704 and third expanded reel area 713 added one reel area at the bottom of second active display area 704 to form an expanded second active display area 704A. Further, third expanded reel area 713 added one reel area to third active display area 706 to form an expanded third active display area 706B. In should be noted that the active display areas may be expanded in an upward direction, a downward direction, to the right, to the left, in a 3D mode (e.g., upwards and/or out of the display area and/or downwards into the display area), and/or any combination thereof. In another example, the active display areas may be expanded based on a predetermined pattern, the location of one or more non-bonus symbols, the location of bonus symbols, the wager amount, an interaction between two or more symbols (e.g., a first symbol location versus a second symbol location, a path from a first symbol location to a second symbol location, a path of a presentation from the first symbol location to the second symbol location, etc.), and/or any combination thereof. In one example shown in FIG. 7J, a third bonus symbol 744 was generated and/or displayed in the second chance base game play mode which initiated a bonus game. In another example shown in FIG. 7M, a third bonus symbol was not generated and/or displayed in the second chance base game play mode—therefore no bonus game was initiated. The examples shown in FIGS. 7H, J, and M may be utilized for base game play with second chance mode game play.

Figure 7K:
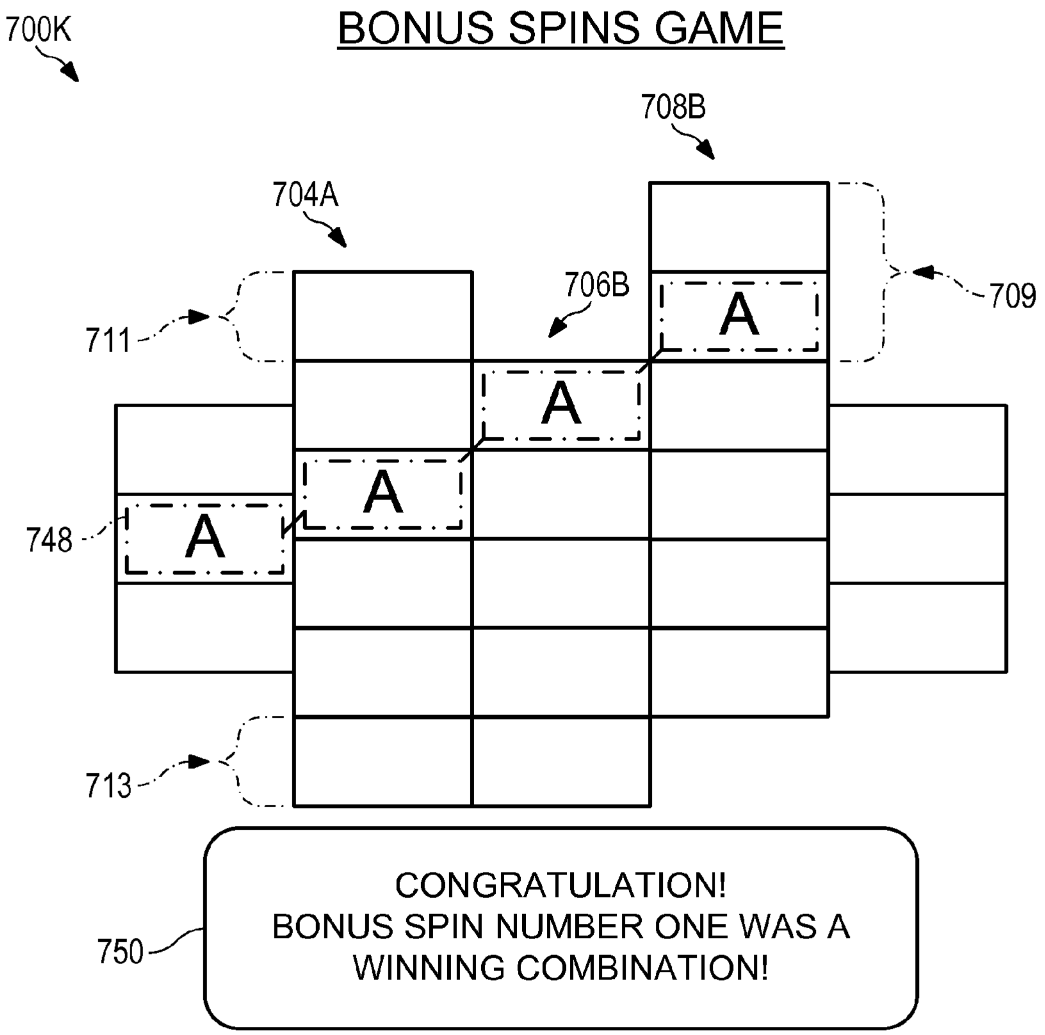
FIG. 7K is an illustration of bonus game with extended reels on a gaming device, according to one embodiment.
Figure 7L:
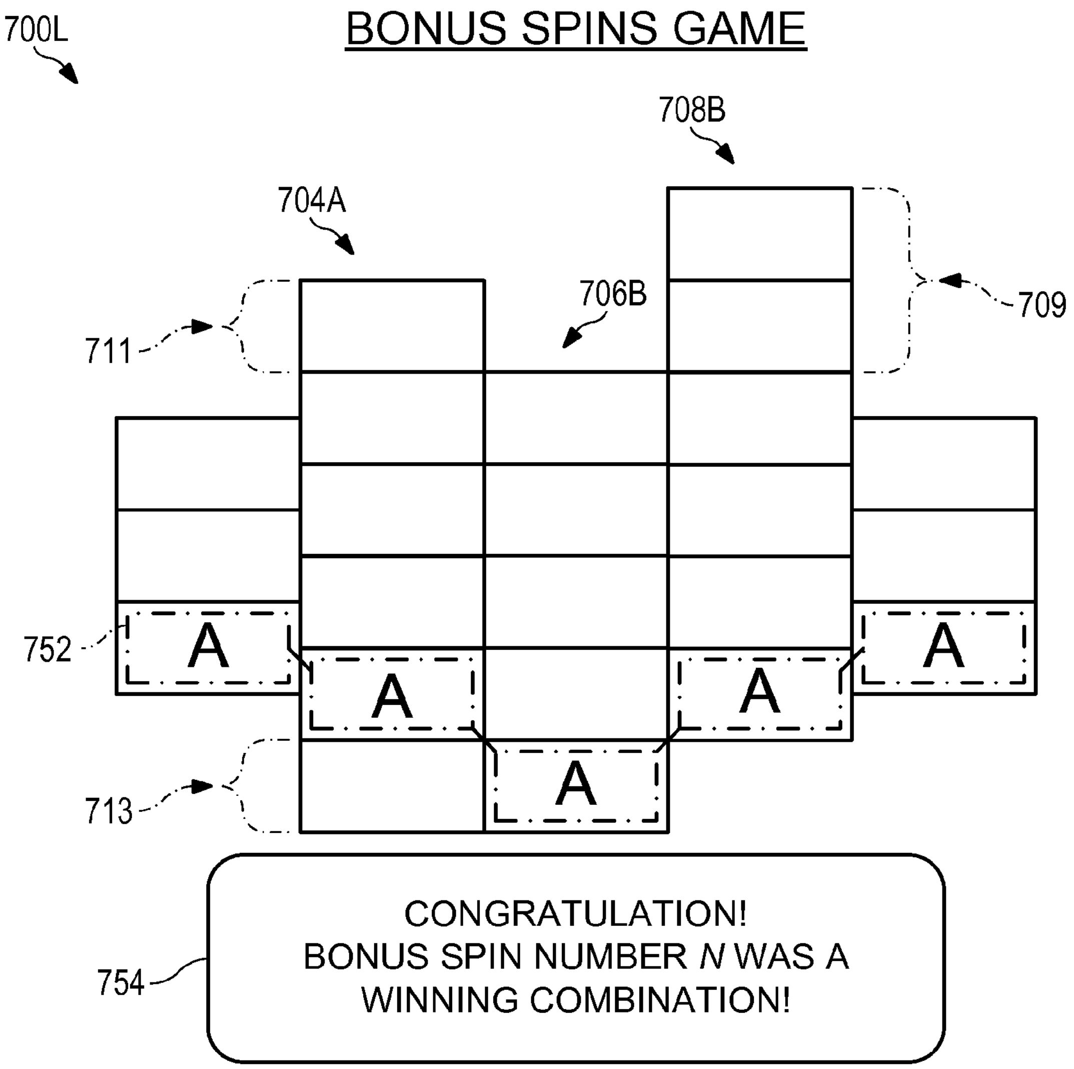
FIG. 7L is another illustration of bonus game with extended reels on a gaming device, according to one embodiment.
Figure 7M:
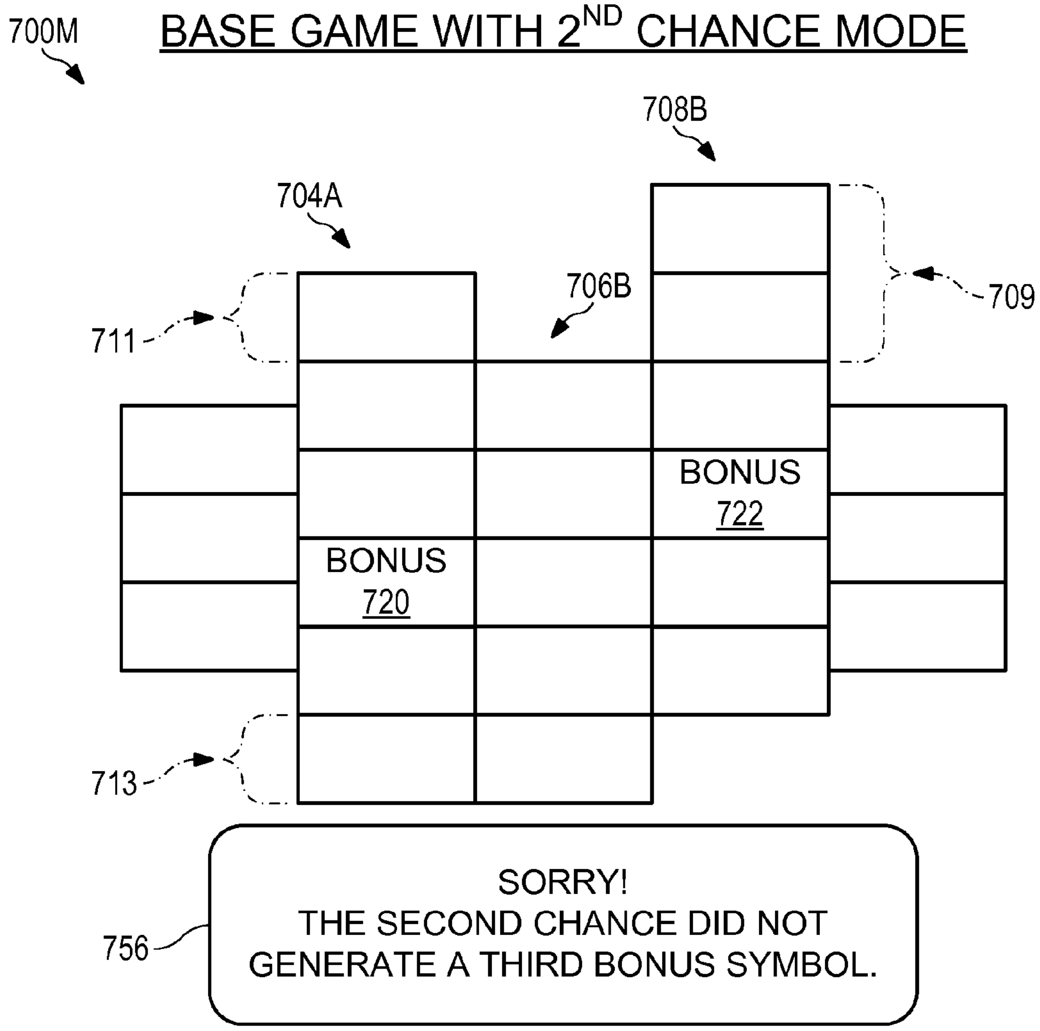
FIG. 7M is another illustration of a base game with a second chance base game on a gaming device, according to one embodiment.

In FIG. 7K, a bonus game play is shown, according to one embodiment. A third bonus game play image 700K may include a base game area (the area utilized in FIG. 6F) which is utilized with a first expanded reel area 709, a second expanded reel area 711, and a third expanded reel area 713 are displayed and/or become active display areas which may be utilized to form a winning outcome. In this example, first expanded reel area 709 added two reel areas at the top of fourth active display area 708 to form an expanded fourth active display area 708B. Second expanded reel area 711 added one reel area at the top of second active display area 704 and third expanded reel area 713 added one reel area at the bottom of second active display area 704 to form an expanded second active display area 704A. Further, third expanded reel area 713 added one reel area to third active display area 706 to form an expanded third active display area 706B. In should be noted that the active display areas may be expanded in an upward direction, a downward direction, to the right, to the left, in a 3D mode (e.g., upwards and/or out of the display area and/or downwards into the display area), and/or any combination thereof. In another example, the active display areas may be expanded based on a predetermined pattern, the location of one or more non-bonus symbols, the location of bonus symbols, the wager amount, an interaction between two or more symbols (e.g., a first symbol location versus a second symbol location, a path from a first symbol location to a second symbol location, a path of a presentation from the first symbol location to the second symbol location, etc.), and/or any combination thereof. In this example, a first winning outcome 748 included three A symbols in the base game area (the area utilized in FIG. 6F) and one A symbol in the extended display reel area (e.g., expanded fourth active display area 708B) to form a winning outcome with 4 A symbols which had a first prize amount. It should be noted that if the bonus game did not include the expanded areas, then the first winning outcome 748 may have included only three A symbols in the base game area (the area utilized in FIG. 6F) which had a second prize amount which would be less than the first prize amount. In another example, the first winning outcome 748 may not have been a winning outcome if the extended display reel areas were not utilized when game play requires that four A symbols are generated to form a winning outcome. In FIG. 7L, another bonus game play is shown, according to one embodiment. A second bonus game play image 700L may include a base game area (the area utilized in FIG. 6F) is utilized with a first expanded reel area 709, a second expanded reel area 711, and a third expanded reel area 713 are displayed and/or become active display areas which may be utilized to form a winning outcome. In this example, a second winning outcome 752 included four A symbols in the base game area (the area utilized in FIG. 6F) and one A symbol in the extended display reel areas to form a winning outcome with 5 A symbols which had a first prize amount. It should be noted that if the bonus game did not include the expanded areas, then the second winning outcome 752 may have included only four A symbols in the base game area (the area utilized in FIG. 6F) which may not have had a second prize amount because the 4 A symbols were not connected. Further, the second winning outcome 752 may be less than the first prize amount.

Figure 7N:
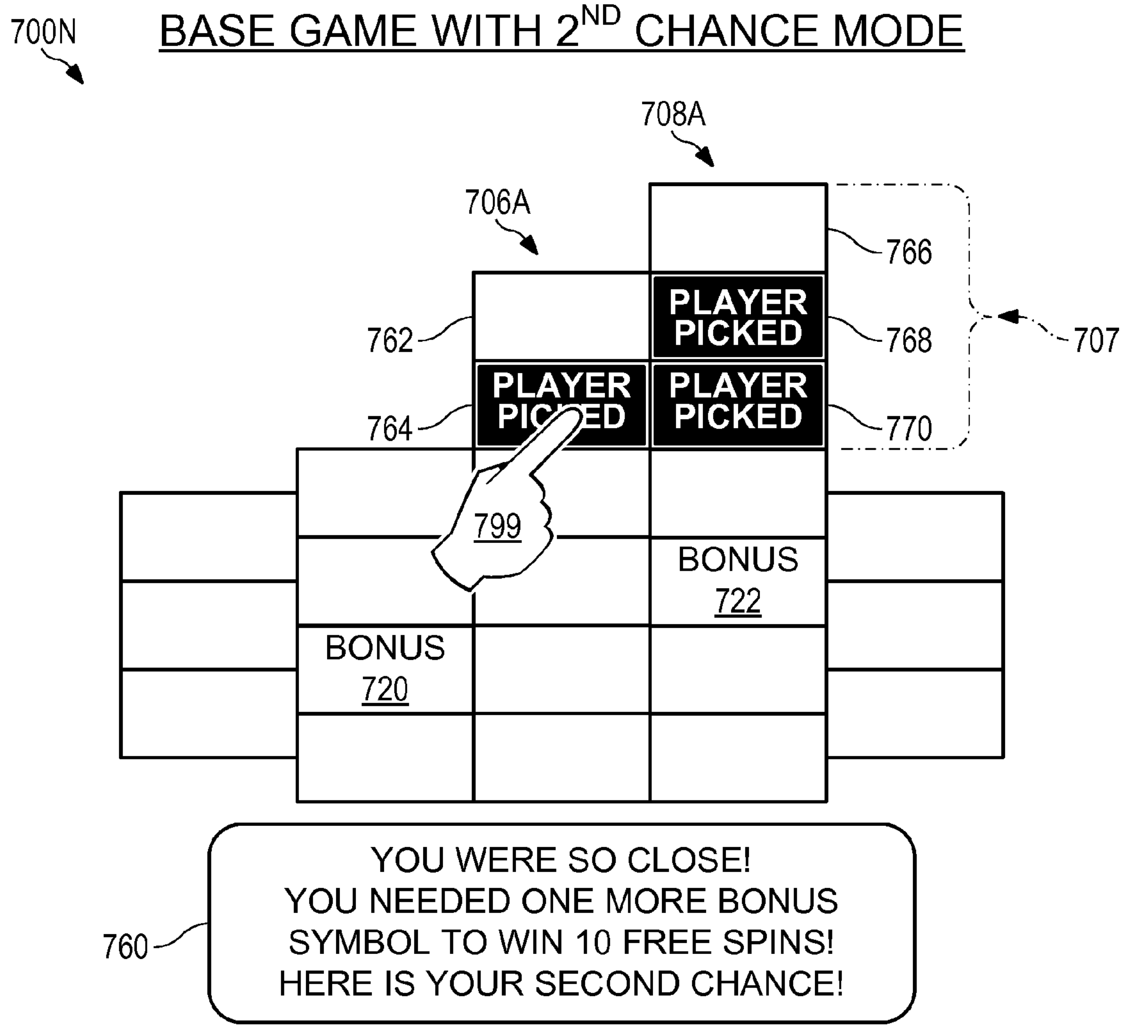
FIG. 7N is another illustration of a base game with a second chance base game on a gaming device, according to one embodiment.
Figure 7P:
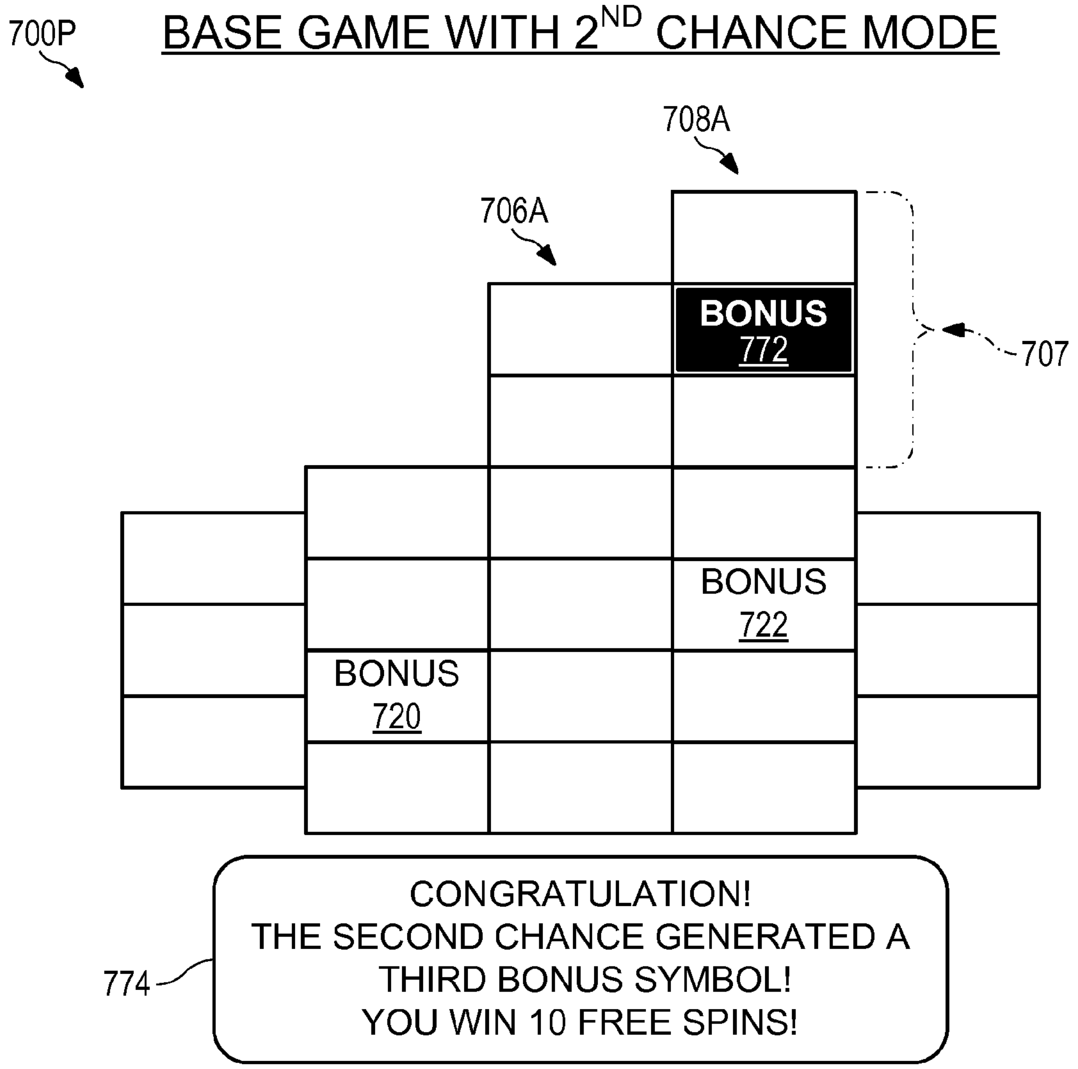
FIG. 7P is another illustration of a base game with a second chance base game on a gaming device, according to one embodiment.

In FIG. 7N, another illustration of second chance base game play on a gaming device is shown, according to one embodiment. An eighth electronic display area image 700N may show base game where first bonus symbol 720 and second bonus symbol 722 were displayed during a base game which did not trigger a bonus game because three bonus symbols are required to trigger the bonus game. Please note that any number of bonus symbols may be required and that 3 are being utilized throughout this disclosure for clarity purposes only. Further, eighth electronic display area image 700N may show base game play entering a second chance base game play mode (e.g., a secondary base game mode) where extended display reel area 707 was in an inactive state (e.g., could not be utilized to form a winning outcome and/or utilizing bonus symbols to trigger a bonus game play, etc.) before the second chance base game play mode and/or before the extended display reel area 707 was shown. In this example, the extended display reel area 707 has increased the third active display area 706 by 2 reel spaces and created an expanded third active display area 706A. Further, the extended display reel area 707 has increased the fourth active display area 708 by 3 reel spaces and created an expanded fourth active display area 708A. These extended and/or expanded areas may now be utilized to form one or more winning payline outcomes and/or to obtain addition bonus symbols to trigger a bonus game. In this embodiment of the second chance base game play mode, the player is allowed to select one or more reel areas in the extended display reel area 707 to reveal one or more symbols in these selected areas. In this example, the player may select a first extended reel display area 762, a second extended reel display area 764, a third extended reel display area 766, a fourth extended reel display area 768, and/or a fifth extended reel display area 770. In this example, the player was allowed to select three extended reel display areas and the player selected 799 second extended reel display area 764, fourth extended reel display area 768, and fifth extended reel display area 770. In various examples, the player may be allowed to select one, a few, a plurality, and/or all of the extended reel display areas. In this example, the selection of the fourth extended reel display area 768 was successful because a third bonus symbol 772 was located in this reel position, whereas, no bonus symbols were located in second extended reel display area 764 and fifth extended reel display area 770. Based on the third bonus symbol 772 being selected, the system, device, and/or method generated and/or initiated a bonus game (see FIG. 7P). In another example shown in FIG. 7S, the third bonus symbol is not located in second extended reel display area 764, fourth extended reel display area 768, and/or fifth extended reel display area 770 and the system, device, and/or method does not generate a bonus game. In one example, the system, device, and/or method may show the values of the non-selected areas. In another example, the system, device, and/or method may not show the values of the non-selected areas. The examples shown in FIGS. 7N, P, and S may be utilized for base game play with second chance mode game play.

Figure 7Q:
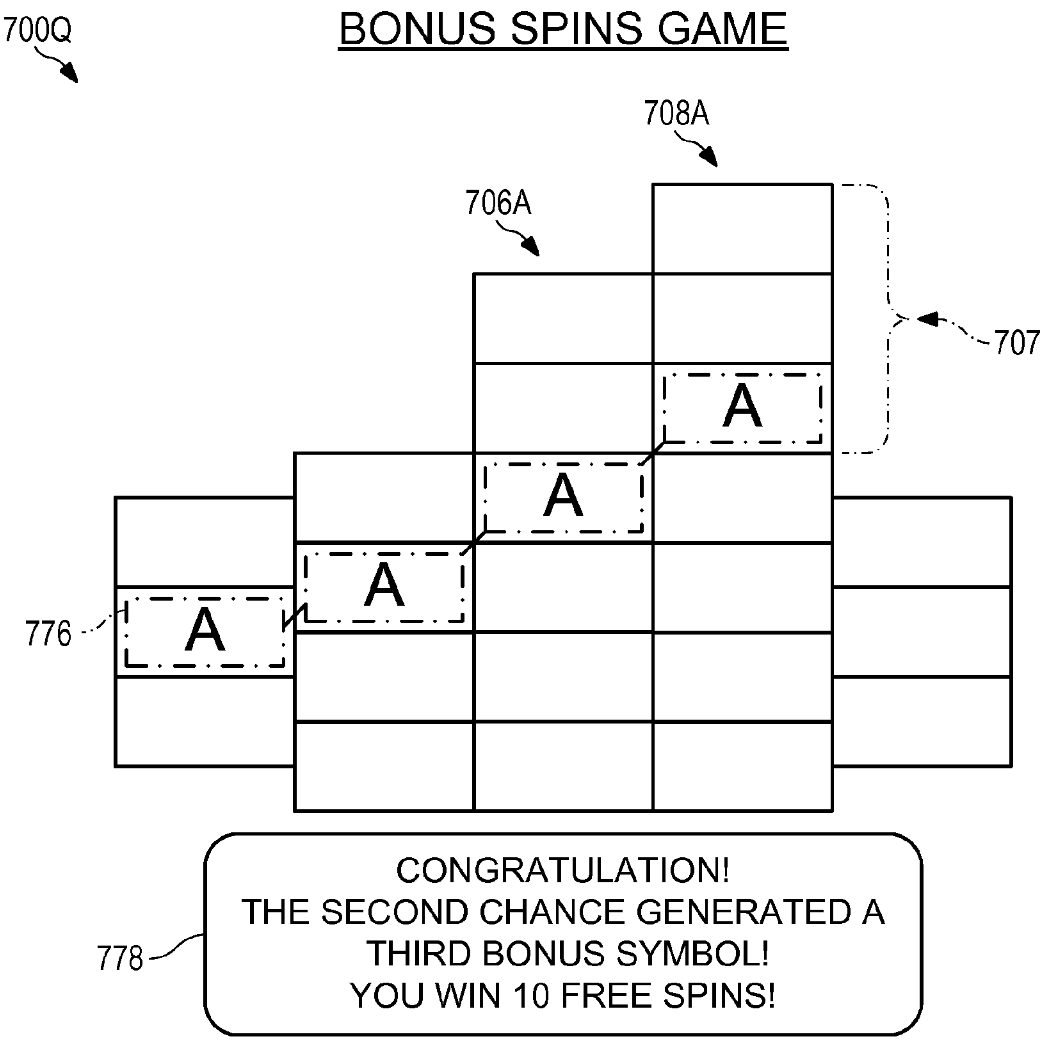
FIG. 7Q is an illustration of bonus game with extended reels on a gaming device, according to one embodiment.
Figure 7R:
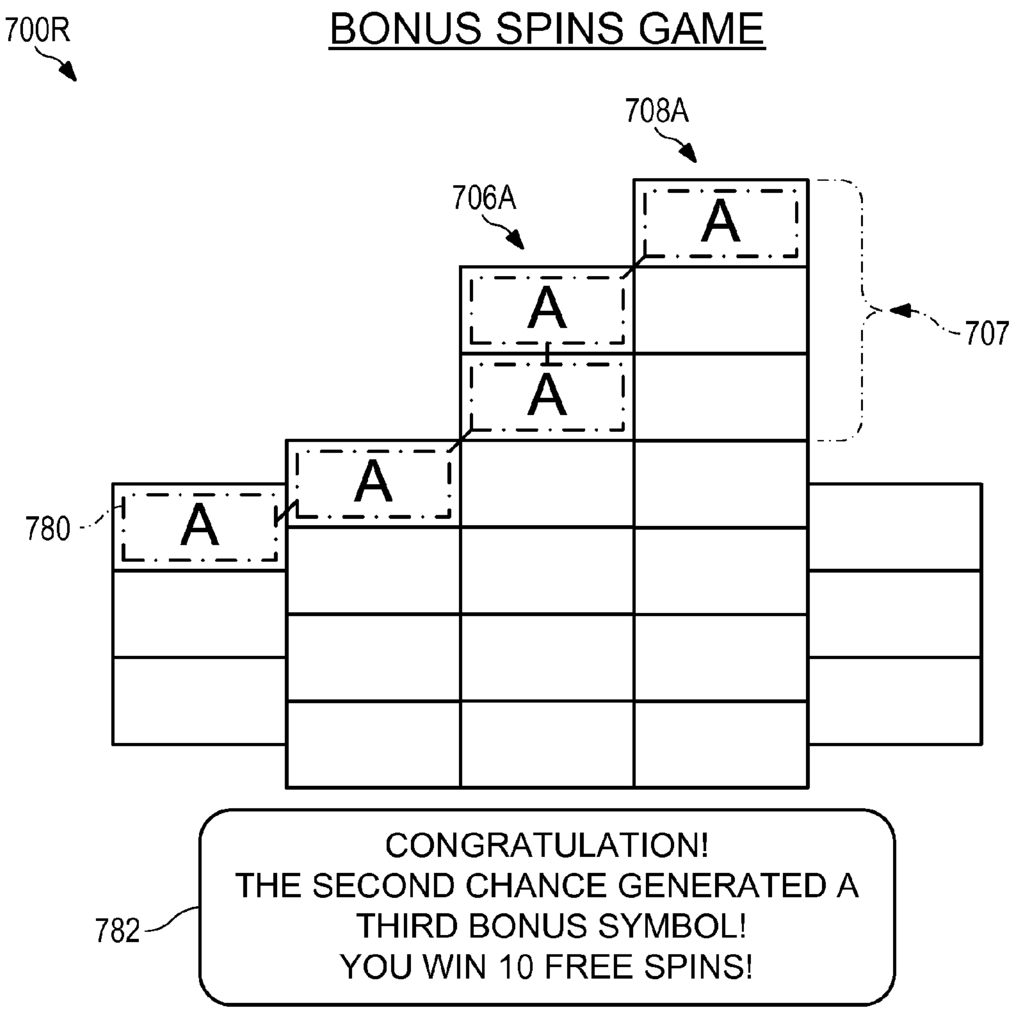
FIG. 7R is another illustration of bonus game with extended reels on a gaming device, according to one embodiment.
Figure 7S:
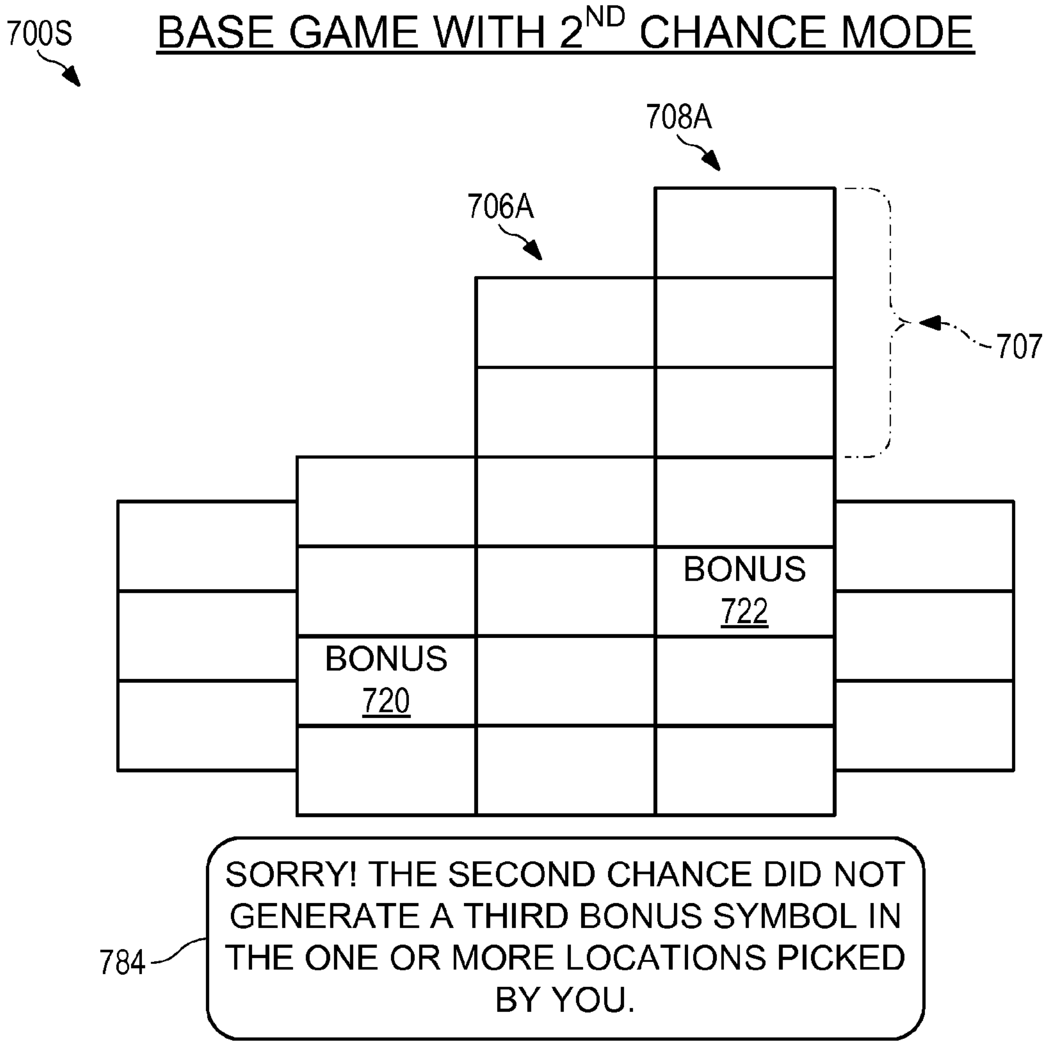
FIG. 7S is another illustration of a base game with a second chance base game on a gaming device, according to one embodiment.

In FIG. 7Q, a bonus game play is shown, according to one embodiment. A first bonus game play image 700Q may include a base game area (the area utilized in FIG. 6F) which is utilized with extended display reel area 707 during a bonus game play. In this example, the extended display reel area 707 has increased the third active display area 706 by 2 reel spaces and created an expanded third active display area 706A. Further, the extended display reel area 707 has increased the fourth active display area 708 by 3 reel spaces and created an expanded fourth active display area 708A. These extended and/or expanded areas may now be utilized to form one or more winning payline outcomes. In this example, a first winning outcome 776 included three A symbols in the base game area (the area utilized in FIG. 6F) and one A symbol in the extended display reel area 707 to form a winning outcome with 4 A symbols which had a first prize amount. It should be noted that if the bonus game did not include the expanded areas, then the first winning outcome 776 may have included only three A symbols in the base game area (the area utilized in FIG. 6F) which had a second prize amount which would be less than the first prize amount. In another example, the first winning outcome 776 may not have been a winning outcome if the extended display reel area 707 was not utilized when game play requires that four A symbols are generated to form a winning outcome. In FIG. 7R, another bonus game play is shown, according to one embodiment. A second bonus game play image 700R may include a base game area (the area utilized in FIG. 6F) which is utilized with extended display reel area 707 during a bonus game play. In this example, the extended display reel area 707 has increased the third active display area 706 by 2 reel spaces and created an expanded third active display area 706A. Further, the extended display reel area 707 has increased the fourth active display area 708 by 3 reel spaces and created an expanded fourth active display area 708A. These extended and/or expanded areas may now be utilized to form one or more winning payline outcomes. In this example, a second winning outcome 780 included two A symbols in the base game area (the area utilized in FIG. 6F) and three A symbols in the extended display reel area 707 to form a winning outcome with 5 A symbols which had a first prize amount. It should be noted that if the bonus game did not include the expanded areas, then the second winning outcome 780 may have included only two A symbols in the base game area (the area utilized in FIG. 6F) which had a second prize amount which would be less than the first prize amount. In another example, the second winning outcome 780 may not have been a winning outcome if the extended display reel area 707 was not utilized when game play requires that three A symbols are generated to form a winning outcome.

Figure 7T:
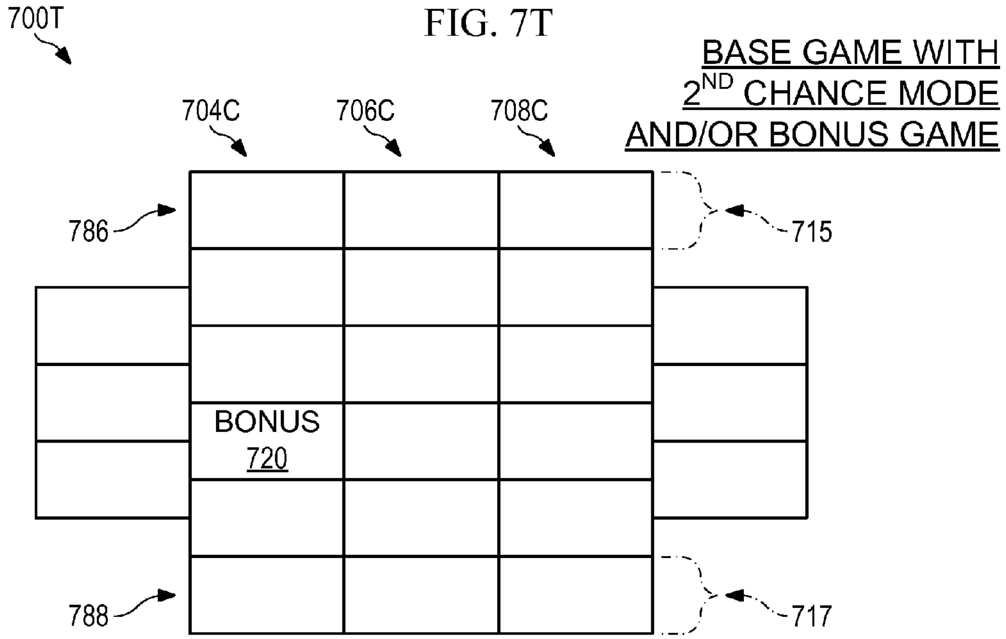
FIG. 7T is an illustration of a base game, a second chance base game, and/or a bonus game structure on a gaming device, according to one embodiment.

In FIG. 7T, another illustration of second chance base game play on a gaming device is shown, according to one embodiment. A second chance base game play image 700T includes a first top level expanding reel area 715 and a first bottom level expanding reel area 717. In this example, the first top level expanding reel area 715 and the first bottom level expanding reel area 717 may be one level (e.g., one reel space—reference numbers 786 and 788) based on only one bonus symbol (e.g., a first bonus symbol 720) being generated and/or displayed during a base game. In this example, an expanded second active display area 704C, an expanded third active display area 706C, and an expanded fourth active display area 708C have two extra reel spaces (e.g., one reel space above and one reel space below) that were not active during base game play. These two extra reel spaces on each of these expanded display areas (e.g., expanded second active display area 704C, expanded third active display area 706C, and/or expanded fourth active display area 708C) may be utilized to obtain the additional bonus symbols needed to generate and/or initiate a bonus game and/or complete one or more winning combinations on one or more pay lines. Further, the expanded areas may only be on the reel where first bonus symbol 720 was shown (e.g., second active display area 704). The examples shown in FIG. 7T may be utilized for: base game play; base game play with second chance mode game play; base game play with bonus game play; and/or base game play with second chance mode game play and bonus game play.

Figure 7U:
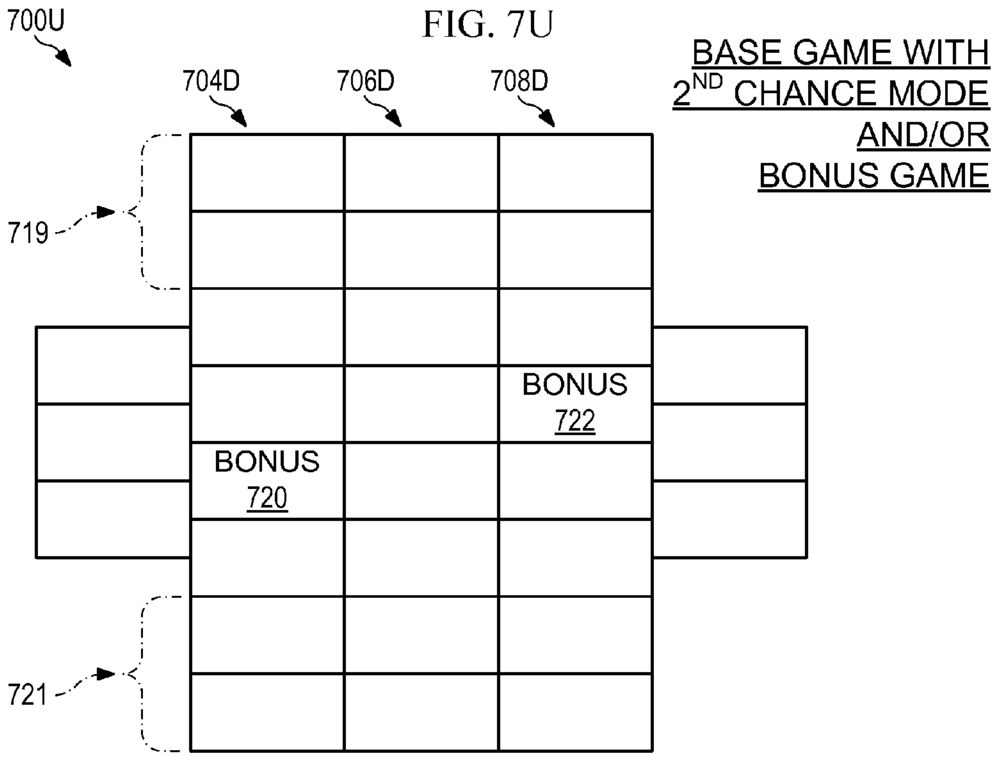
FIG. 7U is another illustration of a base game, a second chance base game, and/or a bonus game structure on a gaming device, according to one embodiment.

In FIG. 7U, another illustration of second chance base game play on a gaming device is shown, according to one embodiment. A second chance base game play image 700U includes a second top level expanding reel area 719 and a second bottom level expanding reel area 721. In this example, the second top level expanding reel area 719 and the second bottom level expanding reel area 721 may be two levels (e.g., two reel spaces) based on two bonus symbols (e.g., a first bonus symbol 720 and a second bonus symbol 722) being generated and/or displayed during a base game. In this example, an expanded second active display area 704D, an expanded third active display area 706D, and an expanded fourth active display area 708D have four extra reel spaces (e.g., two reel spaces above and two reel spaces below) that were not active during base game play. These four extra reel spaces on each of these expanded display areas (e.g., expanded second active display area 704D, expanded third active display area 706D, and/or expanded fourth active display area 708D) may be utilized to obtain the additional bonus symbols needed to generate and/or initiate a bonus game and/or complete one or more winning combinations on one or more pay lines. Further, the expanded areas may only be on reels where first bonus symbol 720 and second bonus symbol 722 where shown (e.g., second active display area 704 and fourth active display area 708). The examples shown in FIG. 7U may be utilized for: base game play; base game play with second chance mode game play; base game play with bonus game play; and/or base game play with second chance mode game play and bonus game play.

Figure 7V:
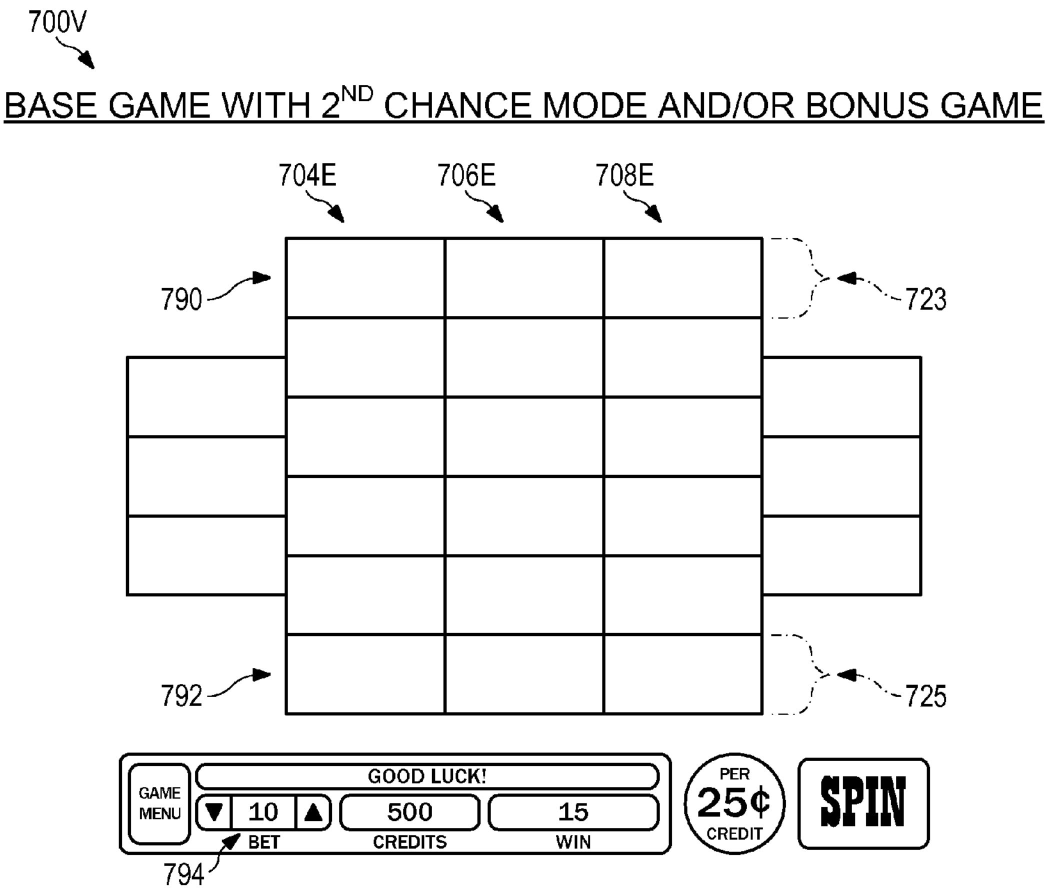
FIG. 7V is another illustration of a base game, a second chance base game, and/or a bonus game structure on a gaming device, according to one embodiment.

In FIG. 7V, another illustration of second chance base game play on a gaming device is shown, according to one embodiment. A second chance base game play mode image 700V may show a first top level expanding reel area 723 and a first bottom level expanding reel area 725. In this example, the first top level expanding reel area 723 and the first bottom level expanding reel area 725 may be one level (e.g., one reel space—reference numbers 790 and 792) based on a first wagering amount 794 (e.g., 10 credits) utilized during a base game. In this example, an expanded second active display area 704E, an expanded third active display area 706E, and an expanded fourth active display area 708E have two extra reel spaces (e.g., one reel space above and one reel space below) that were not active during base game play. These two extra reel spaces on each of these expanded display areas (e.g., expanded second active display area 704E, expanded third active display area 706E, and/or expanded fourth active display area 708E) may be utilized to obtain the additional bonus symbols needed to generate and/or initiate a bonus game and/or complete one or more winning combinations on one or more pay lines. The examples shown in FIG. 7V may be utilized for: base game play; base game play with second chance mode game play; base game play with bonus game play; and/or base game play with second chance mode game play and bonus game play.

Figure 7W:
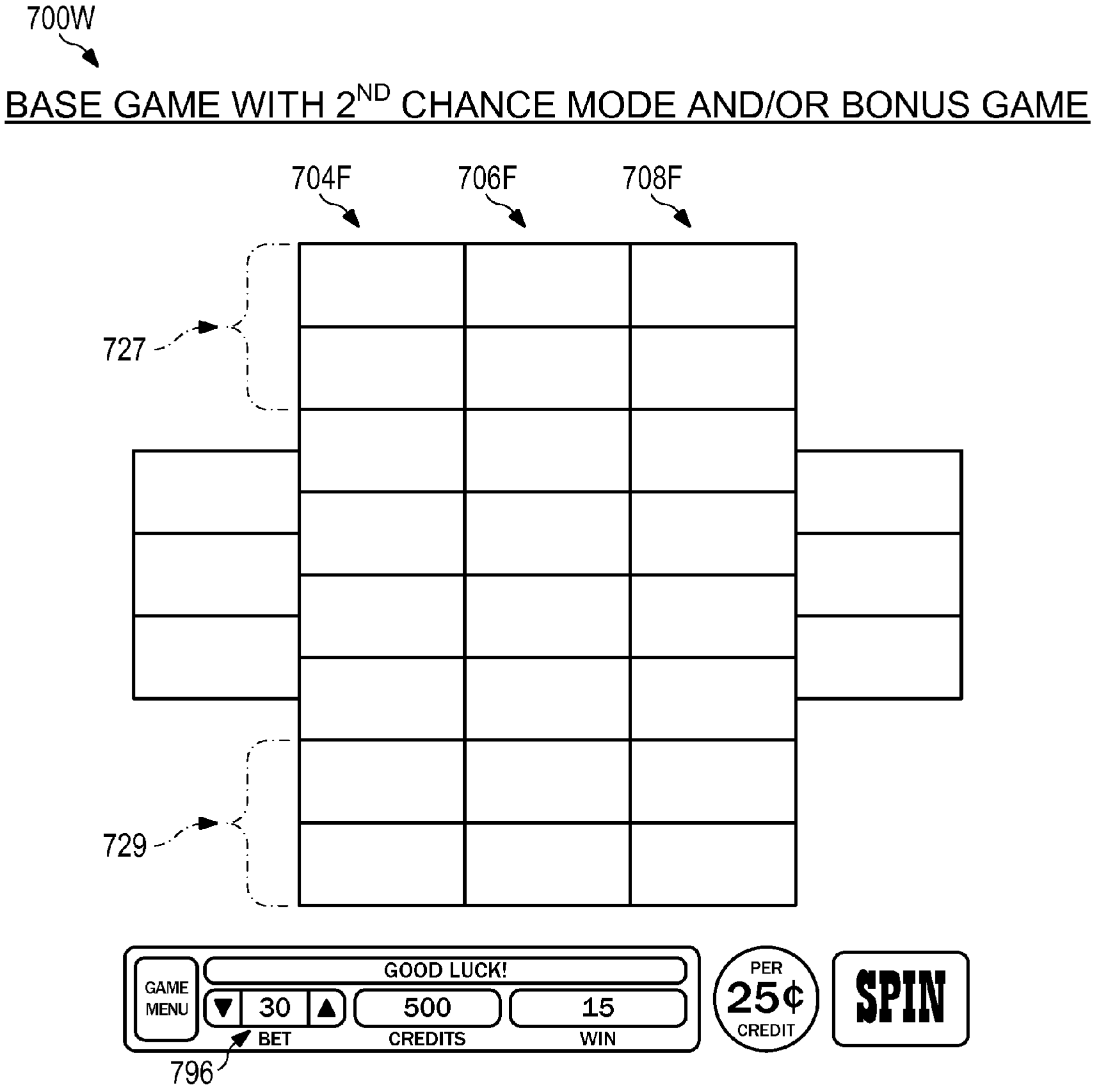
FIG. 7W is another illustration of a base game, a second chance base game, and/or a bonus game structure on a gaming device, according to one embodiment.

In FIG. 7W, another illustration of second chance base game play on a gaming device is shown, according to one embodiment. A second chance base game play mode image 700W includes a second top level expanding reel area 727 and a second bottom level expanding reel area 729. In this example, the second top level expanding reel area 727 and the second bottom level expanding reel area 729 may be two levels (e.g., two reel spaces) based on a second wagering amount 796 (e.g., 30 credits) utilized during a base game. In this example, an expanded second active display area 704F, an expanded third active display area 706F, and an expanded fourth active display area 708F have four extra reel spaces (e.g., two reel spaces above and two reel spaces below) that were not active during base game play. These four extra reel spaces on each of these expanded display areas (e.g., expanded second active display area 704F, expanded third active display area 706F, and/or expanded fourth active display area 708F) may be utilized to obtain the additional bonus symbols needed to generate and/or initiate a bonus game and/or complete one or more winning combinations on one or more pay lines. The examples shown in FIG. 7W may be utilized for: base game play; base game play with second chance mode game play; base game play with bonus game play; and/or base game play with second chance mode game play and bonus game play.

Figure 7X:
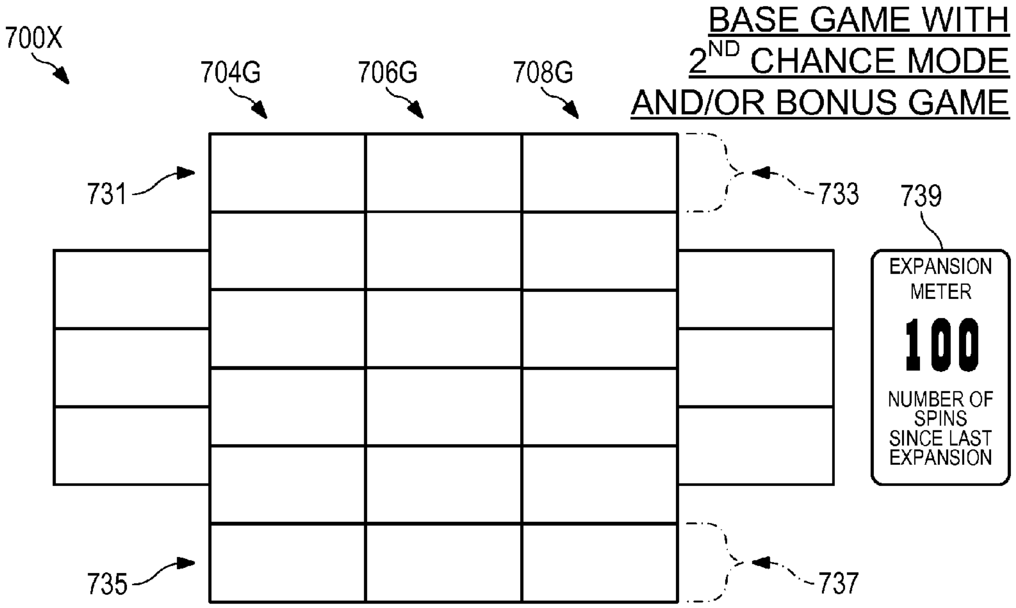
FIG. 7X is another illustration of a base game, a second chance base game, and/or a bonus game structure on a gaming device, according to one embodiment.

In FIG. 7X, another illustration of second chance base game play on a gaming device is shown, according to one embodiment. A second chance base game play mode image 700X may show a first top level expanding reel area 733 and a first bottom level expanding reel area 737. In this example, the first top level expanding reel area 733 and the first bottom level expanding reel area 737 may be one level (e.g., one reel space—reference numbers 731 and 735) based on a first expansion meter amount 739. In this example, an expanded second active display area 704G, an expanded third active display area 706G, and an expanded fourth active display area 708G have two extra reel spaces (e.g., one reel space above and one reel space below) that were not active during base game play. These two extra reel spaces on each of these expanded display areas (e.g., expanded second active display area 704G, expanded third active display area 706G, and/or expanded fourth active display area 708G) may be utilized to obtain the additional bonus symbols needed to generate and/or initiate a bonus game and/or complete one or more winning combinations on one or more pay lines. First expansion meter amount 739 may be increased by a unit (e.g., 1, 5, 10, etc.) based on a base game play and/or spin which does not include a secondary base game mode. As first expansion meter amount 739 increases, the number of expanded areas which will be activated during a secondary base game increases (once the secondary base game is finally triggered). The examples shown in FIG. 7X may be utilized for: base game play; base game play with second chance mode game play; base game play with bonus game play; and/or base game play with second chance mode game play and bonus game play.

Figure 7Y:
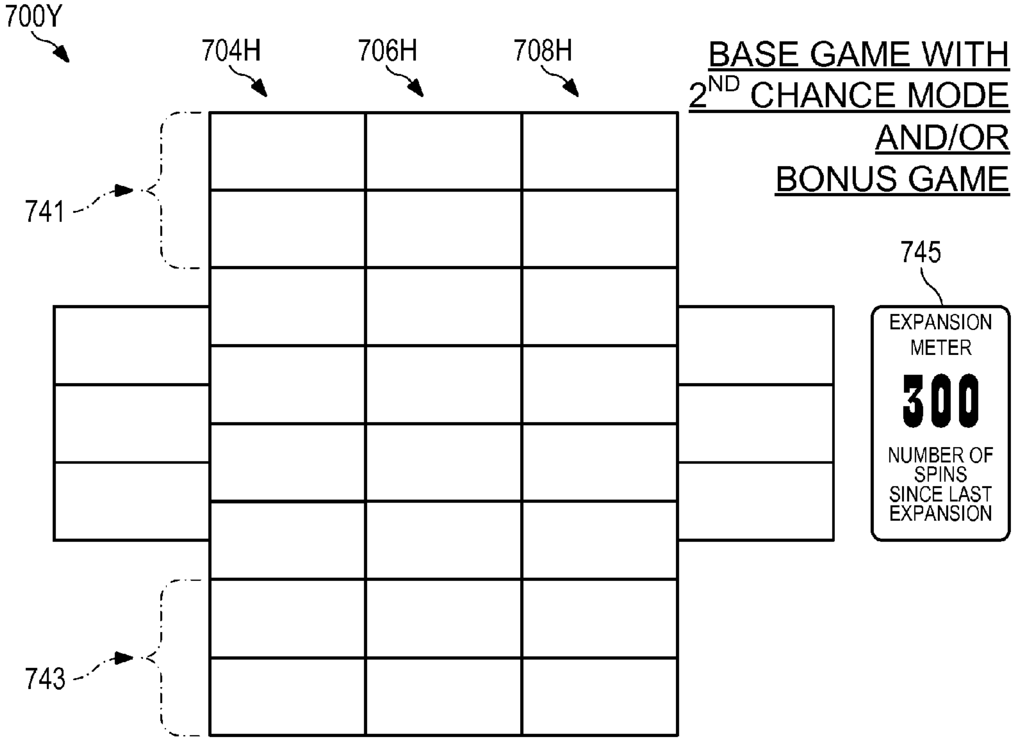
FIG. 7Y is another illustration of a base game, a second chance base game, and/or a bonus game structure on a gaming device, according to one embodiment.

In FIG. 7Y, another illustration of second chance base game play on a gaming device is shown, according to one embodiment. A second chance base game play mode image 700Y includes a second top level expanding reel area 741 and a second bottom level expanding reel area 743. In this example, the second top level expanding reel area 741 and the second bottom level expanding reel area 743 may be two levels (e.g., two reel spaces) based on a second expansion meter amount 745. In this example, an expanded second active display area 704H, an expanded third active display area 706H, and an expanded fourth active display area 708H have four extra reel spaces (e.g., two reel spaces above and two reel spaces below) that were not active during base game play. These four extra reel spaces on each of these expanded display areas (e.g., expanded second active display area 704H, expanded third active display area 706H, and/or expanded fourth active display area 708H) may be utilized to obtain the additional bonus symbols needed to generate and/or initiate a bonus game and/or complete one or more winning combinations on one or more pay lines. Second expansion meter amount 745 has increased to 300 from 100 (see FIG. 7X). Since the secondary base game has been triggered, the expanded areas are based on the value of the second expansion meter amount 745 which was 300. Further, the second expansion meter amount 745 may now be reset (e.g., 0, 1, etc.) based on the triggering of the secondary base game mode. The examples shown in FIG. 7Y may be utilized for: base game play; base game play with second chance mode game play; base game play with bonus game play; and/or base game play with second chance mode game play and bonus game play.

Figure 8A:
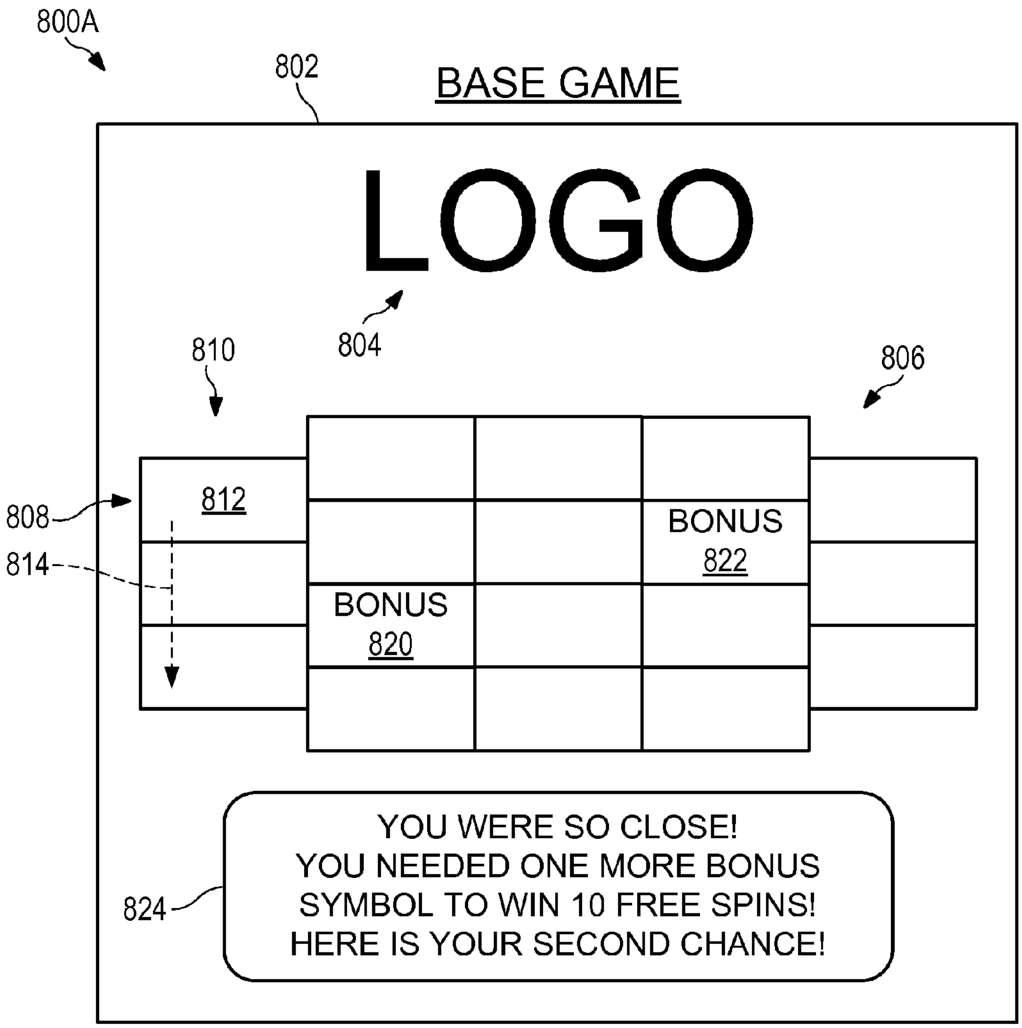
FIG. 8A is an illustration of a base game on a gaming device, according to one embodiment.
Figure 8B:
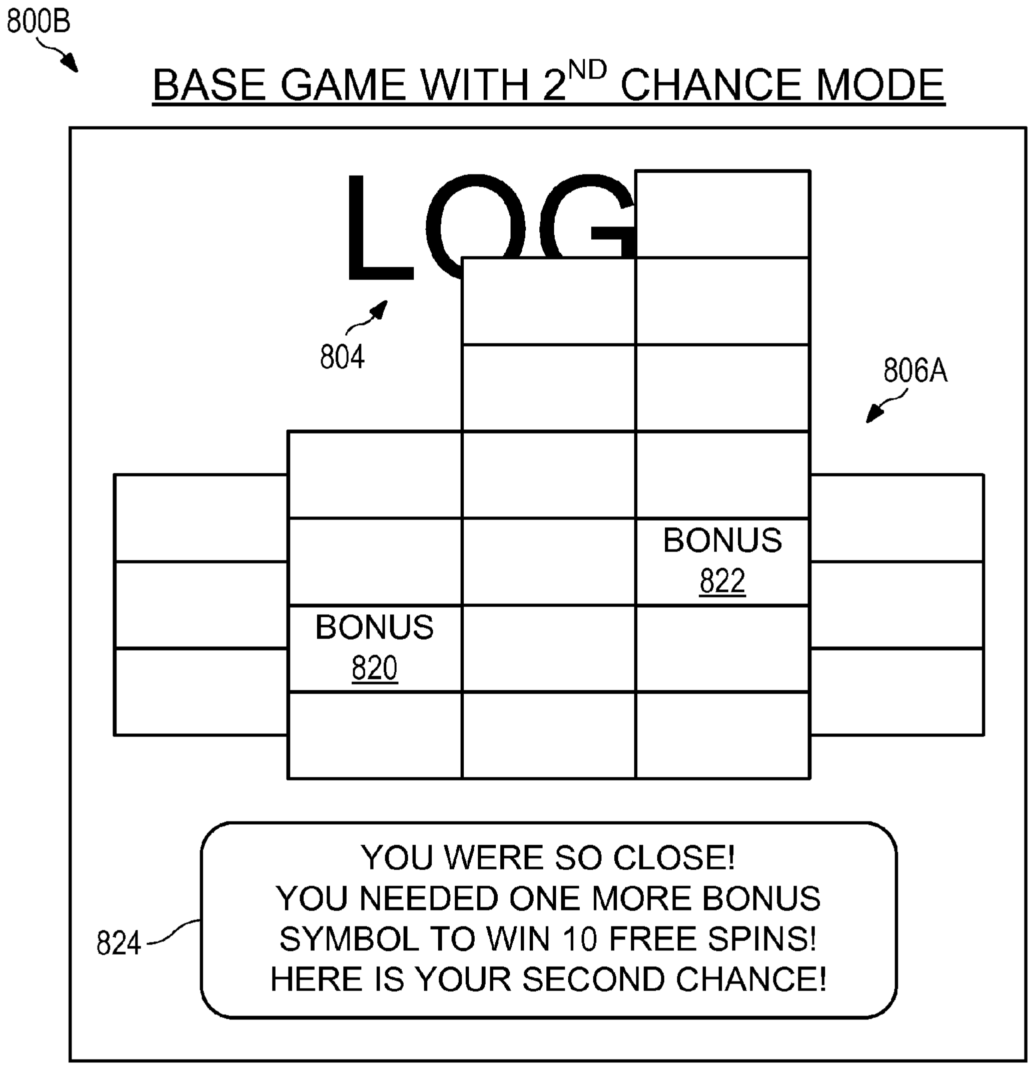
FIG. 8B is an illustration of a base game with a second chance base game on a gaming device, according to one embodiment.

In FIG. 8A, another illustration of second chance base game play on a gaming device is shown, according to one embodiment. A base game mode image 800A may include an electronic gaming device 802 with a logo 804, one or more display areas 806, one or more display areas 808 (on one or more reels 810), one or more non-bonus display symbols 812 (which are spun 814 and/or moved), a first bonus symbol 820, a second bonus symbol 824, and a message 824. In this example, the logo 804 may be a corporation's name, a game's name, and/or any other advertisement data. The logo 804 may be shown in full during a base game and then either shown in a partial view during a second chance game mode (see FIG. 8B) and/or in a full during a second chance game mode. Further, the logo 804 may be moved during the second chance game mode (e.g., secondary base game play mode).

Figure 9A:
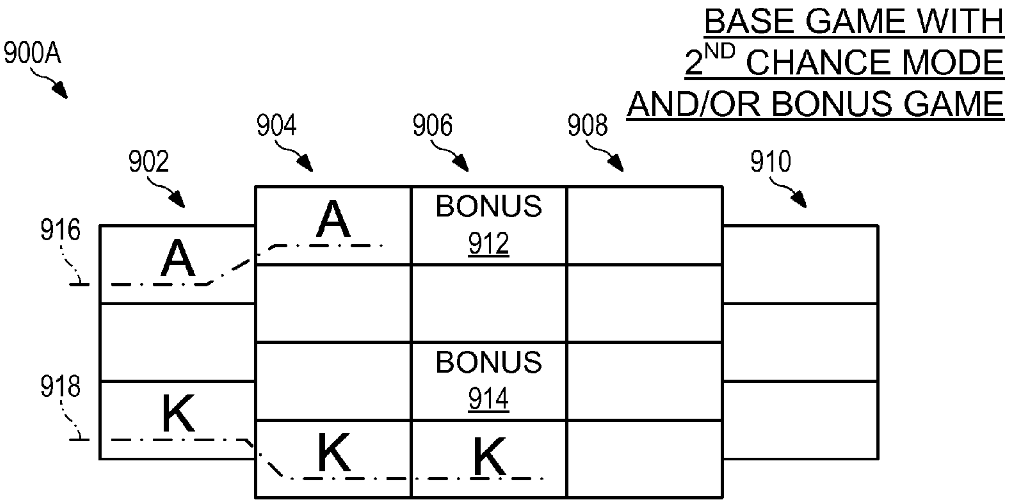
FIG. 9A is another illustration of a base game, a second chance base game, and/or a bonus game structure on a gaming device, according to one embodiment.
Figure 9B:
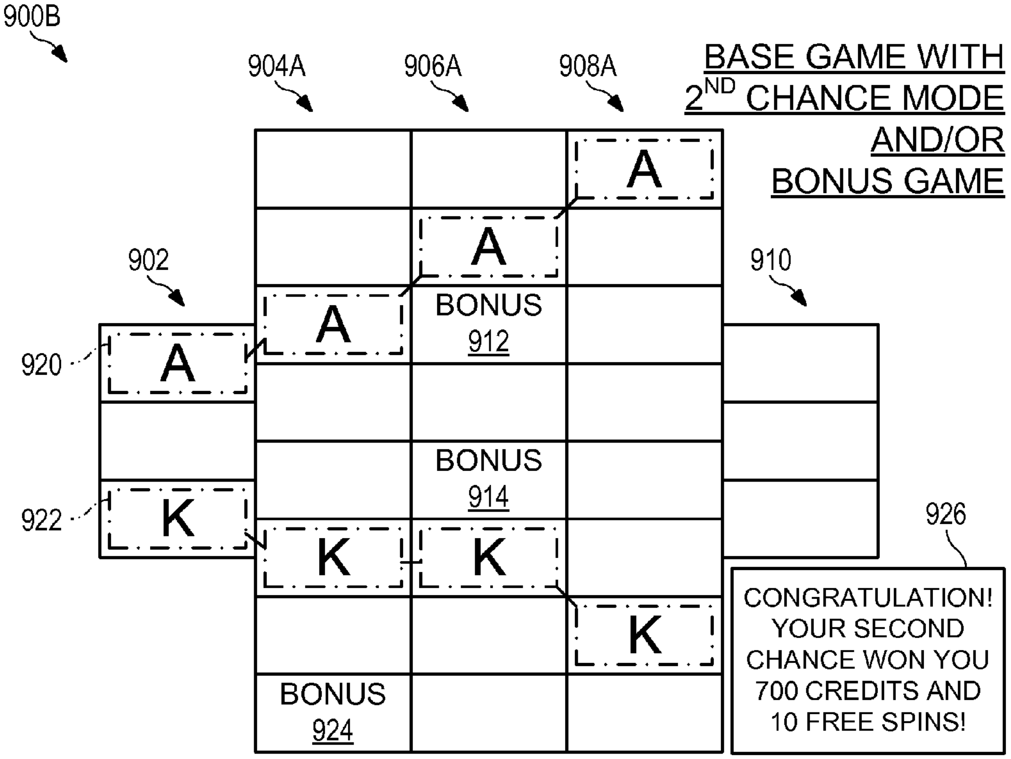
FIG. 9B is another illustration of a base game, a second chance base game, and/or a bonus game structure on a gaming device, according to one embodiment.

In FIG. 9A, another illustration of second chance base game play on a gaming device is shown, according to one embodiment. A base game image 900A may include a display area on an electronic gaming device with a first reel 902 (e.g., a first plurality of display areas), a second reel 904 (e.g., a second plurality of display areas), a third reel 906 (e.g., a third plurality of display areas), a fourth reel 908 (e.g., a fourth plurality of display areas), and an Nth reel (an Nth plurality of display areas). In this example, the game play has generated a first bonus symbol 912 and a second bonus symbol 914 which does not trigger a bonus game because three bonus symbols are required to trigger the bonus game in this example. Further, the game play has generated a non-winning outcome 916 (because at least 3 aces are required to generate a winning outcome on this payline) and a first king-based winning outcome 918 (because at least 3 kings are required to generate a winning outcome on this payline). In addition, the first king-based winning outcome 918 equals a first award (e.g., 50 credits). In this example, a second chance base game play mode was initiated (see FIG. 9B). A second chance base game play image 900B may include the first reel 902, an expanded second reel 904A, an expanded third reel 906A, an expanded fourth reel 908A, and the Nth reel 910. Expanded second reel 904A, expanded third reel 906A, and expanded fourth reel 908A each include four additional reel spaces (e.g., two reel spaces above the base game active reels and two reel spaces below the base game active reels) which are displayed and become active (e.g., can be utilized for bonus symbols and/or to form winning combinations and/or payouts) for game play. In this example, a third bonus symbol 924 was generated in the expanded reel spaces which triggered a bonus game. Further, a first ace-based winning outcome 920 is shown where four aces form a winning outcome—this four aces formation consist of two aces in the base game reels and two aces in the second chance expanded reel areas (see the top of expanded third reel 906A and expanded fourth reel 908A). In addition, the first king-based winning outcome 918 (which had three kings) has been increased to a second king-based winning outcome 922 (which has four kings) which had a second award value (e.g., 200 credits) because a fourth king was generated in the second chance expanded reel areas (see the bottom of expanded fourth reel 908A). A second chance base game play message 926 may state "CONGRATULATIONS! YOUR SECOND CHANCE WON YOU 700 CREDITS AND 10 FREE SPINS!" It should be noted that any prize amount and/or free spin amount and/or any other prize (e.g., multiplier, banked games, etc.) may be awarded. Further, the first king-based winning outcome 918 may be awarded and then the second king-based winning outcome 922 may be awarded. In this example, the first king-based winning outcome 918 may be awarded at the end of the base game while the second king-based winning outcome 922 may be awarded at the end of the secondary base game. In another example, only the higher second king-based winning outcome 922 may be awarded. The examples shown in FIGS. 9A-9B may be utilized for: base game play; base game play with second chance mode game play; base game play with bonus game play; and/or base game play with second chance mode game play and bonus game play.

Figure 10A:
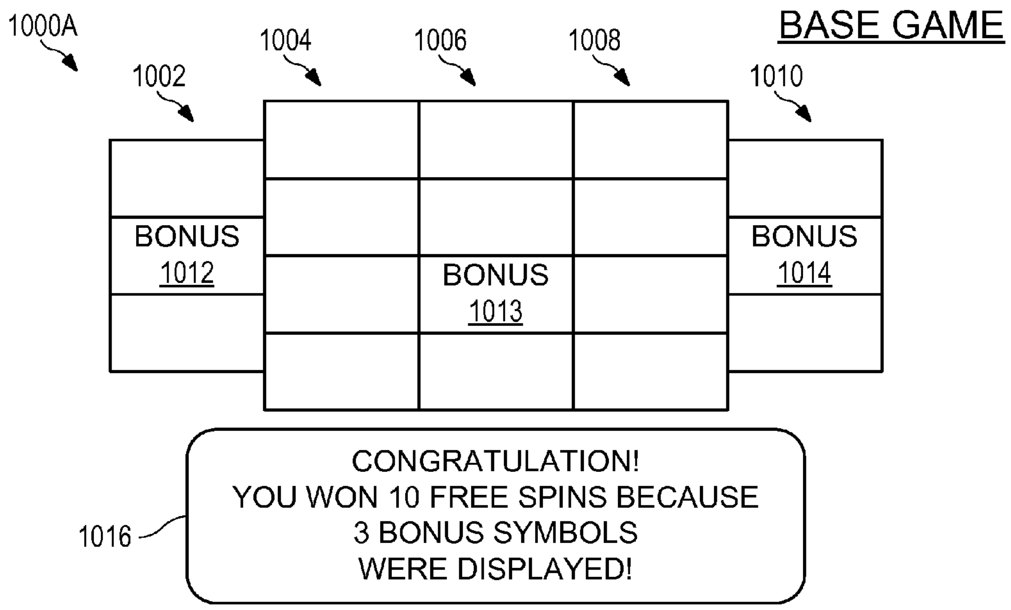
FIG. 10A is an illustration of a base game on a gaming device, according to one embodiment.

In FIG. 10A, another illustration of second chance base game play on a gaming device is shown, according to one embodiment. A first base game image 1000A includes a first reel 1002, a second reel 1004, a third reel 1006, a fourth reel 1008, and/or a fifth reel 1010 (and/or Nth reel). In this example of base game play, when a base game play results in a combination of 3 bonus symbols being located on first reel 1002, second reel 1004, third reel 1006, fourth reel 1008, and fifth reel 1010, a bonus game is triggered and/or initiated. This example is different than the examples shown in FIGS. 7A-7Y because all the reels may be utilized to generate the bonus symbol, instead of only reels 2-4, which were utilized in FIGS. 7A-7Y. In various embodiments, any number of reels (e.g., 1-N) may be utilized in any combination (e.g., 1, 3, and 5; 1, 2, and 3; 1 and 5; 3 only; 2, 4, and 5; 1, 2, 3, 7, and 10; . . . ; etc.). Referring back to FIG. 10A, the base game has generated a first bonus symbol 1012 located in the first reel 1002, a third bonus symbol 1013 located in the third reel 1006, and a second bonus symbol 1014 located in the fifth reel 1010 (and/or the Nth reel). Based on obtaining three bonus symbols, a bonus game was triggered and a message 1016 may state "CONGRATULATIONS! YOU WON 10 FREE SPINS BECAUSE 3 BONUS SYMBOLS WERE DISPLAYED!"

Figure 10B:
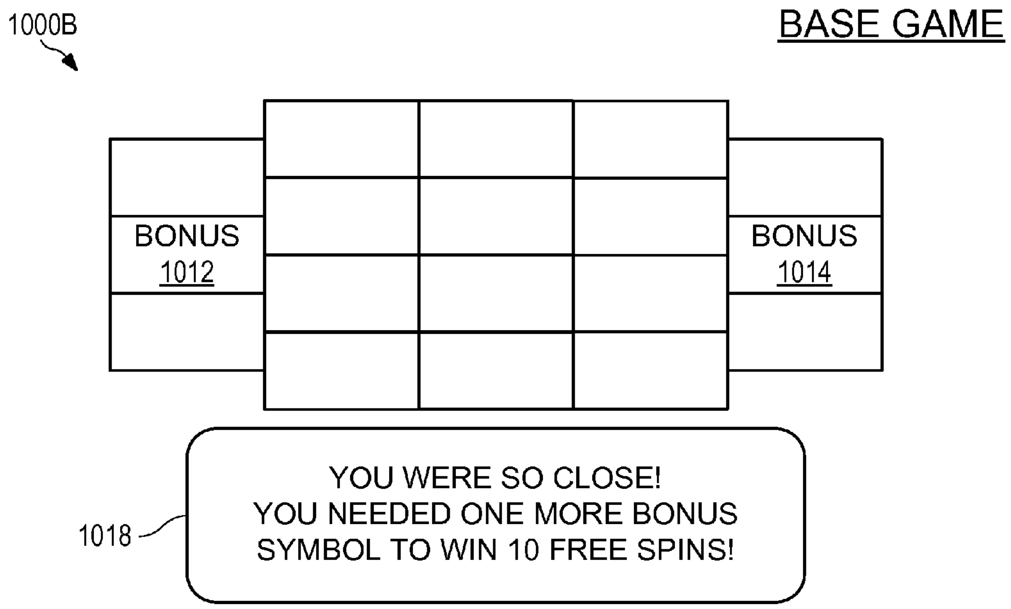
FIG. 10B is another illustration of a base game on a gaming device, according to one embodiment.

In FIG. 10B, another illustration of second chance base game play on a gaming device is shown, according to one embodiment. A second base game image 1000B may show that the first bonus symbol 1012 and the second bonus symbol 1014 were generated but that no bonus game was triggered because 3 bonus symbols are required to trigger the bonus game in this example. Any number (e.g., 1 to N) of bonus symbols and/or triggering events may be required. A base game message 1018 may state "YOU WERE SO CLOSE! YOU NEEDED ONE MORE BONUS SYMBOL TO WIN 10 FREE SPINS!"

Figure 10C:
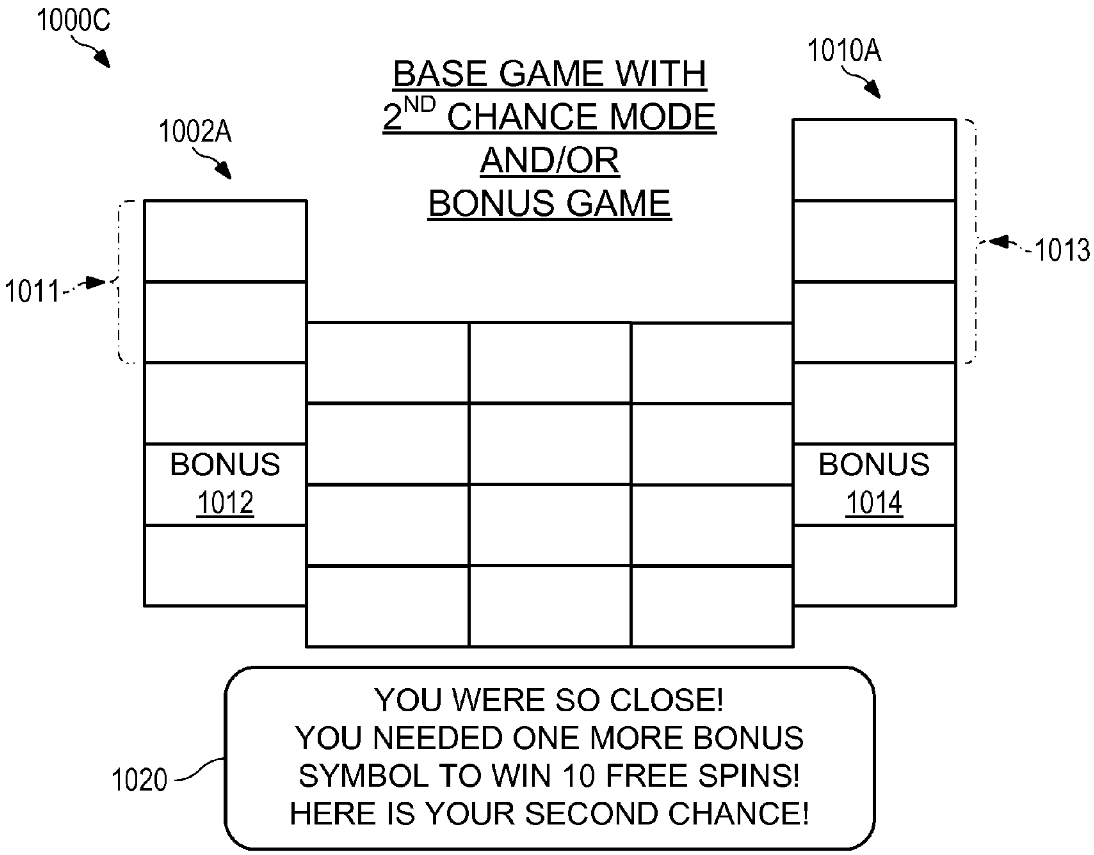
FIG. 10C is another illustration of a base game, a second chance base game, and/or a bonus game structure on a gaming device, according to one embodiment.
Figure 10D:
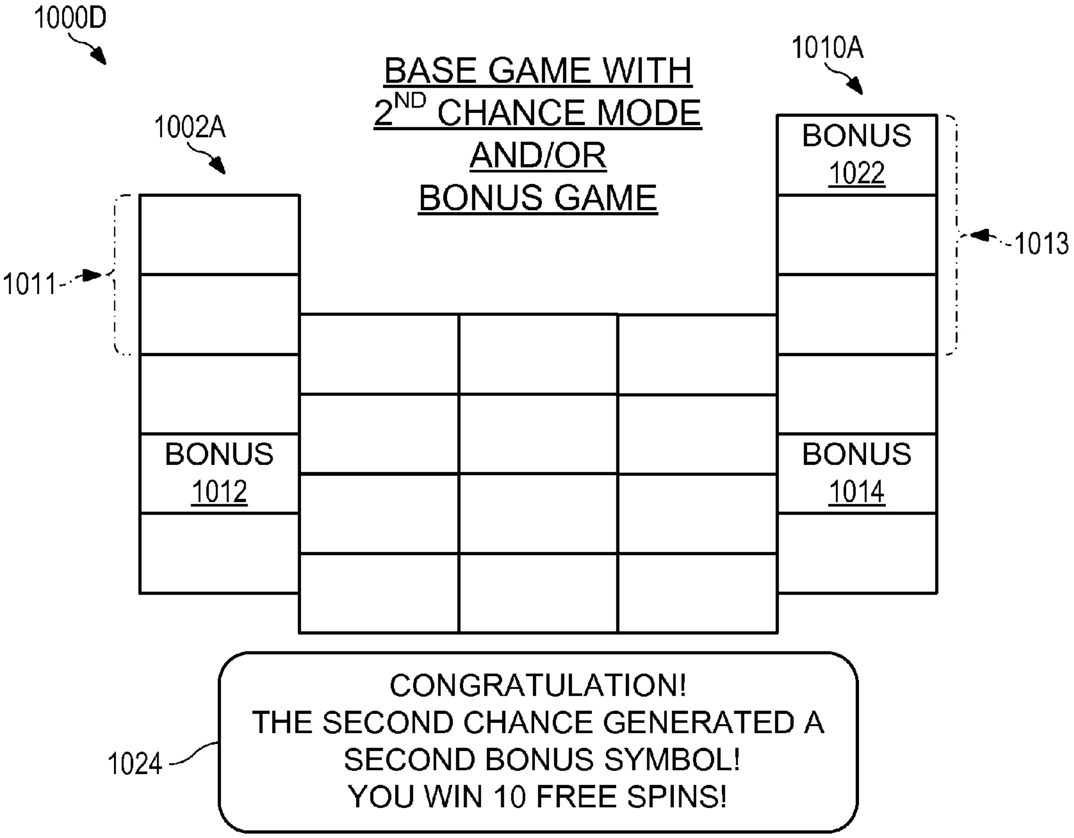
FIG. 10D is an illustration of a base game, a second chance base game, and/or a bonus game structure on a gaming device, according to one embodiment.

In FIG. 10C, another illustration of second chance base game play on a gaming device is shown, according to one embodiment. A first second chance base game play mode image 1000C may show the start of a second chance base game play where a first extended reel area 1011 and a second extended reel area 1013 are displayed, shown, and/or uncovered. In this example, first extended reel area 1011 is extended on a first reel 1002 (see FIG. 10A) based on the first bonus symbol 1012 being located in the first reel 1002. Further, second extended reel area 1013 is extended on a fifth reel 1010 (and/or Nth reel) based on the second bonus symbol 1014 being located in the fifth reel 1010. In other words, for a reel to expand one or more bonus symbols must be located on the reel, according to one embodiment. In this example as shown in FIG. 10D, a third bonus symbol 1022 is generated in the expanded sections (e.g., second extended reel area 1013) during the second chance base game play (e.g., a secondary base game play). A bonus game initiation message 1024 may be communicated to the player. In another example, the second chance base game play does not generate a third bonus symbol and/or trigger the bonus game (see FIG. 10G).

Figure 10E:
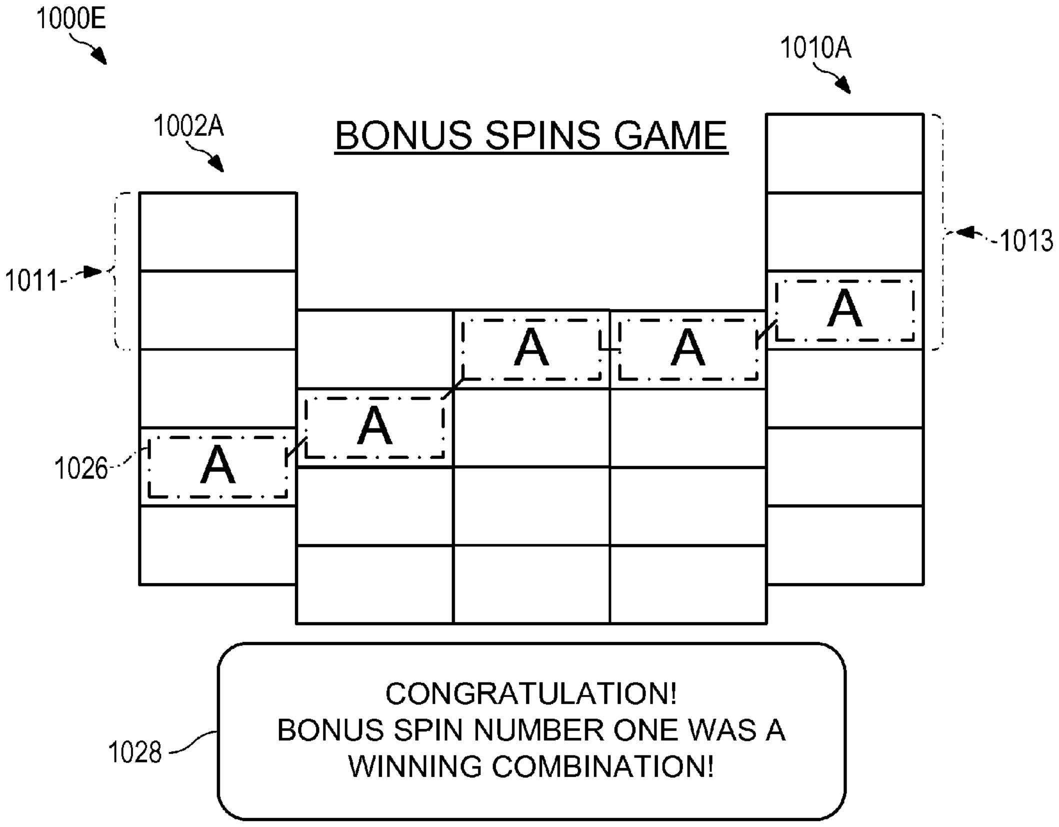
FIG. 10E is another illustration of bonus game with extended reels on a gaming device, according to one embodiment.
Figure 10F:
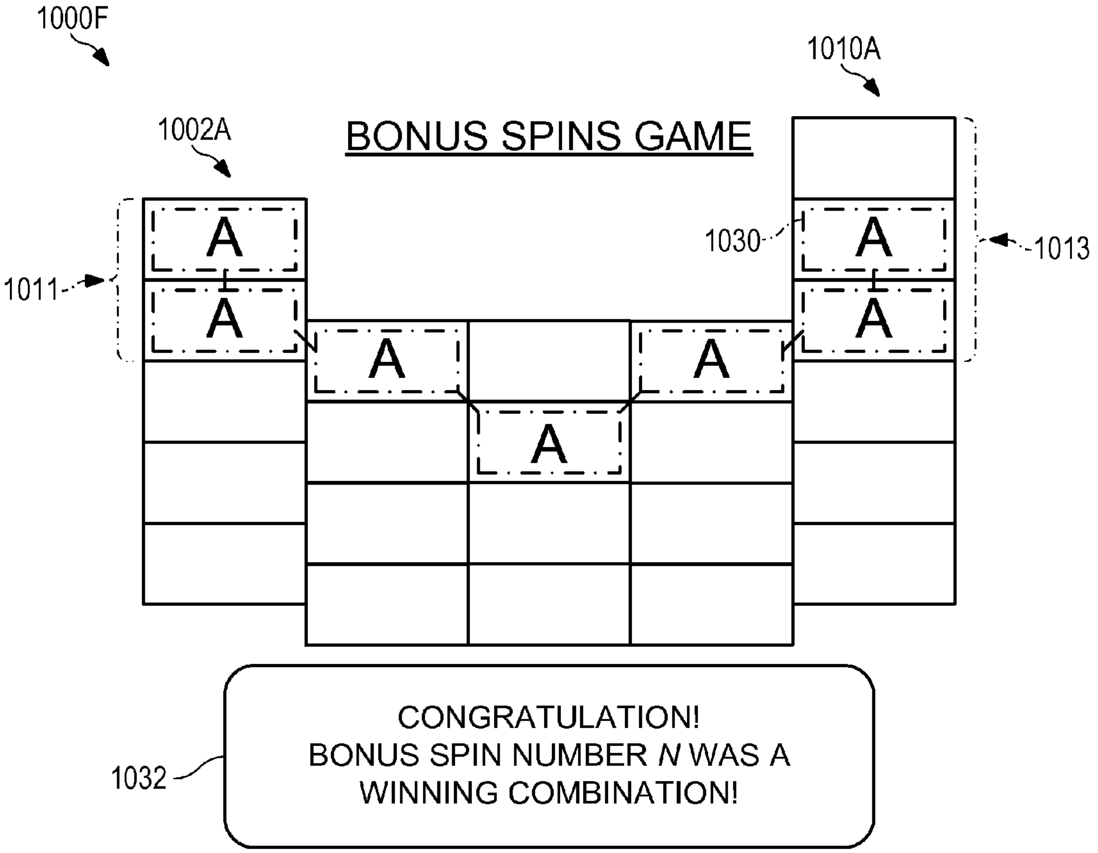
FIG. 10F is another illustration of bonus game with extended reels on a gaming device, according to one embodiment.
Figure 10G:
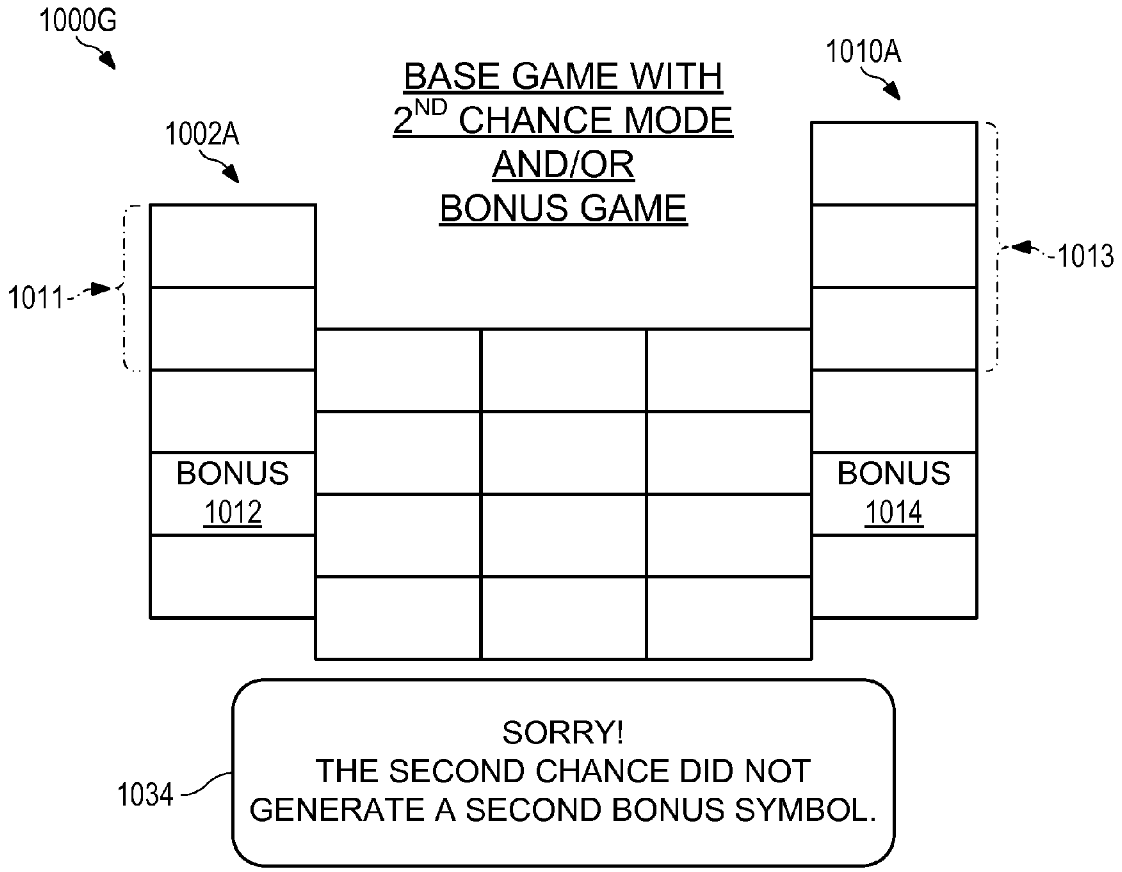
FIG. 10G is another illustration of a base game, a second chance base game, and/or a bonus game structure on a gaming device, according to one embodiment.

In FIG. 10E, a bonus game play is shown, according to one embodiment. A first bonus game play image 1000E may include a base game area (the area utilized in FIG. 6F) which is utilized with first extended reel area 1011 and second extended reel area 1013 during a bonus game play. In this example, first extended reel area 1011 has increased expanded first reel 1002A by two reel areas and second extended reel area 1013 has increased expanded fifth reel 1010A by three reel areas. These extended and/or expanded areas may now be utilized to form one or more winning payline outcomes. In this example, a first winning outcome 1026 included four A symbols in the base game area (the area utilized in FIG. 6F) and one A symbol in the extended display reel areas (e.g., expanded fifth reel 1010A) to form a winning outcome with 5 A symbols which had a first prize amount. It should be noted that if the bonus game did not include the expanded areas, then the first winning outcome 1026 may have included only four A symbols in the base game area (the area utilized in FIG. 6F) which had a second prize amount which would be less than the first prize amount. In another example, the first winning outcome 1026 may not have been a winning outcome if the extended display reel areas were not utilized when game play requires that five A symbols are generated to form a winning outcome. In FIG. 10F, another bonus game play is shown, according to one embodiment. A second bonus game play image 1000F may include a base game area (the area utilized in FIG. 6F) which is utilized with first extended reel area 1011 and second extended reel area 1013 during a bonus game play. In this example, the extended display reel areas has increased expanded first reel 1002A by two reel areas and second extended reel area 1013 has increased expanded fifth reel 1010A by three reel areas. These extended and/or expanded areas may now be utilized to form one or more winning payline outcomes. In this example, a second winning outcome 1030 included three A symbols in the base game area (the area utilized in FIG. 6F) and four A symbols in the extended display reel areas (e.g., two in both first extended reel area 1011 and second extended reel area 1013) to form a winning outcome with 7 A symbols which had a first prize amount. It should be noted that if the bonus game did not include the expanded areas, then the second winning outcome 1030 may have included only three A symbols in the base game area (the area utilized in FIG. 6F) which had a second prize amount which would be less than the first prize amount. In another example, the second winning outcome 1030 may not have been a winning outcome if the extended display reel areas were not utilized when game play requires that at three A symbols are generated to form a winning outcome and that an A symbol must be in the first reel. It should also be noted that second winning outcome 1030 was read from left to right (e.g., going from the fifth reel to the first reel). Whereas, the first winning outcome 1026 was read from the right to the left (e.g., going from the first reel to the fifth reel).

Figure 10H:
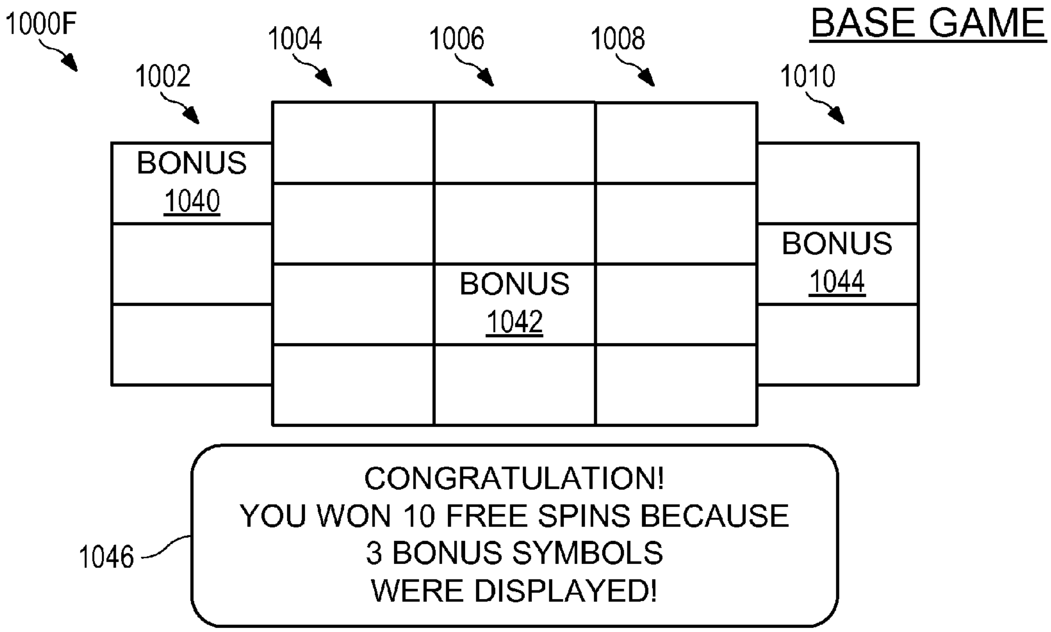
FIG. 10H is an illustration of a base game on a gaming device, according to one embodiment.

In FIG. 10H, another illustration of second chance base game play on a gaming device is shown, according to one embodiment. A third base game image 1000H includes first reel 1002, second reel 1004, third reel 1006, fourth reel 1008, and fifth reel 1010 (and/or Nth reel). In this example of base game play, when a base game play results in a combination of 3 bonus symbols being located on first reel 1002, second reel 1004, third reel 1006, fourth reel 1008, and fifth reel 1010, a bonus game is triggered and/or initiated. In this example, the base game has generated a first bonus symbol 1040 located in the first reel 1002, a second bonus symbol 1042 located in the third reel 1006, and a third bonus symbol 1044 located in the fifth reel 1010 (and/or the Nth reel). Based on obtaining three bonus symbols, a bonus game was triggered and a message 1046 may state "CONGRATULATIONS! YOU WON 10 FREE SPINS BECAUSE 3 BONUS SYMBOLS WERE DISPLAYED!"

Figure 10J:
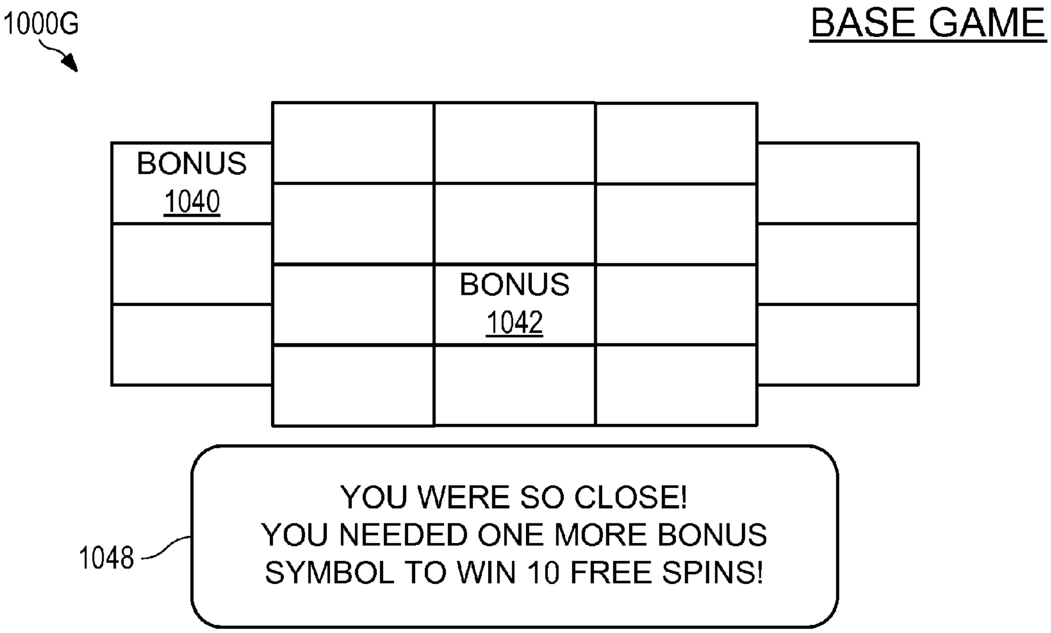
FIG. 10J is another illustration of a base game on a gaming device, according to one embodiment.

In FIG. 10J, another illustration of second chance base game play on a gaming device is shown, according to one embodiment. A fourth base game image 1000J may show that the first bonus symbol 1040 and the second bonus symbol 1042 were generated but that no bonus game was triggered because 3 bonus symbols are required to trigger the bonus game in this example. Any number (e.g., 1 to N) of bonus symbols and/or triggering events may be required. A base game message 1048 may state "YOU WERE SO CLOSE! YOU NEEDED ONE MORE BONUS SYMBOL TO WIN 10 FREE SPINS!"

Figure 10K:
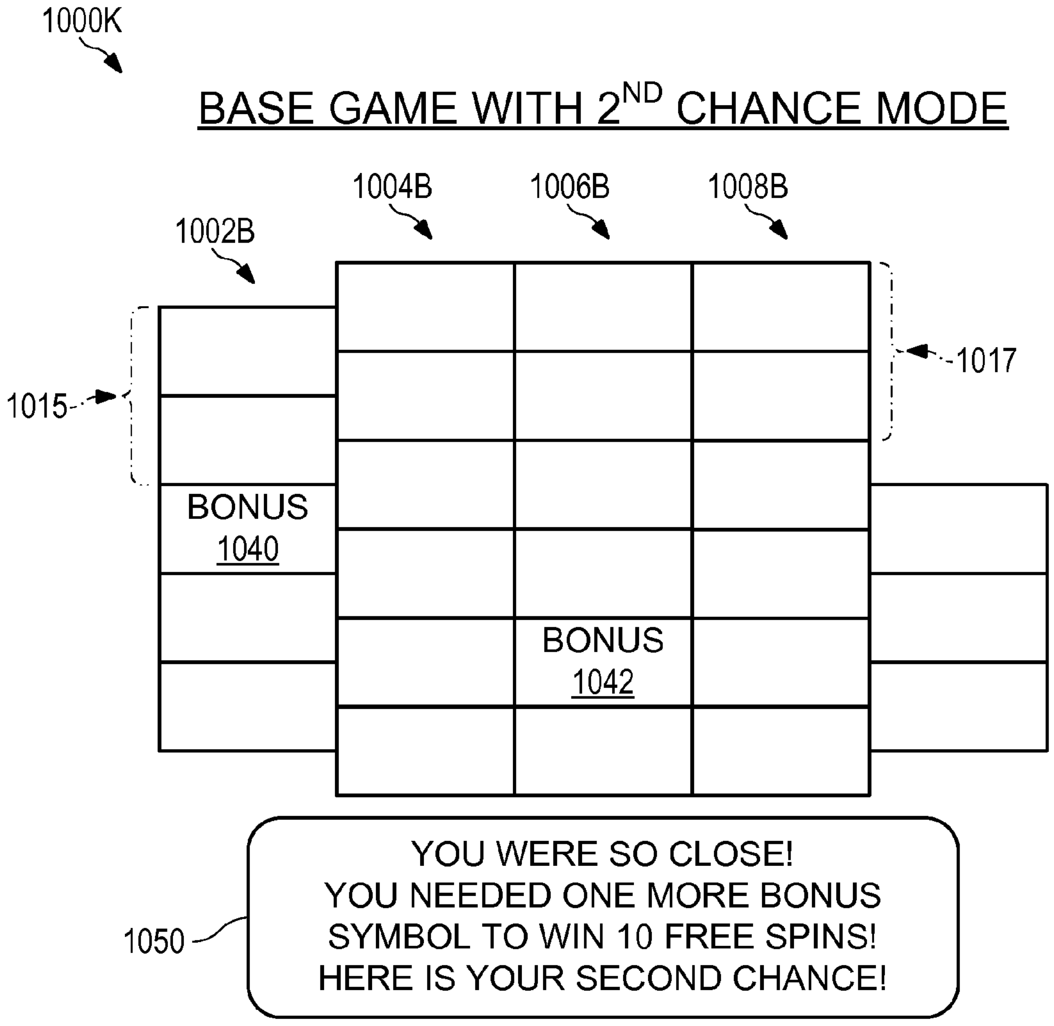
FIG. 10K is an illustration of a base game with a second chance base game on a gaming device, according to one embodiment.
Figure 10L:
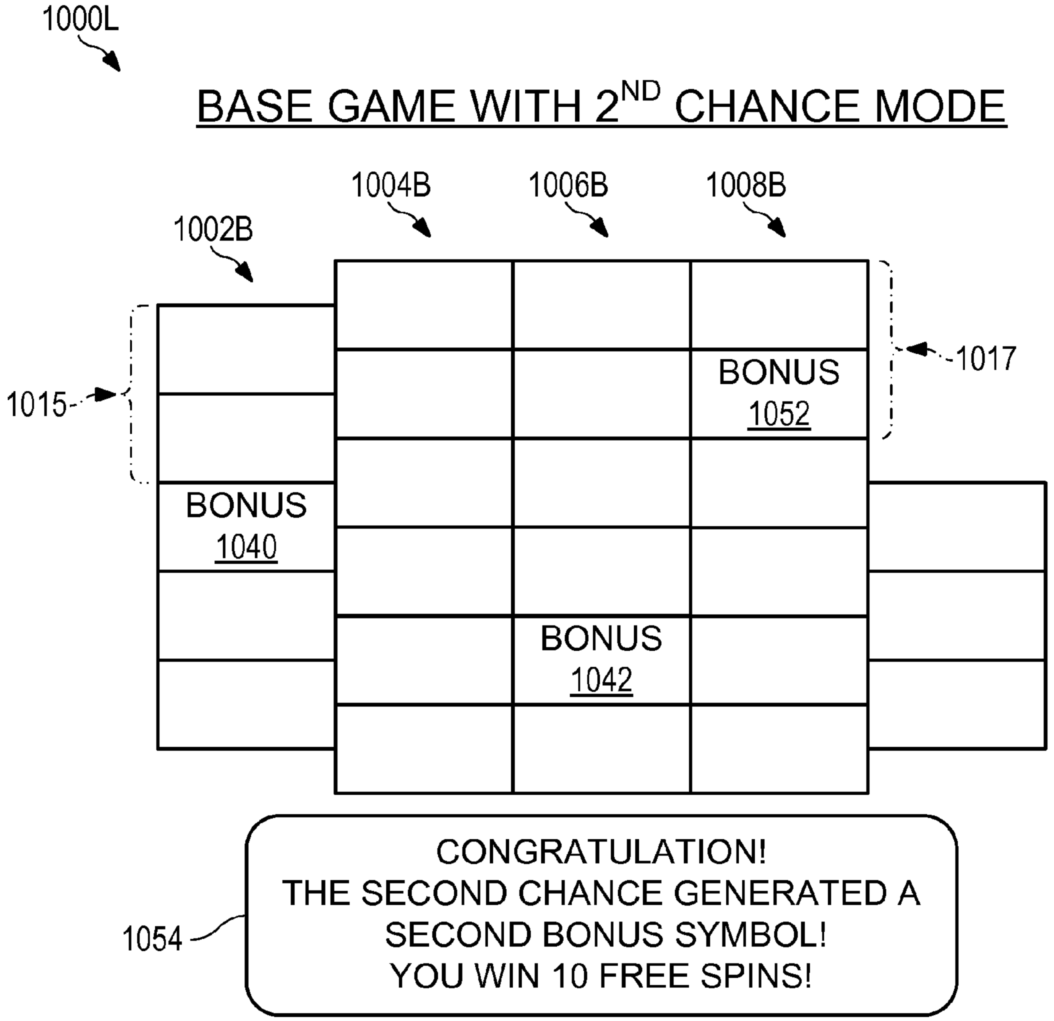
FIG. 10L is another illustration of a base game with a second chance base game on a gaming device, according to one embodiment.

In FIG. 10K, another illustration of second chance base game play on a gaming device is shown, according to one embodiment. A second chance base game play mode image 1000K may show the start of a second chance base game play where a first extended reel area 1015 and a second extended reel area 1017 are displayed, shown, and/or uncovered. In this example, first extended reel area 1015 is extended on a first reel 1002 (see FIG. 10A) based on the first bonus symbol 1040 being located in the first reel 1002. Further, second extended reel area 1017 is extended over all three of reels (e.g., second reel 1004, third reel 1006, and fourth reel 1008) based on the second bonus symbol 1042 being located on any of the three reels (e.g., second reel 1004, third reel 1006, and fourth reel 1008) which are grouped together during the base game, the second chance game, and/or the bonus game. Therefore, if a bonus symbol is generated in any of these grouped reels, then these grouped reels may expand together. In other words, two or more reels may be grouped together (and/or linked) and if one or more bonus symbols are on any of these grouped reels, then the grouped reels all expanded (which may be to the same length and/or varying lengths). For example, if reel 2 and reel 3 are grouped together and an expansion is triggered, then both reel 2 and reel 3 may expand by 4 units. In another example, if reel 2 and reel 3 are grouped together and an expansion is triggered, then reel 2 may expand by 4 units while reel 3 expands by 10 units. It should be noted that any reels may be grouped together and that any number of expansion units (e.g., 0 to N) may be utilized). In this example as shown in FIG. 10L, a third bonus symbol 1052 is generated in the expanded sections (e.g., second extended reel area 1017) during the second chance base game play (e.g., a secondary base game play). A bonus game initiation message 1054 may be communicated to the player. In another example, the second chance base game play does not generate a third bonus symbol and/or trigger the bonus game (see FIG. 10P).

Figure 10M:
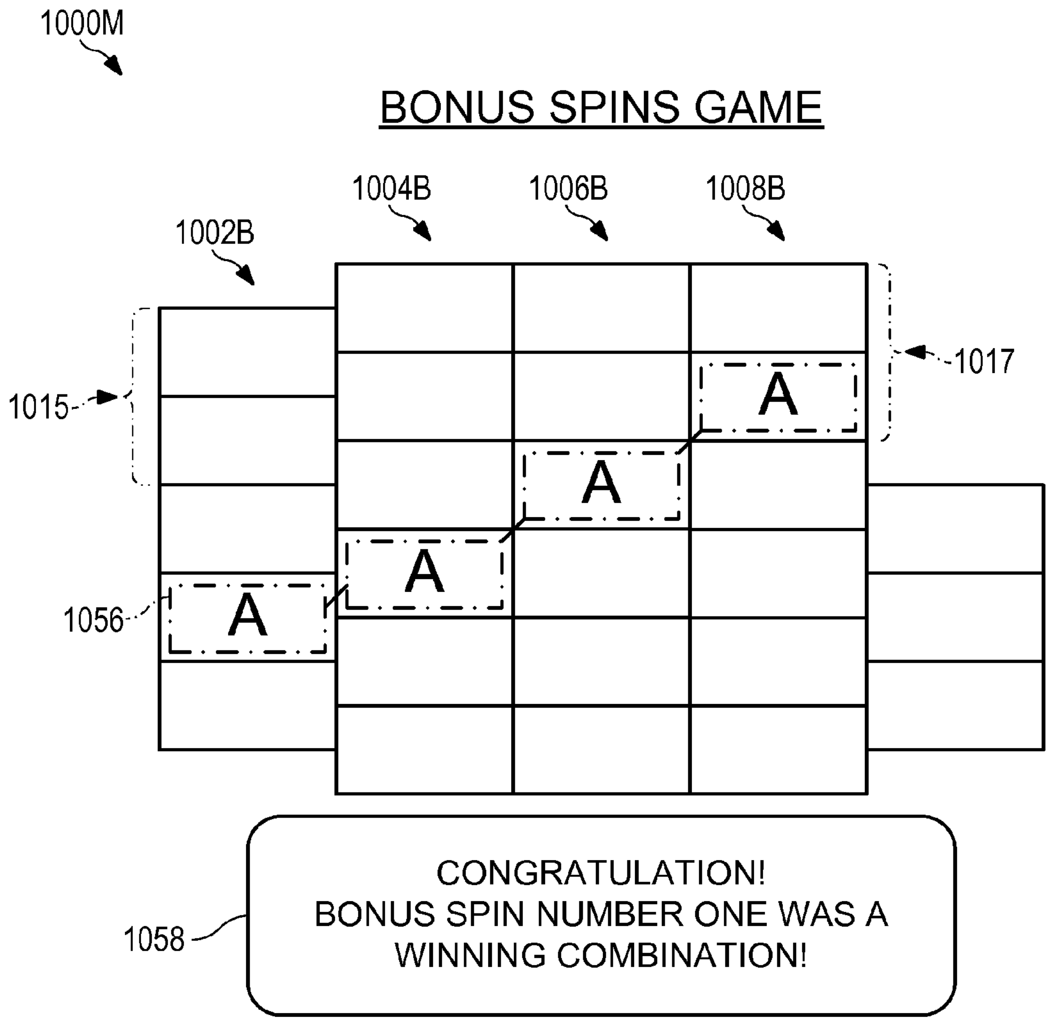
FIG. 10M is an illustration of bonus game with extended reels on a gaming device, according to one embodiment.
Figure 10N:
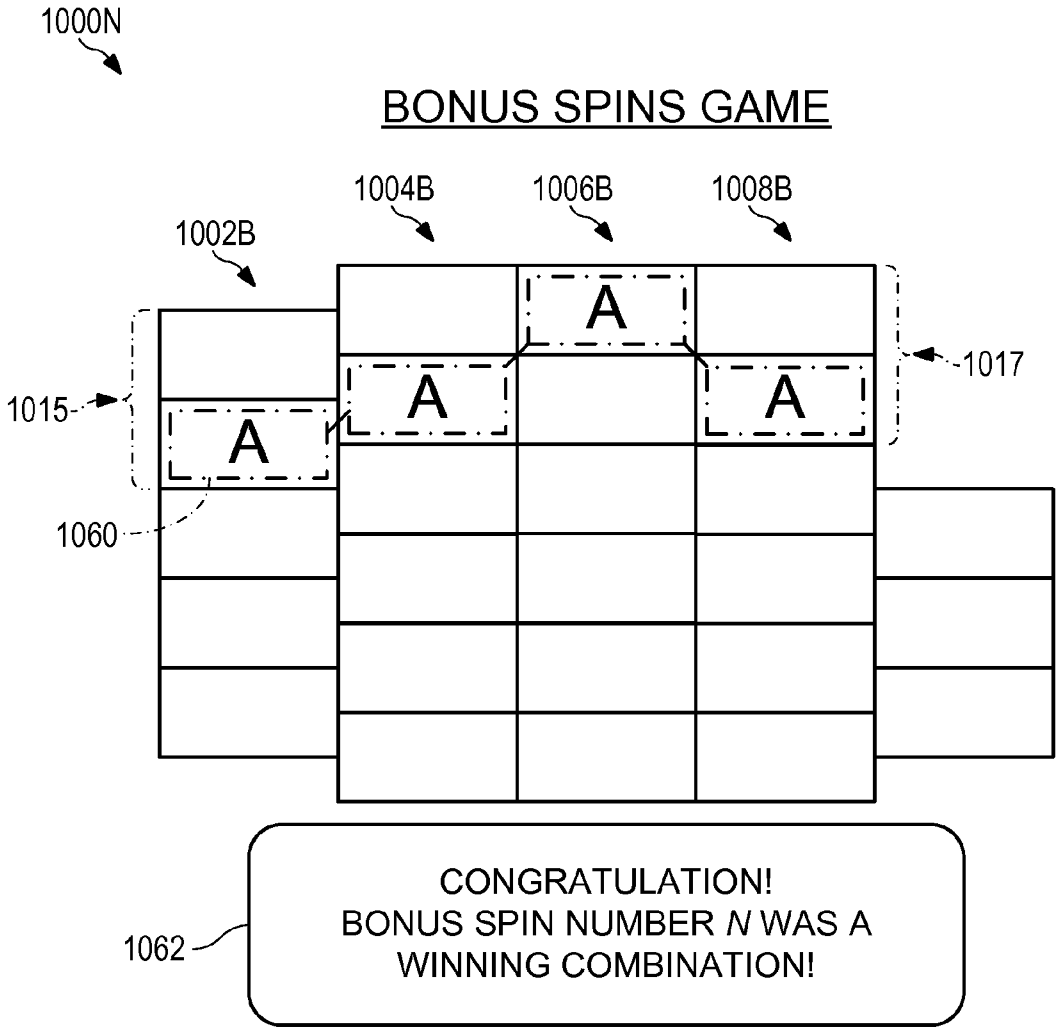
FIG. 10N is another illustration of bonus game with extended reels on a gaming device, according to one embodiment.
Figure 10P:
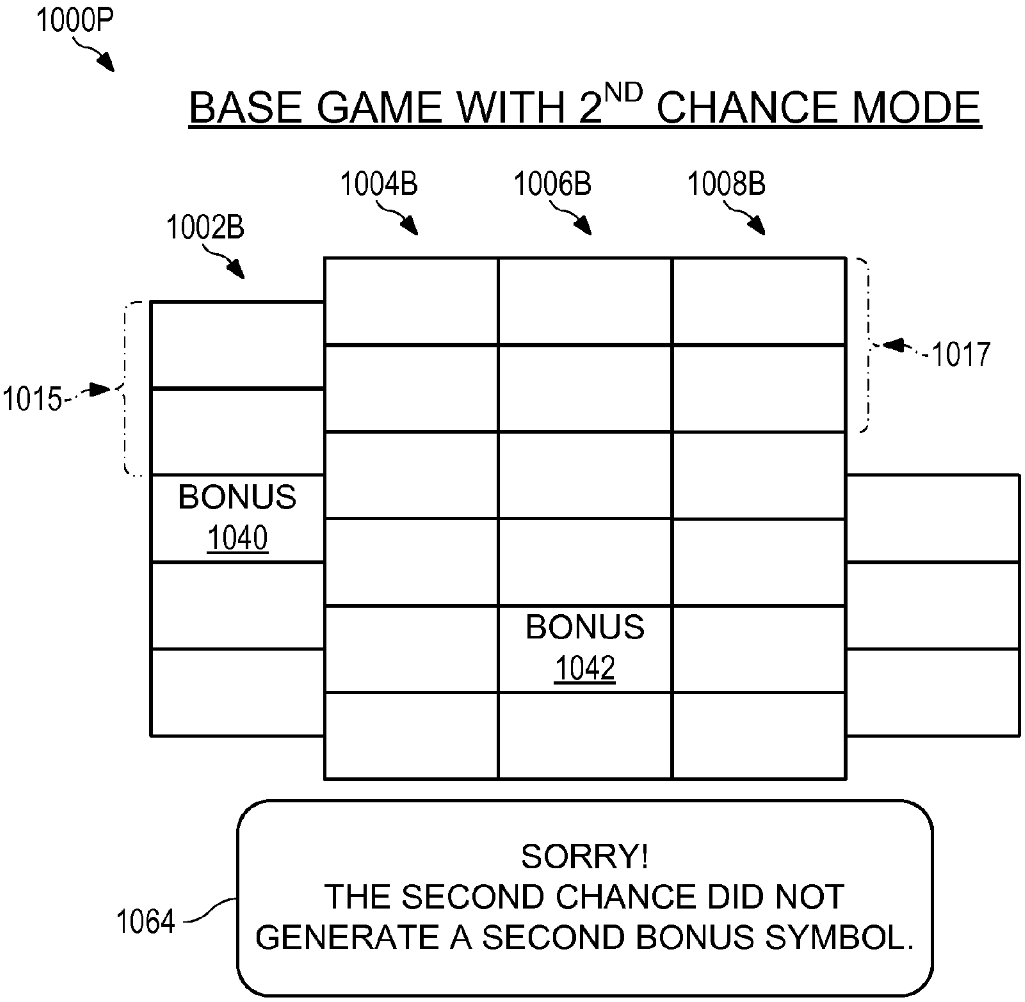
FIG. 10P is another illustration of a base game with a second chance base game on a gaming device, according to one embodiment.

In FIG. 10M, a bonus game play is shown, according to one embodiment. A first bonus game play image 1000M may include a base game area (the area utilized in FIG. 6F) which is utilized with first extended reel area 1015 and a second extended reel area 1017 during a bonus game play. In this example, first extended reel area 1015 has increased expanded first reel 1002B by two reel areas and second extended reel area 1017 has increased expanded second reel 1004B, expanded third reel 1006B, and expanded fourth reel 1008B by two reel areas (note that expanded second reel 1004B, expanded third reel 1006B, and expanded fourth reel 1008B were grouped together). These extended and/or expanded areas may now be utilized to form one or more winning payline outcomes. In this example, a first winning outcome 1056 included three A symbols in the base game area (the area utilized in FIG. 6F) and one A symbol in the extended display reel areas (e.g., expanded fourth reel 1008B) to form a winning outcome with 4 A symbols which had a first prize amount. It should be noted that if the bonus game did not include the expanded areas, then the first winning outcome 1056 may have included only three A symbols in the base game area (the area utilized in FIG. 6F) which had a second prize amount which would be less than the first prize amount. In another example, the first winning outcome 1056 may not have been a winning outcome if the extended display reel areas were not utilized when game play requires that four A symbols are generated to form a winning outcome. In FIG. 10N, another bonus game play is shown, according to one embodiment. A second bonus game play image 1000N may include a base game area (the area utilized in FIG. 6F) which is utilized with first extended reel area 1015 and a second extended reel area 1017 during a bonus game play. In this example, a second winning outcome 1060 included zero A symbols in the base game area (the area utilized in FIG. 6F) and four A symbols in the extended display reel areas (e.g., one in each of expanded first reel 1002B, expanded second reel 1004B, expanded third reel 1006B, and expanded fourth reel 1008B) to form a winning outcome with 4 A symbols which had a first prize amount. It should be noted that if the bonus game did not include the expanded areas, then the second winning outcome 1060 may have included zero A symbols in the base game area (the area utilized in FIG. 6F) which would not have been a winning outcome.

Figure 11A:
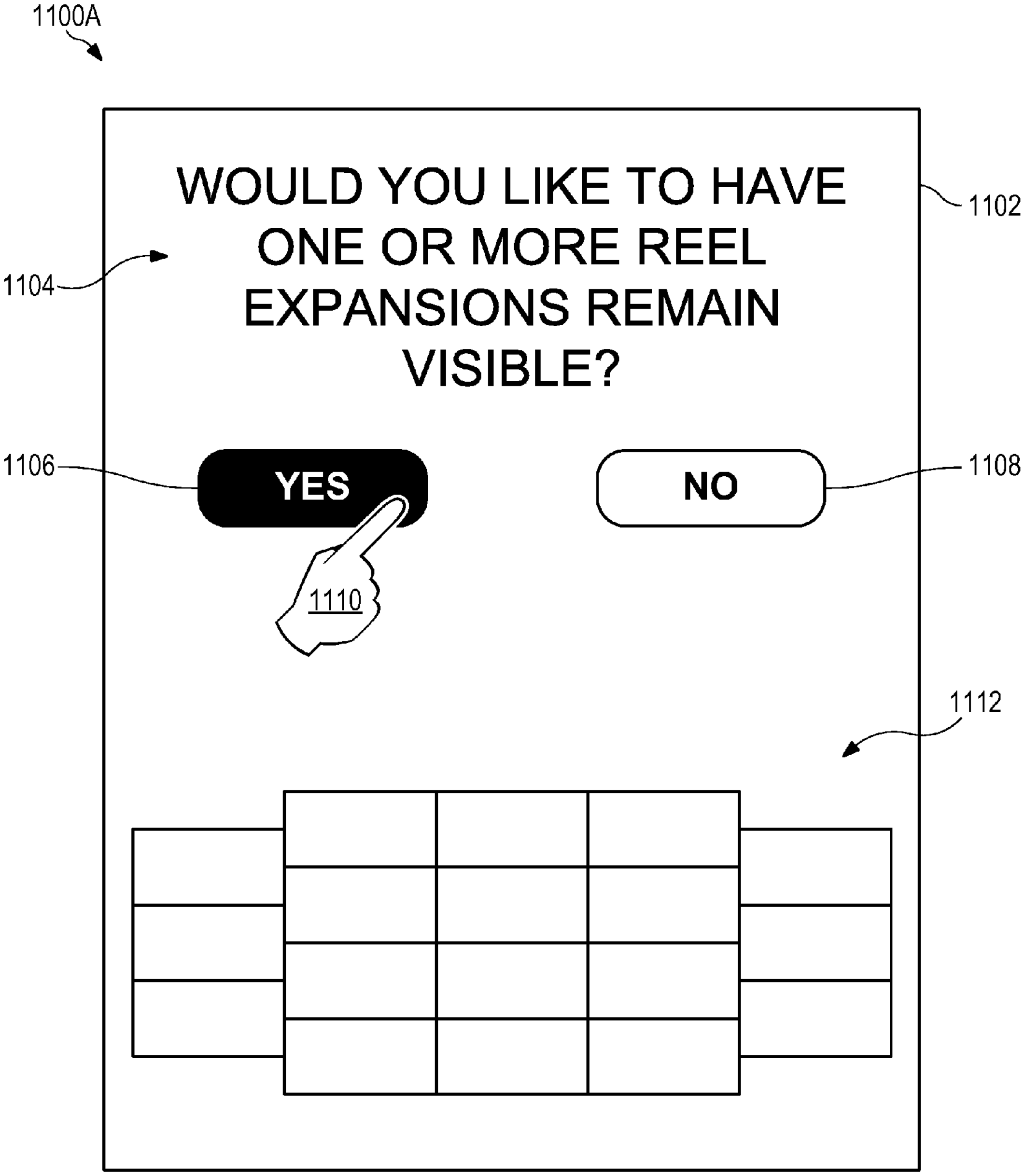
FIG. 11A is another illustration of second chance base game play on a gaming device, according to one embodiment.
Figure 11B:
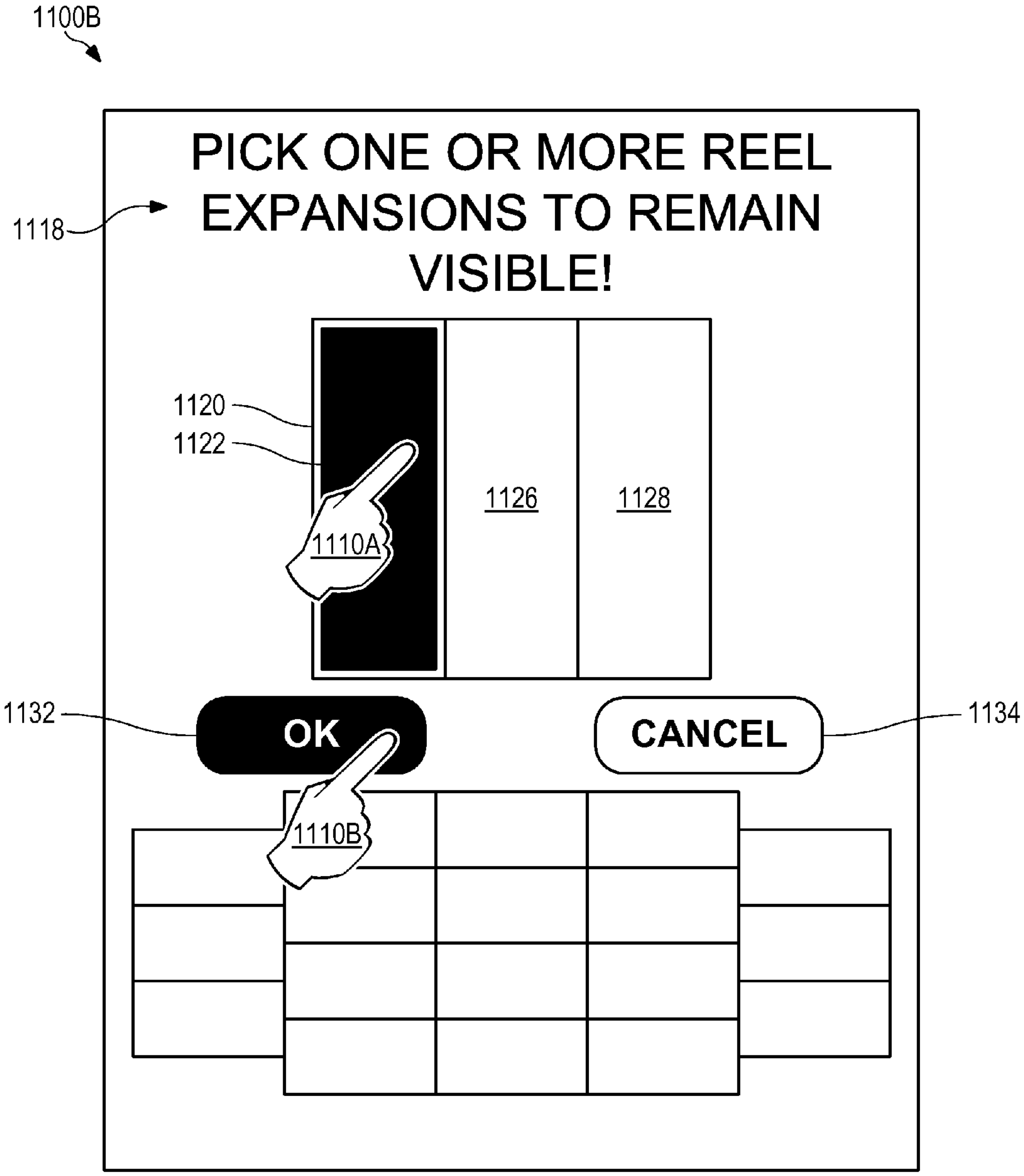
FIG. 11B is another illustration of second chance base game play on a gaming device, according to one embodiment.

In FIG. 11A, another illustration of second chance base game play on a gaming device is shown, according to one embodiment. An expansion reel option image 1100A shows that in one embodiment a player is allowed to choose whether to keep an expansion reel visible during a sequent base game play and/or bonus game play on display area 1112. In this example, the player may select 1110 a yes button 1106 or a no button 1108. In one example shown in FIG. 11B, the player has selected 1110A a first expanded reel area 1122 from a plurality of expanded reel areas (e.g., first expanded reel area 1122, a second expanded reel area 1126, a third expanded reel area 1128, . . . , an Nth expanded reel area) to remain visible during a sequent base game play and/or bonus game play. The player may also select 1110B to confirm this selection via an accept button 1132 or to cancel this selection via a cancel button 1134. In one example, the areas may be displayed and active. In another example, the areas may be displayed and inactive.

Figure 11C:
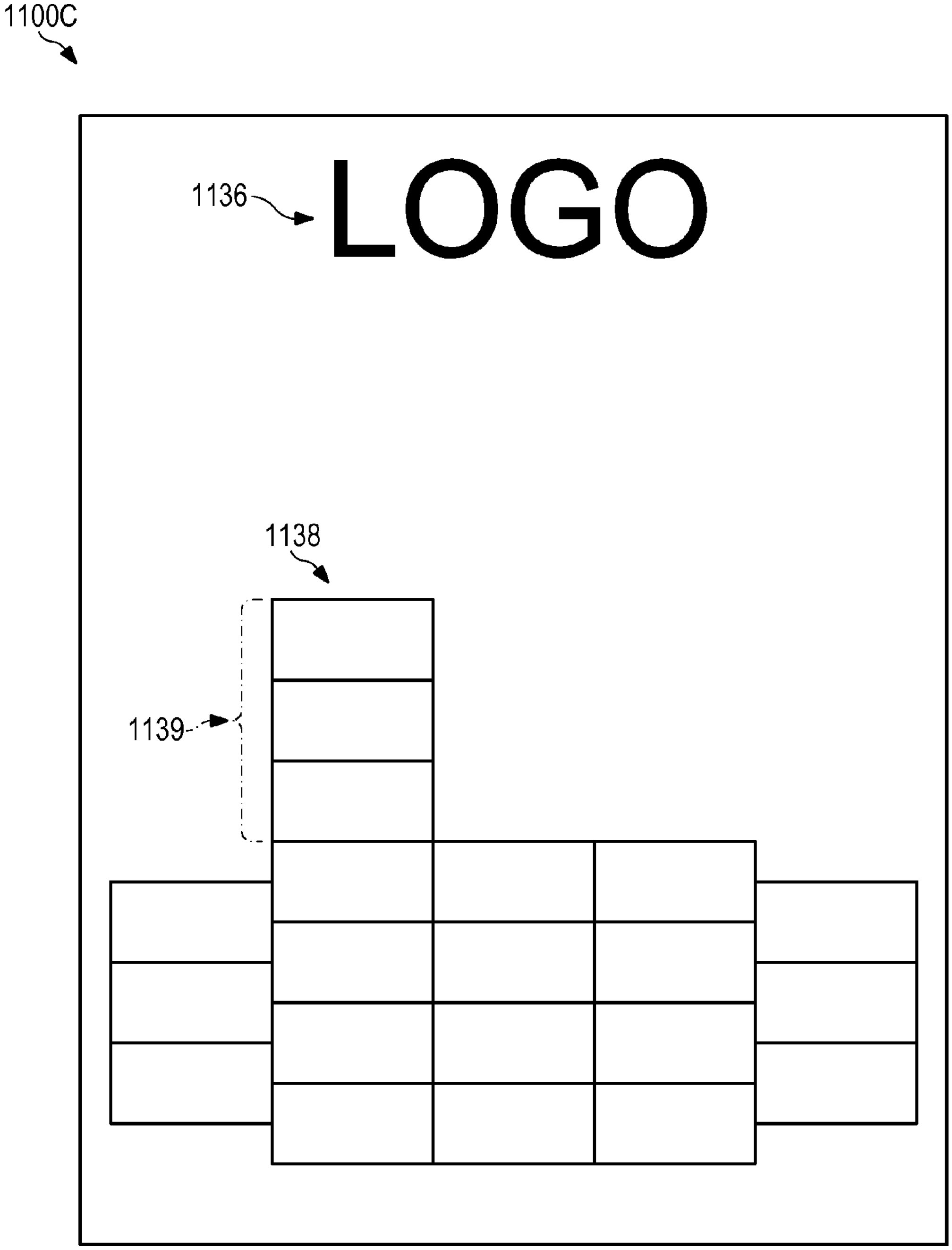
FIG. 11C is another illustration of second chance base game play on a gaming device, according to one embodiment.

In FIG. 11C, another illustration of second chance base game play on a gaming device is shown, according to one embodiment. In this example, an expanded section 1139 on a second reel 1138 has remained visible during a base game play and/or a bonus game play. In this example, the expanded section 1139 may not be active and therefore may not be utilized to complete a winning outcome and/or to trigger a bonus game. In another example, the expanded section 1139 may be active and therefore may be utilized to complete a winning outcome and/or to trigger a bonus game. Further, a logo 1136 may be placed on the display screen. The logo 1136 may be related to an advertiser, the game, and/or a sponsor of the second chance functionality and/or the expanded reel functionality.

Figure 11D:
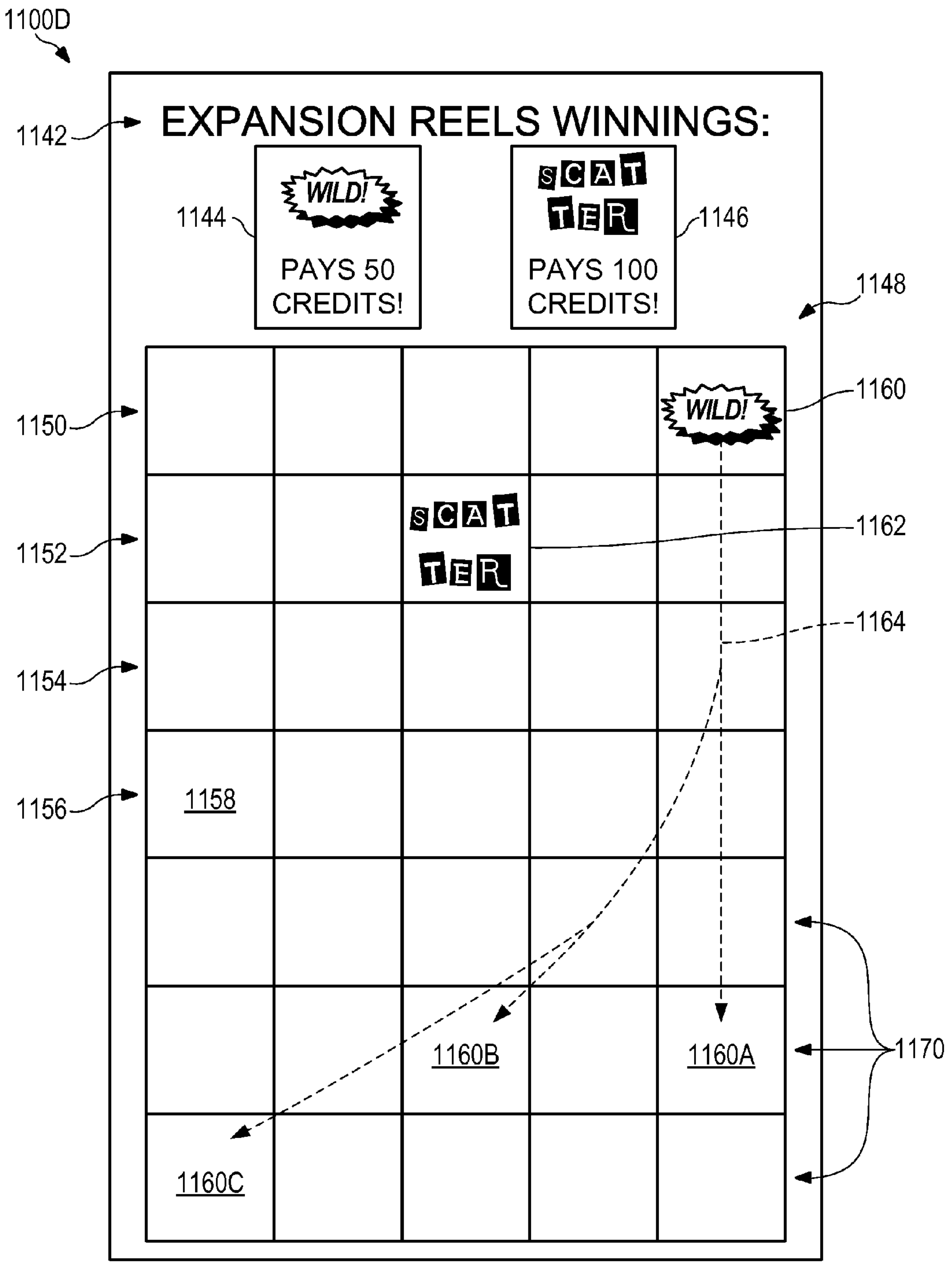
FIG. 11D is another illustration of second chance base game play on a gaming device, according to one embodiment.

In FIG. 11D, another illustration of second chance base game play on a gaming device is shown, according to one embodiment. In this example, base game active reels 1170 are shown. Base game active reels 1170 includes a first active reel, a second active reel, a third active reel, a fourth active reel, and a fifth active reel which all have three active reel areas which are displayed during the base game. Further, there are four extended rows (e.g., a first extended row 1150, a second extended row 1152, a third extended row 1154, and a fourth extended row 1156) which may be utilized in a second chance mode (e.g., a secondary base game) and/or a bonus game mode. In this example, the base game did not achieve any winning outcomes. Whereas, the second chance base game play mode generated a scatter win because an expanded area scatter 1162 completed the necessary scatters required in a base game to achieve a scatter payout (e.g., the base game had two scatters which are not shown but three scatters are required to win a scatter award 1146). Further, an expanded area wild 1160 was generated and the expanded area wild 1160 had the option of moving to a first location 1160A, a second location 1160B, and/or a third location 1160C on base game active reels 1170 and moved to the location that obtains the largest award amount. For example, the expanded area wild 1160 can move to the first location 1160A and generate a 10 credit payout. The expanded area wild 1160 can move to the second location 1160B and generate a 30 credit payout. Further, the expanded area wild 1160 can move to the third location 1160C and generate a 50 credit payout. The system, device, and/or method would move the expanded area wild 1160 to the third location 1160C based on the third location generating a highest award 1144. In another example, the expanded area wild 1160 may move to a location in the expanded reel area to generate an optimal winning payout (see FIG. 9B for a winning payout that includes the expanded reel section).

Figure 12:
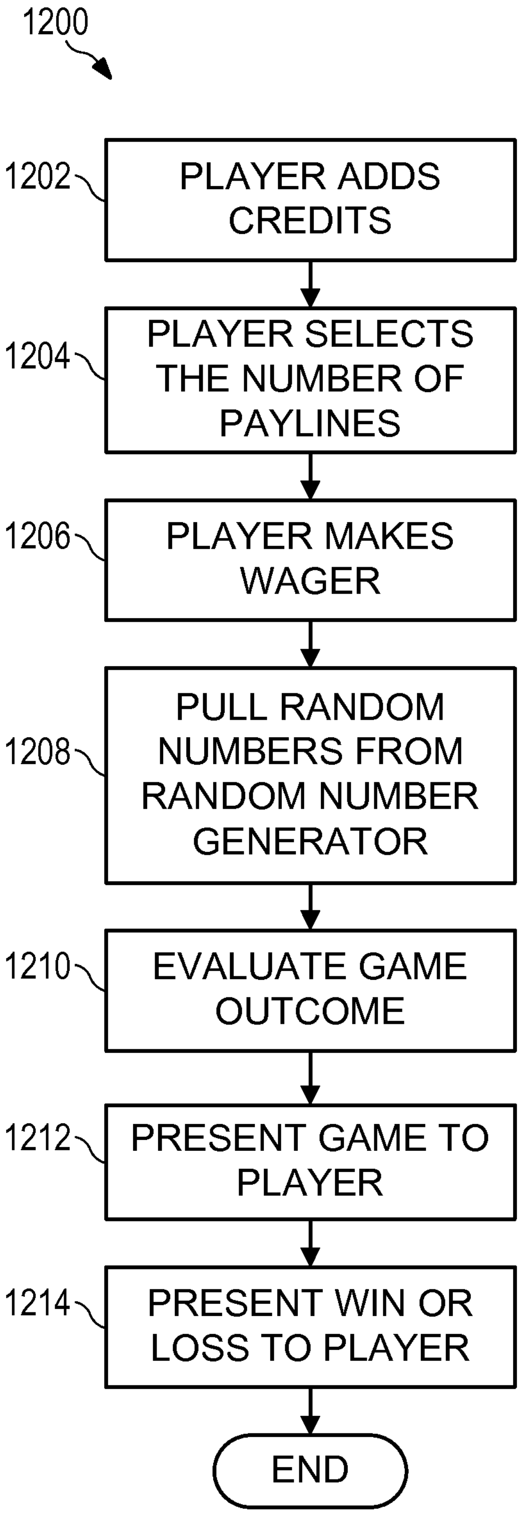
FIG. 12 is a game play flow diagram, according to one embodiment.

In FIG. 12, a process flowchart of one example of a primary game play 1200 on an electronic gaming system is shown, according to one embodiment. The method may include the step of a player adding credit to the electronic gaming system (step 1202). It is contemplated that a player can do this by inserting cash, coins, a ticket representative of a cash value, a credit card, a player card, requesting an electronic funds transfer ("EFT"), otherwise requesting access to an account having monetary funds, and/or any combination thereof.

At step 1204, the player selects the number of paylines to play. In one embodiment, the player can select from a plurality of different paylines to play. In a further embodiment, the player can only play a predetermined number of paylines. An example of this embodiment may be the instance where the gaming system only allows a player to play forty paylines, and cannot select to play more or less paylines. In another embodiment, the gaming system does not offer paylines, but rather offers a different way to evaluate the game play. One example of a different way may be sometime referred to as a 243-ways evaluation, where symbols may be evaluated based on the existence of like-symbol clusters on adjacent reels, starting with the left-most reel and continuing right, instead of how many paylines run through the like-symbol clusters.

At step 1206, the player makes a wager on the game. In one embodiment, the wager may be a multiple of the number of paylines selected at step 1204. In another embodiment, the wager may not be a multiple of the number of paylines selected at step 1204. In a further embodiment, the wager may include a side-wager (e.g., ante bet), which may, in one example of such an embodiment, be used to make the player eligible to be awarded the extra functionality discussed above. It should be appreciated that in some embodiments, the order of steps 1204 and 1206 may not be critical, and so for example, a player can select the wager they wish to place, and then select the number of paylines they want it applied to, and that these embodiments are expressly contemplated as being within the scope of the present disclosure.

Continuing to step 1208, the gaming system pulls random numbers from a random number generator ("RNG"). In one embodiment, the system pulls one random number for each reel. In another embodiment, the system pulls one random number which may be utilized to determine the stop positions for each reel. In another embodiment, the random numbers determined by the RNG may be based on the time that the numbers may be pulled. In another embodiment, the random numbers determined by the RNG may be based on the prior numbers pulled.

At steps 1210 and 1212, the gaming system utilizes the random numbers pulled at step 1208 to determine the primary game symbols to display in the play of the primary game, which in turn both determines the presentation of the game to the player and evaluates the game outcome. In one embodiment, the random numbers pulled determine the stopping positions for the reels, which may be then caused to stop at those associated positions, and then the gaming system evaluates the displayed primary game symbols to determine the game outcome. In another embodiment, the gaming system determines the game outcome based on the pulled random numbers, and then causes the game to present an associated outcome to the player.

At step 1214, the win or loss outcome may be identified for the player. In one embodiment, this step can include additional messaging, which provides information related to the win or lose, such as why the player won or lost. In another embodiment, this step can include identification of the amount of any award earned by the player.

Figure 13:
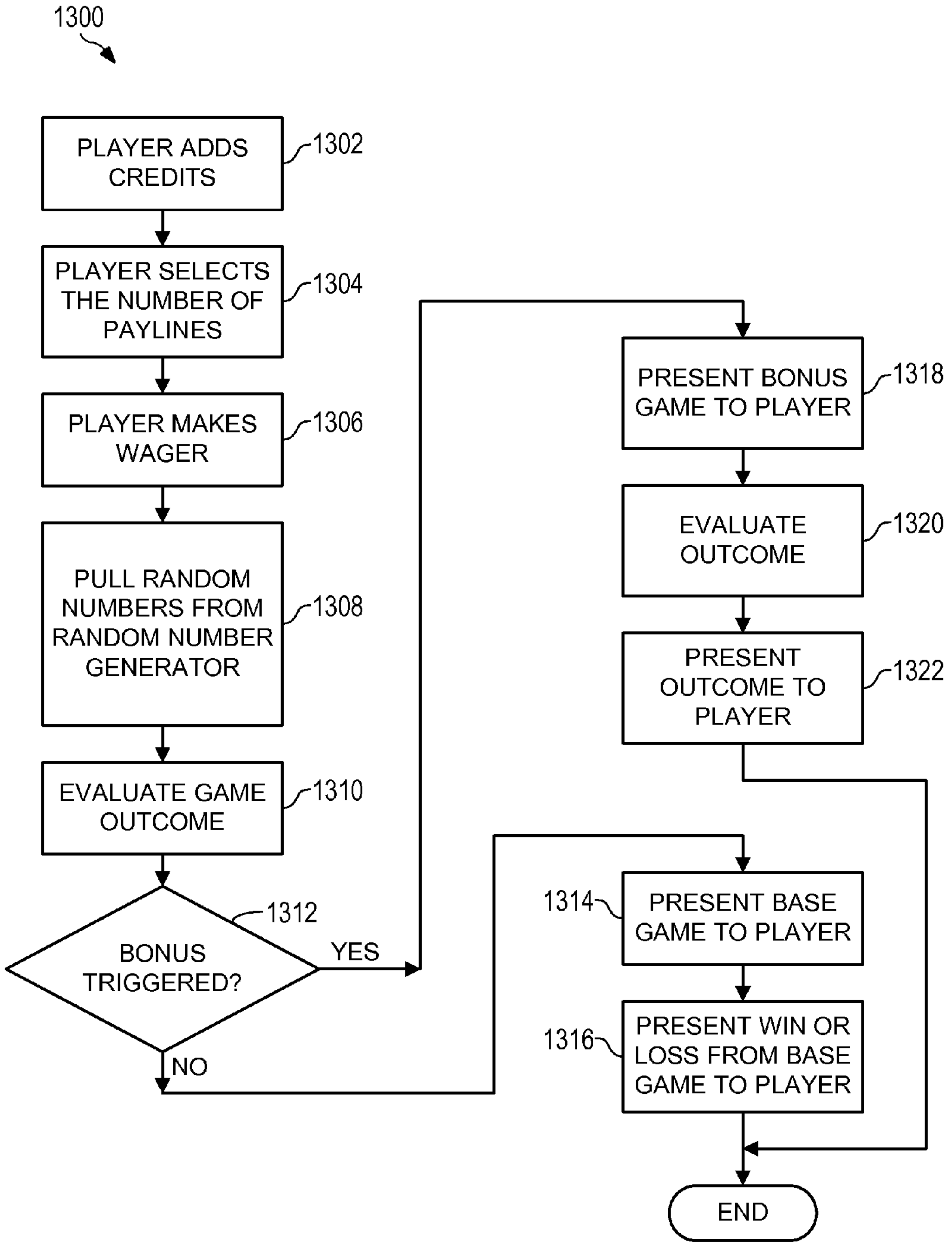
FIG. 13 is a game play flow diagram, according to one embodiment.

FIG. 13 is a process flowchart of one example of a combined primary and secondary game play 1300 on an electronic gaming system, according to one embodiment. The method may include the step of a player adding credit to the electronic gaming system (step 1302). It is contemplated that a player can do this by inserting cash, coins, a ticket representative of a cash value, a credit card, a player card, requesting an electronic funds transfer ("EFT"), otherwise requesting access to an account having monetary funds, and/or any combination thereof.

At step 1304, the player selects the number of paylines to play. In one embodiment, the player can select from a plurality of different paylines to play. In a further embodiment, the player can only play a predetermined number of paylines. An example of this embodiment may be the instance where the gaming system only allows a player to play forty paylines, and cannot select to play more or less paylines. In another embodiment, the gaming system does not offer paylines, but rather offers a different way to evaluate the game play. One example of a different way may be sometime referred to as a 243-ways evaluation, where symbols may be evaluated based on the existence of like-symbol clusters on adjacent reels, starting with the left-most reel and continuing right, instead of how many paylines run through the like-symbol clusters.

At step 1306, the player makes a wager on the game. In one embodiment, the wager may be a multiple of the number of paylines selected at step 1304. In another embodiment, the wager may not be a multiple of the number of paylines selected at step 1304. In a further embodiment, the wager may include a side-wager, which may, in one example of such an embodiment, be used to make the player eligible to be awarded the extra functionality discussed above. It should be appreciated that in some embodiments, the order of steps 1304 and 1306 may not be critical, and so for example, a player can select the wager they wish to place, and then select the number of paylines they want it applied to, and that these embodiments may be expressly contemplated as being within the scope of the present disclosure.

Continuing to step 1308, the gaming system pulls random numbers from a random number generator "RNG". In one embodiment, the system pulls one random number for each reel. In another embodiment, the system pulls one random number which may be utilized to determine the stop positions for each reel. In another embodiment, the random numbers determined by the RNG may be based on the time that the numbers may be pulled. In another embodiment, the random numbers determined by the RNG may be based on the prior numbers pulled.

At step 1310, the gaming system utilizes the random numbers pulled at step 1308 to evaluate the game outcome. In one embodiment, the random numbers pulled determine the stopping positions for the reels, which may be then caused to stop at those associated positions, and then the gaming system evaluates the displayed primary game symbols to determine the game outcome. In another embodiment, the gaming system determines the game outcome based on the pulled random numbers, and then causes the game to present an associated outcome to the player.

At step 1312, the gaming system determines if a secondary or bonus game may be triggered. In one embodiment, the bonus game is triggered by the display of a plurality of matching symbols at a plurality of predetermined symbol positions within a play of the primary game. In one example, the bonus game may be triggered if a plurality of matching symbols is displayed on the 2nd, 3rd and 4th reel. In another example, the bonus game may be triggered if matching symbols are displayed on the 1st, 2nd and 3rd reels. In a further example, the bonus game may be triggered if matching symbols occur at predetermined symbol positions that include consecutive and non-consecutive reels. In another example, a bonus game (e.g., secondary game) may be triggered in any way (e.g., one special symbols in any locations, one special symbol in one or more predetermined locations, two special symbols in any locations, two special symbols in one or more predetermined locations, three special symbols in any locations, three special symbols in one or more predetermined locations, etc.).

If it is determined that a bonus or secondary game was not triggered, the process continues to step 1314, where the base game may be fully presented to the player. As discussed above, the orders of step 1310, 1312, and 1314 can be changed without affecting the novel concepts disclosed herein.

At step 1316, the win or loss outcome of the primary game may be identified for the player. In one embodiment, this step can include additional messaging, which provides information related to the win or lose, such as why the player won or lost. In another embodiment, this step can include identification of the amount of any award earned by the player If it is determined at step 1312 that a bonus or secondary game was triggered, then process 1300 continues to step 1318, where the secondary game may be presented to the player. As discussed above, there are numerous ways to present the secondary or bonus game to the player.

At steps 1320 and 1322, the outcome of the secondary game may be evaluated and presented to the player. In one embodiment, the outcome of the bonus game will always be a winning outcome. In another embodiment, the outcome of the secondary game will cause a significant award to be provided to the player. In one example of such an embodiment, the award may not be provided by the gaming system, as a casino operator may need to verify tax information before allowing such an award to be provided to the player. In one embodiment, instead of the process 1300 ending after step 1322, the process continues to step 1314 so as to finalize the primary game outcome presentation to the player.

In one example, a patron of a game may want to take a break and come back on any machine on the floor and continue with the same game play and/or game configuration. Once a patron decides to take a break he/she activates the persistent game play feature using some action similar to a button activation which may record the persisting information including the game title, the denomination, pay lines, credit per lines, his current credits, any other bonus information, and/or any progressive information. In one example, after recording this information the device, system, and/or method may generate a unique number and/or any other information which identifies the state recorded which may be printed on a receipt and/or stored on a magnetic card based on the current setup. This may be further secured by providing an additional PIN number displayed which is required to be used to bring back the game state. Further, once he/she goes back to play, the machine may have an option to restore his/her session. Once the receipt and/or card is fed in the device, the system may validate the unique number or grid and optionally the PIN and/or biometric information and bring back and/or restore and/or load the previous game with the persisted title, denomination, payline, credit per line data, and/or the current available credits. This will enable the patron to continue to play from the prior saved state where he/she broke and/or stopped playing in the previous session.

In another example, the paytable may be transferred from the EGM to another device (e.g., mobile device, etc.). Further, jurisdictional information may be utilized to modify the saved persistent game play function. For example, a player may move from one jurisdiction to another which may require that the saved persistent game play be modified. In one example, a player may move from Las Vegas to Atlantic City which would require that the game configuration be modified.

In one example, a player tracking can be combined with a persistent game card to form a player tracking/persistent game card. In one example, the EGM may generate a greater number of random numbers (e.g., RNG) than would be needed for the persistent game play to ensure that enough gaming outcomes are transferred from the EGM to the mobile device. In this example, random numbers from 1-1000 may be generated for a second chance base game play player which may be utilized on the mobile device while a second player playing on the EGM may start with random number 1001. In another example, bonuses, additional credits, additional spins, and/or any other reward may be utilized to entice a player to transfer game play to their mobile device and continue playing instead of not playing during their break (e.g., lunch, etc.).

In one embodiment, the electronic gaming device may include a plurality of reels. The plurality of reels includes one or more areas. The electronic gaming device may include a memory where the memory includes one or more persistent game play modules. The electronic gaming device may include a processor where the processor may generate one or more symbols to be located in the one or more areas. The processor may generate one or more persistent game play data and to transfer the one or more persistent game play data.

In another example, the processor may generate a ticket which includes at least one of the one or more persistent game play data. Further, the processor may restart game play at a saved state based on at least one of the one or more persistent game play data. In addition, the processor may transfer at least one of the one or more persistent game play data to a magnetic card. In another example, the processor may restart game play at a predetermined phase based on at least one of the one or more persistent game play data. Further, the processor may transfer at least one of the one or more persistent game play data to a mobile device. In addition, the processor may initiate game play with a saved configuration based on at least one of the one or more persistent game play data. In one example, the processor may transfer game play data to a mobile device where the mobile device is configured to initiate a gaming session based on the transferred game play data. In addition, the processor may place the electronic gaming device into a reserved state based on the transferred persistent game play data. Further, the processor may initiate a warning based on reserved state becoming unreserved within a predetermined time period.

In another embodiment, a method of providing game play via an electronic mobile device may include generating via one or more processors one or more persistent game play data and transferring via the one or more processors the one or more persistent game play data.

The method may also include generating a ticket which includes at least one of the one or more persistent game play data; restarting game play at a saved state based on at least one of the one or more persistent game play data; transferring at least one of the one or more persistent game play data to a magnetic card; restarting game play at a predetermined phase based on at least one of the one or more persistent game play data; and/or transferring at least one of the one or more persistent game play data to a mobile device.

In another embodiment, the electronic gaming system may include a server including a server processor and a server memory. The system may include a display device including a plurality of reels where the plurality of reels includes one or more areas. The server memory includes one or more persistent game play structures and the server processor may generate one or more symbols to be located in the one or more areas. The server processor may generate one or more persistent game play data and to transfer the one or more persistent game play data.

Further, the server processor may generate a ticket which includes at least one of the one or more persistent game play data. In addition, the server processor may transfer at least one of the one or more persistent game play data to a magnetic card. The server processor may transfer at least one of the one or more persistent game play data to a mobile device.

Figure 14:
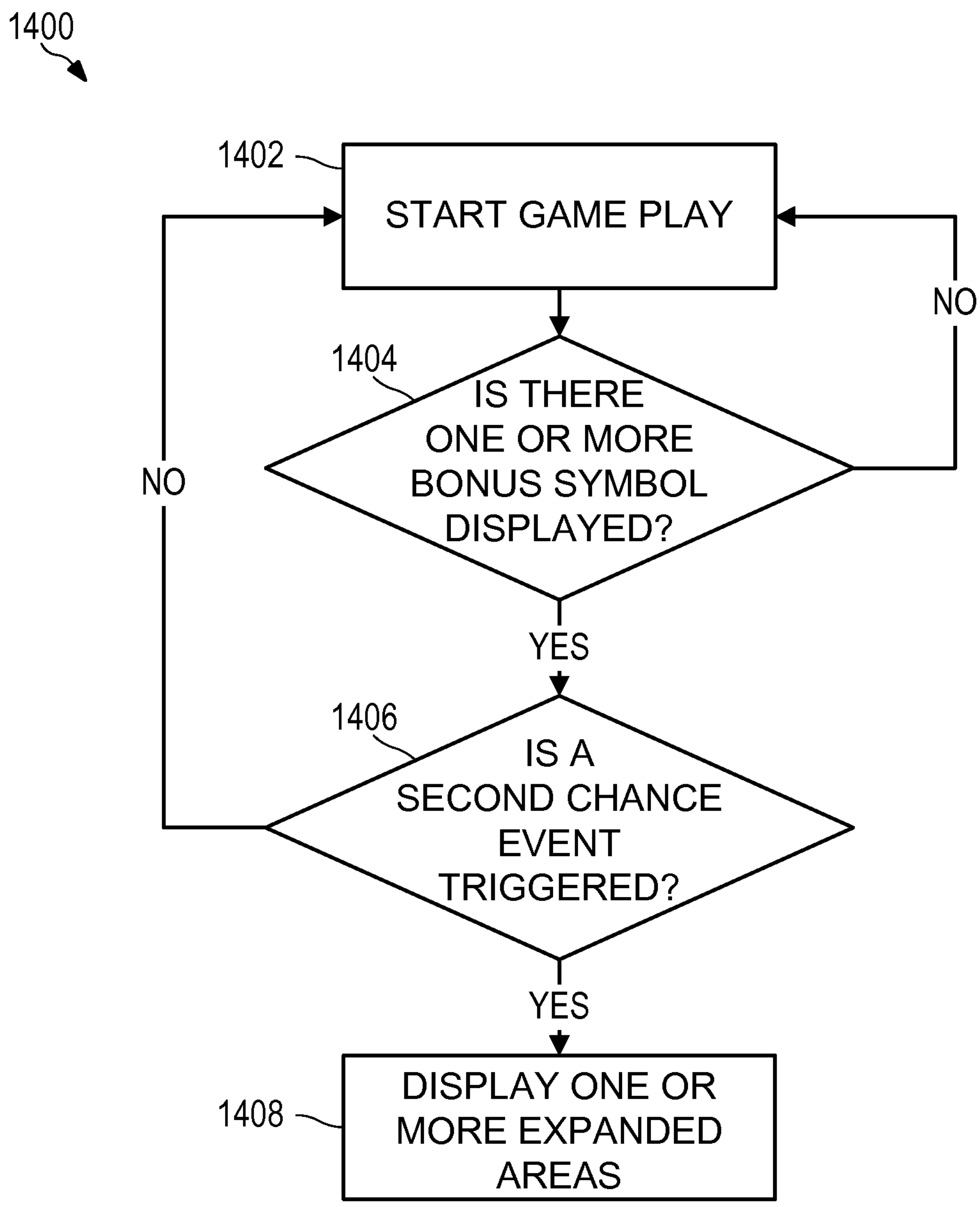
FIG. 14 is a flow diagram for game play, according to one embodiment.

In FIG. 14, a flow diagram for game play is shown, according to one embodiment. A method 1400 may include starting game play (step 1402). The method 1400 may include one or more processors determining whether there are one or more bonus symbols being displayed (step 1404). If there are not one or more bonus symbols displayed, then the method may move back to step 1402 (or continuing game play which would include showing the results of the previous game play). If there are one or more bonus symbols being displayed, then the method may include one or more processors determining whether a second chance event trigger has occurred (step 1406). If no second chance triggering event has occurred, then the method may move back to step 1402. If a second chance triggering event has occurred, then the method may include displaying one or more expanded areas (step 1408). The method may include determining whether a bonus game was triggered by the second chance results (step 1410). The method may include initiating the bonus game based on the second chance results (step 1412). The method may also include returning to step 1402 if no bonus game was triggered by the second chance results. For example, a base game play includes a first bonus symbol which does not trigger a bonus game because 3 bonus symbols are required to trigger the bonus game. However, a secondary base game play is triggered which activates one or more reel spaces which were not activated when reels stopped spinning during the base game. In this example, two more bonus symbols were activated during the secondary base game. Therefore, a total of 3 bonus symbols were active which triggered a bonus game implementation.

Figure 15:
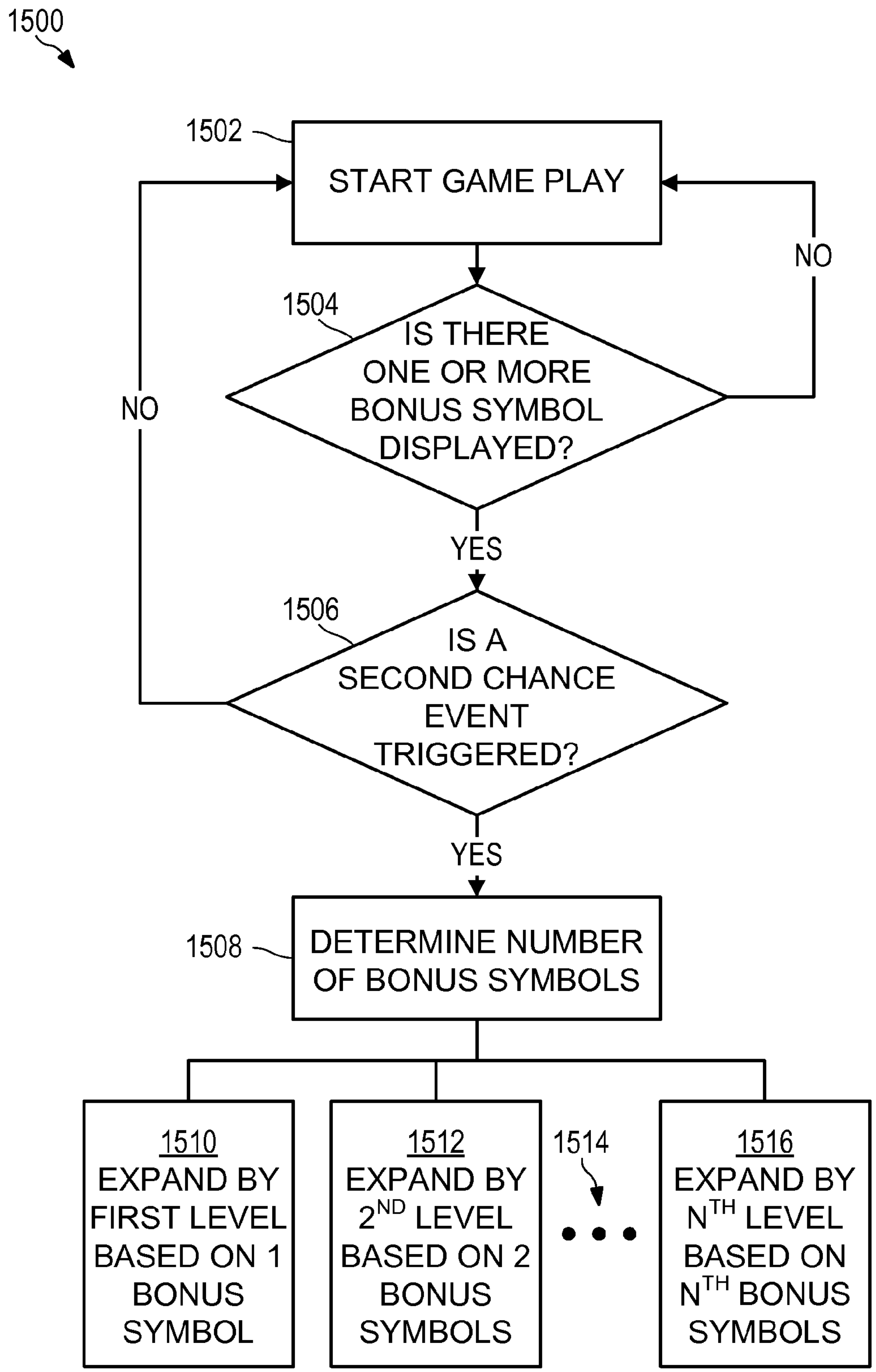
FIG. 15 is a flow diagram for game play, according to one embodiment.

In FIG. 15, a flow diagram for game play is shown, according to one embodiment. A method 1500 may include starting game play (step 1502). The method 1500 may include one or more processors determining whether there are one or more bonus symbols being displayed (step 1504). If there are not one or more bonus symbols displayed, then the method may move back to step 1502 (or continuing game play which would include showing the results of the previous game play). If there are one or more bonus symbols being displayed, then the method may include one or more processors determining whether a second chance event trigger has occurred (step 1506). If no second chance triggering event has occurred, then the method may move back to step 1502. If a second chance triggering event has occurred, then the method may include determining the number on bonus symbols which are being displayed (step 1508). The method may include one or more of the following steps: 1) expanding by a first level based on 1 bonus symbol being displayed (step 1510); 2) expanding by a second level based on 2 bonus symbols being displayed (step 1512); . . . ; and/or expanding by an Nth level based on an Nth bonus symbols being displayed (step 1516). The method may include determining whether a bonus game was triggered by the second chance results (See step 1410 from FIG. 14). The method may include initiating the bonus game based on the second chance results (See step 1412 from FIG. 14). The method may also include returning to step 1502 if no bonus game was triggered by the second chance results. In one example, when there are a first number of bonus symbols (e.g., 1) the system, device, and method expands one or more reels by a first level (e.g., 1 row, one space, 10 spaces, etc.). Further, when there are a second number of bonus symbols (e.g., 2) the system, device, and method expands one or more reels by a second level (e.g., 2 row, two spaces, 20 spaces, etc.). In addition, when there is an Nth number of bonus symbols (e.g., Nth) the system, device, and method expands one or more reels by an Nth level (e.g., Nth row, Nth spaces, etc.).

Figure 16:
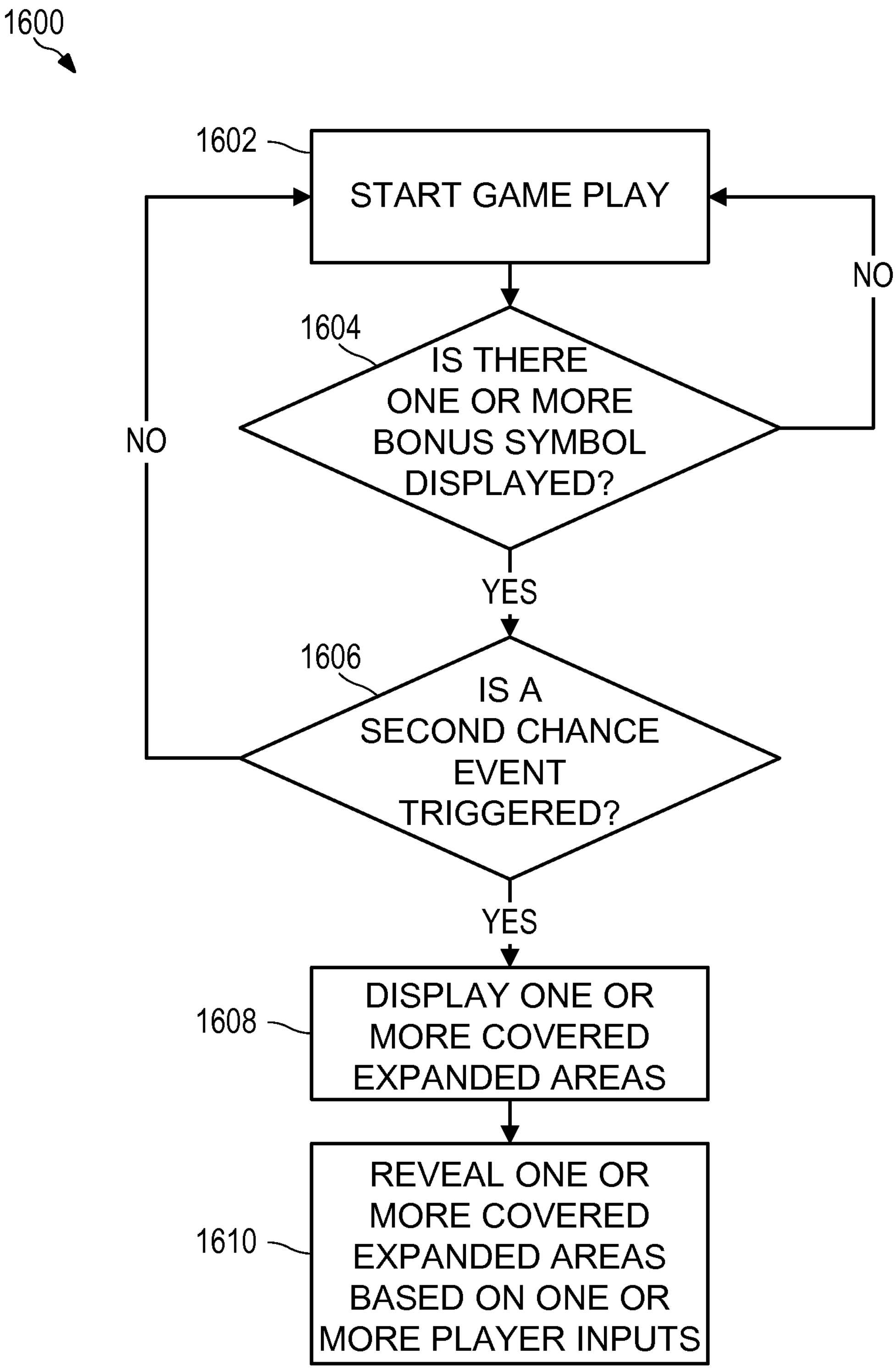
FIG. 16 is a flow diagram for game play, according to one embodiment.

In FIG. 16, a flow diagram for game play is shown, according to one embodiment. A method 1600 may include starting game play (step 1602). The method 1600 may include one or more processors determining whether there are one or more bonus symbols being displayed (step 1604). If there are not one or more bonus symbols displayed, then the method may move back to step 1602 (or continuing game play which would include showing the results of the previous game play). If there are one or more bonus symbols being displayed, then the method may include one or more processors determining whether a second chance event trigger has occurred (step 1606). If no second chance triggering event has occurred, then the method may move back to step 1602. If a second chance triggering event has occurred, then the method may include displaying one or more covered areas (step 1608). The method may include revealing one or more covered expanded areas based on one or more player inputs (step 1610). The method may include determining whether a bonus game was triggered by the second chance results (See step 1410 from FIG. 14). The method may include initiating the bonus game based on the second chance results (See step 1412 from FIG. 14). The method may also include returning to step 1602 if no bonus game was triggered by the second chance results. In this example, the system, device, and/or method presents the player with one or more non-active reel spaces which can become active reel spaces based on the player selecting the non-active reel space. In this example, the player may have Nth selection options. For clarity purposes, the player may have three options (e.g., a first non-active reel space, a second non-active reel space, and a third non-active reel space) to select from. The player may be allowed to select two of these options (and/or one of these options). In this example, the player selected the first non-active reel space and the second non-active reel space to make active. The system, device, and/or method would make these selected reel spaces active and determine whether additional payouts are generated and/or a bonus game was triggered.

Figure 17:
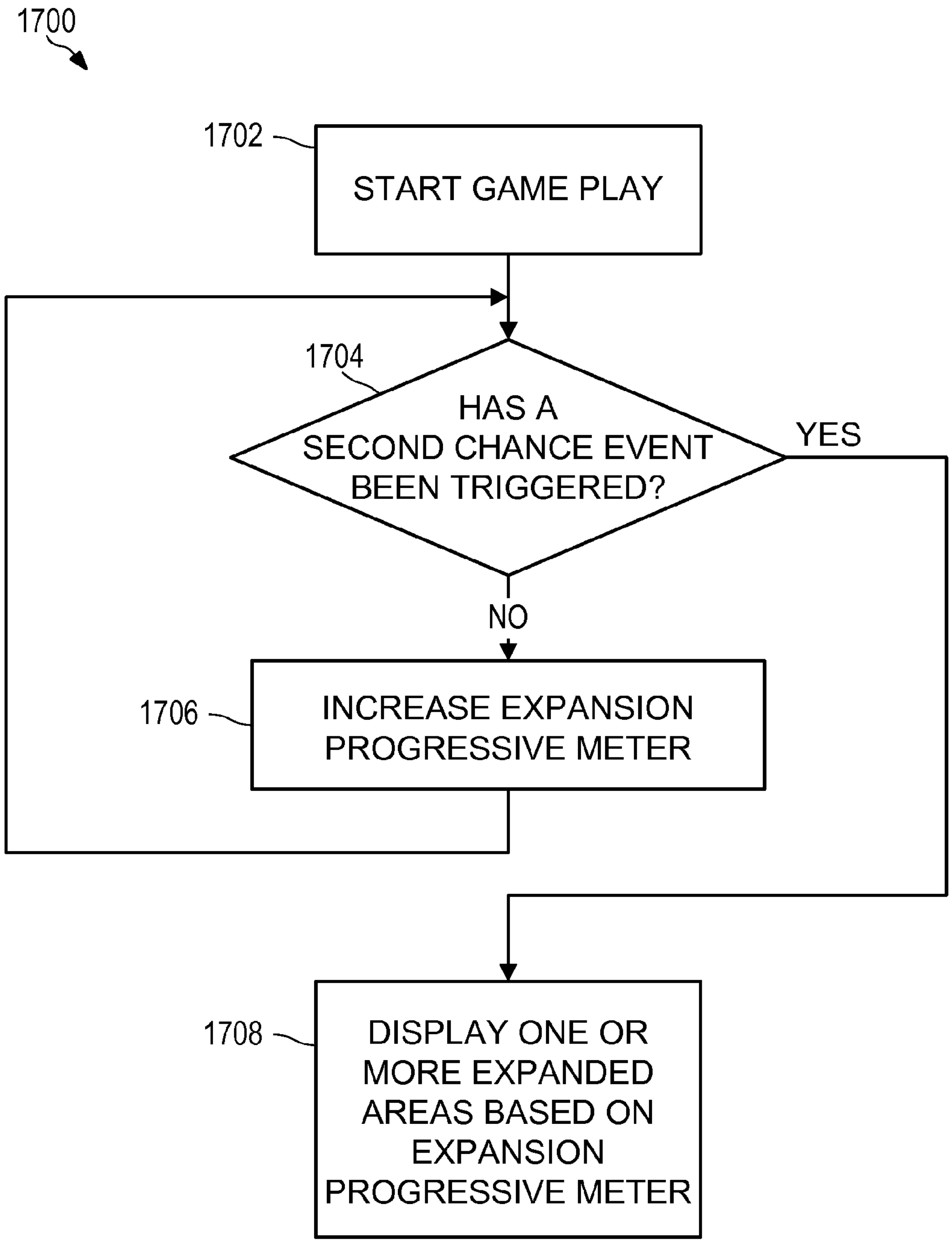
FIG. 17 is a game play flow diagram, according to one embodiment.

In FIG. 17, a game play flow diagram is shown, according to one embodiment. A method 1700 may include starting game play (step 1702). The method 1700 may include one or more processors determining whether a second chance event has been triggered (step 1704). If the second chance event has been triggered, then the method may include displaying one or more expanded areas based on the expansion progressive meter (step 1708). If the second chance event has not been triggered, then the method may include increasing the expansion progressive meter by one or more units (step 1706) and returning to game play. In this example, the system, device, and/or method maintain an expansion meter which is increased every time a base game is played without a secondary base game being initiated. The size of any expansion areas utilized during a secondary base game is controlled by the level that the expansion meter is at when the secondary base game is triggered. In other words, a first expansion level (e.g., 3 units) may be based on a first expansion meter level (e.g., 10 units) and a second expansion level (e.g., 10 units) may be based on a second expansion meter level (e.g., 16 units).

Figure 18:
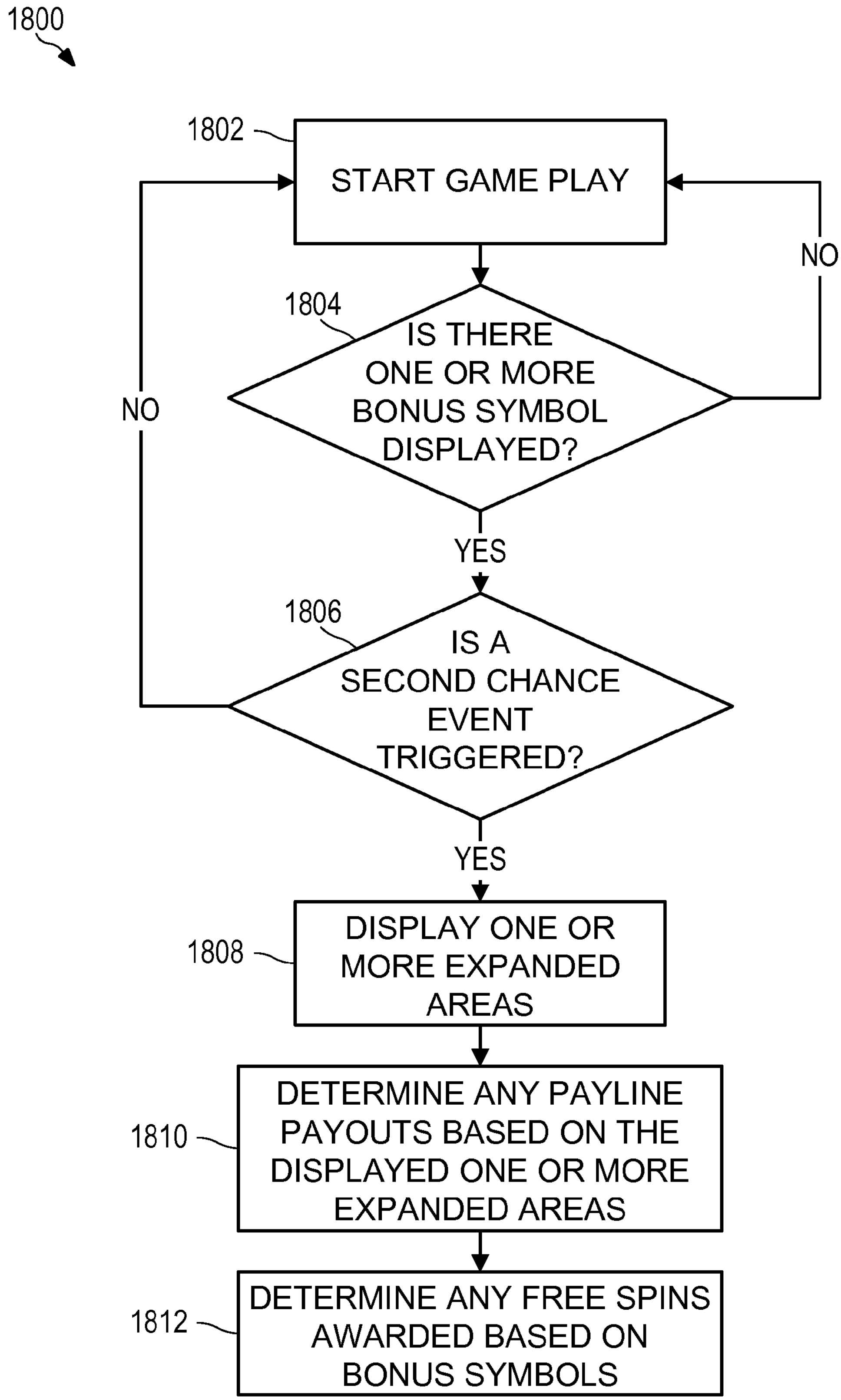
FIG. 18 is a game play flow diagram, according to one embodiment.

In FIG. 18, a flow diagram for game play is shown, according to one embodiment. A method 1800 may include starting game play (step 1802). The method 1800 may include one or more processors determining whether there are one or more bonus symbols being displayed (step 1804). If there are not one or more bonus symbols displayed, then the method may move back to step 1802 (or continuing game play which would include showing the results of the previous game play). If there are one or more bonus symbols being displayed, then the method may include one or more processors determining whether a second chance event trigger has occurred (step 1806). If no second chance triggering event has occurred, then the method may move back to step 1802. If a second chance triggering event has occurred, then the method may include displaying one or more expanded areas (step 1808). The method may include determining via one or more processors any payline payouts based on the displayed one or more expanded areas (step 1810). The method may include determining any free spins awarded based on one or more bonus symbols (step 1812).

Figure 19A:
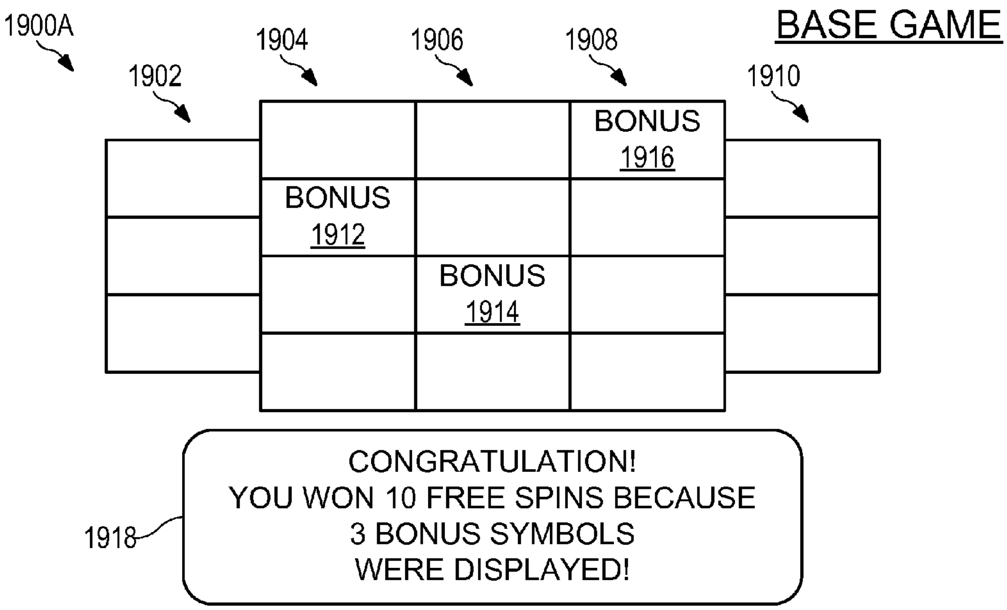
FIG. 19A is an illustration of a base game on a gaming device, according to one embodiment.

In FIG. 19A, an illustration of second chance base game play on a gaming device is shown, according to one embodiment. A first electronic game display area image 1900A may include a plurality of display areas including a first active display reel 1902, a second active display reel 1904, a third active display reel 1906, a fourth active display reel 1908, and/or a fifth active display reel 1910. The active display reel areas are portions of the reels that can be seen by the player and/or utilized to determine one or more winning combinations on one or more active paylines. For example, a reel may consists of 100 reel spaces where each reel space has a specific symbol (e.g., an Ace, a King, a diamond, a wild, a scatter, etc.) located in each reel space. During a reel spin, one or more of these symbols are shown passing one or more active display reel areas until the reel stops spin and the reel spaces that have stopped onto the active display reel areas are shown and/or utilized to determine one or more payouts and/or winning combinations based on one or more active paylines (and/or one or more bonus game triggering events). In addition, the reel locations outside of the active display reel areas are not shown to the player and/or are not utilized to determine one or more payouts and/or winning combinations based on one or more active paylines. In normal game play, the symbols in these areas may not been seen by the player. Further, the reels may be video display reels and/or mechanical display reels.

First electronic game display area image 1900A shows a game outcome where a player has won 10 free spins in a bonus game because the 3 bonus symbols were displayed in second active display reel 1904, third active display reel 1906, and/or fourth active display area 1908. In this example, a first message 1918 may state "CONGRATULATIONS! YOU WON 10 FREE SPINS BECAUSE 3 BONUS SYMBOLS WERE DISPLAYED!" It should be noted that any bonus game may be utilized and/or that any number of free spins (e.g., 1-N) may be utilized. In this example, 3 bonus symbols needed to be displayed on second active display reel 1904, third active display reel 1906, and/or fourth active display area 1908. In this example, a first bonus symbol 1912 was displayed on second active display reel 1904, a second bonus symbol 1914 was displayed on third active display reel 1906, and a third bonus symbol 1916 was displayed on fourth active display area 1908. However, 3 bonus symbols may have been displayed on fourth active display area 1908 to obtain the bonus free spins game. In addition, 2 bonus symbols may have been displayed on fourth active display area 1908 and 1 bonus symbol may have been displayed on either the third active display reel 1906 and/or the second active display reel 1904 to obtain the bonus free spins game. Any combination of 3 bonus symbols on any of the designated reels (e.g., reels 2-4) may be utilized. Further, any number of bonus symbols may be required (e.g., 1 to N) to initiate a bonus game and/or any number of reels (e.g., reels 1-5 and/or 1-N) may be utilized. In addition, any combination of reels may be utilized—bonus symbols may only count when they appear on reels 1, 3, 5 and N (and/or reels 2, 3, and 5—and/or reels 3, 4, and 6, etc.). In this example, the player obtained the bonus game utilizing the base game only and did not require a second chance base game play. The second chance base game play may be considered a secondary base game which is utilized with the base game play to enhance the probability of obtaining the bonus game play.

Figure 19B:
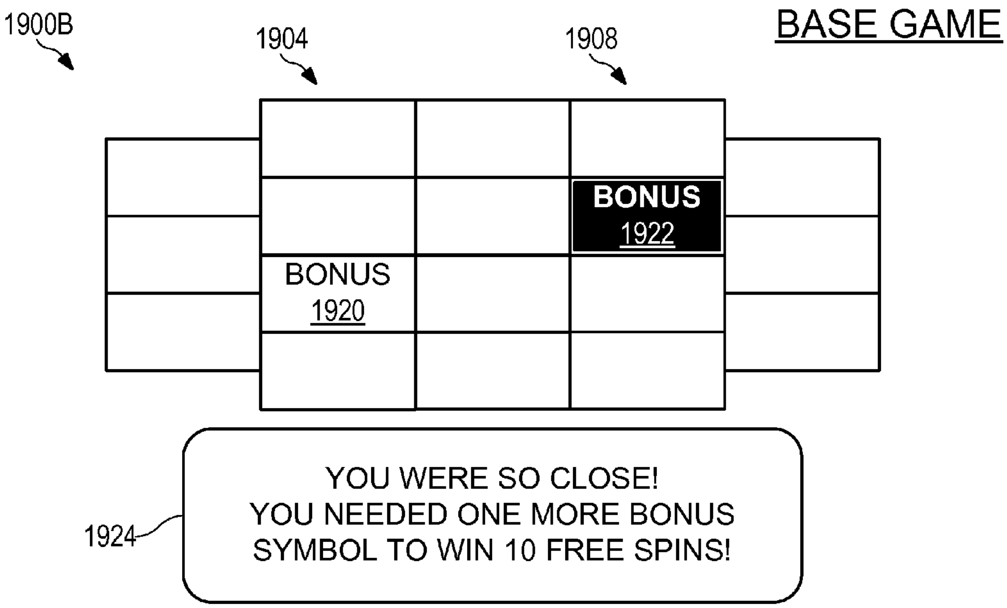
FIG. 19B is another illustration of a base game on a gaming device, according to one embodiment.

In FIG. 19B, another illustration of second chance base game play on a gaming device, according to one embodiment. A second electronic game display area image 1900B may show base game play where the outcome included a first bonus symbol 1920 and a first special bonus symbol 1922 which does not trigger the bonus game because 2 bonus symbols were displayed when 3 bonus symbols are required to initiate bonus game play. In this example, a second message 1924 may state "YOU WERE SO CLOSE! YOU NEEDED ONE MORE BONUS SYMBOL TO WIN 10 FREE SPINS!" In normal base game play mode, this would end base game play and the player and/or game would move onto the next base game play spin. However, this disclosure demonstrates a new secondary base game play mode where the base game is extended to allow for a second chance to trigger one or more bonus games during a secondary base game mode. In this example, first special bonus symbol 1922 may be a special bonus symbol and/or the bonus symbol may be special because of the location that the normal bonus symbol was located in. A special symbol may be utilized to trigger the second chance base game play mode. Further, the number of bonus symbols may be utilized to trigger the second chance base game play mode. In addition, the number of bonus symbols and the number of special symbols may be utilized to trigger the second chance base game play mode. Further, the interaction (e.g., relative location to each other) between bonus symbols and/or special symbols may be utilized to trigger the second chance base game play mode (e.g., a secondary base game). The relative location to each other may be when a first bonus symbol (and/or a first special symbol) is within 1 unit (and/or 2 units, 3 units, . . . , Nth units) from a second bonus symbol (and/or a second special symbol). Further, a path taken by a presentation may be utilized to determine the size of the expansion area and/or a triggering of the secondary base game. In addition, the location on the active reel display area may be utilized to determine the size of the expansion area and/or a triggering of the secondary base game—for example, when the bonus symbol are in the top-right corner (and/or lower right corner, a predetermined box, all on the top row, all on the bottom row, and/or any other symbol area location). In addition, any of the concepts may be combined. In this example, a second chance base game play mode was triggered based on the appearance of the first special bonus symbol 1922.

Figure 19C:
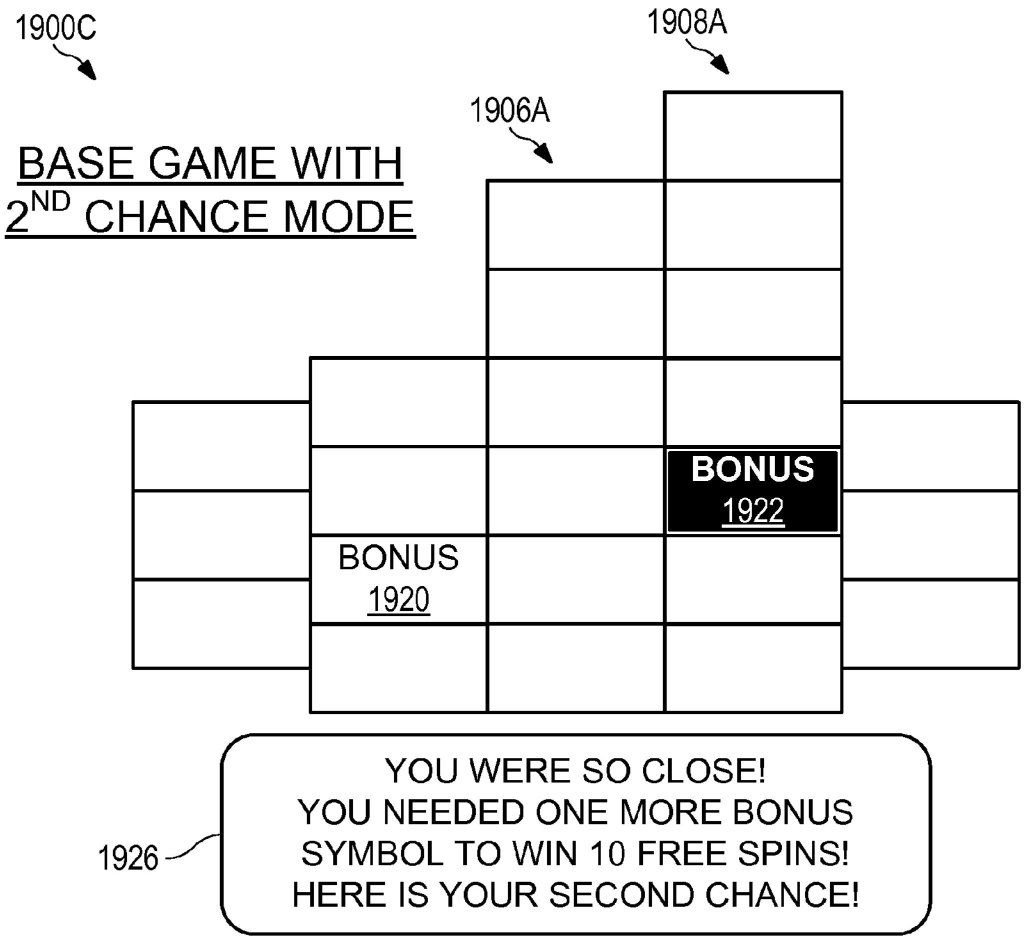
FIG. 19C is an illustration of a base game with a second chance base game on a gaming device, according to one embodiment.
Figure 19D:
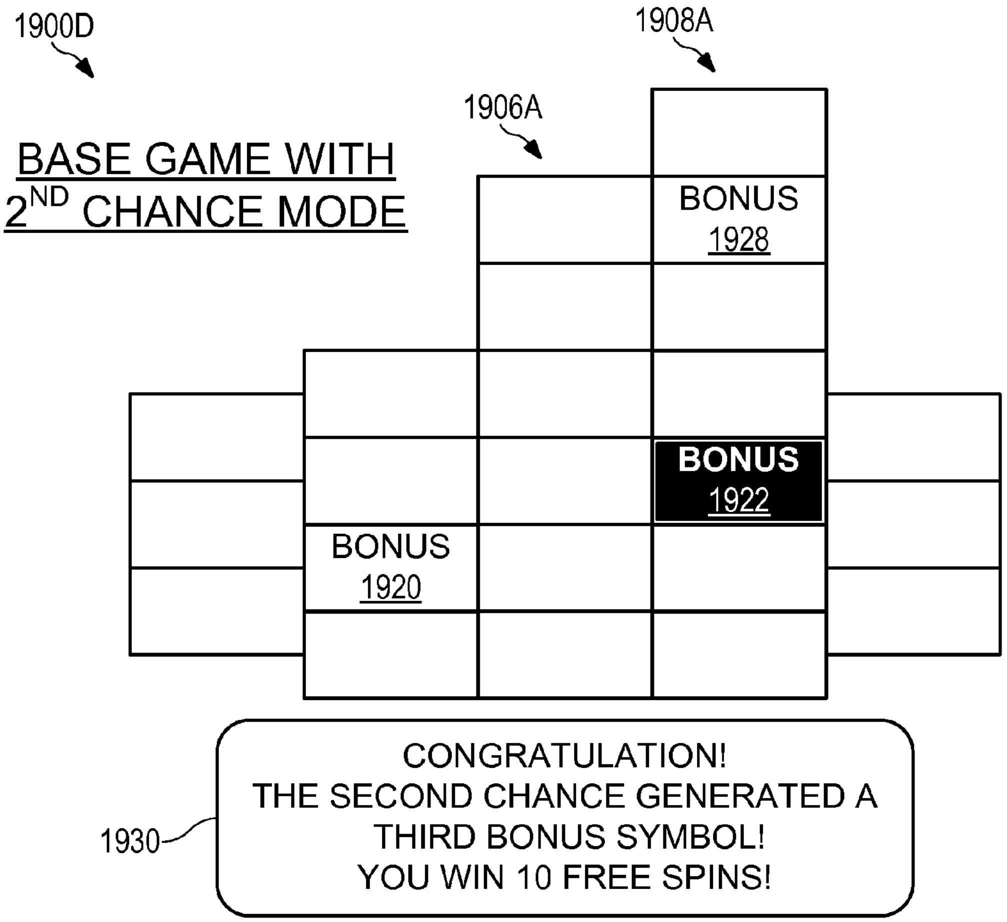
FIG. 19D is another illustration of a base game with a second chance base game on a gaming device, according to one embodiment.

In FIG. 19C, a third electronic game display area image 1900C shows the electronic gaming device in a second chance base game play mode. In this example, the base game outcome included first bonus symbol 1920 and a first special bonus symbol 1922 which did not trigger the bonus game because 2 bonus symbols were displayed when 3 bonus symbols are required to initiate bonus game play. Therefore, in non-second chance base game play mode, this base game play would be completed and the gaming device would move to the next base game spin However, in this example, a third message 1926 may state "YOU WERE SO CLOSE! YOU NEEDED ONE MORE BONUS SYMBOL TO WIN 10 FREE SPINS! HERE IS YOUR SECOND CHANCE!" In this example, once the second chance was triggered, game play moves to a second chance base game play mode which may be a secondary base game play mode. In this example of the second chance base game play mode, an extended display reel area 1907 is displayed. In this example, the extended display reel area 1907 was in an inactive state (e.g., could not be utilized to form a winning outcome and/or utilizing bonus symbols to trigger a bonus game play, etc.) before the second chance base game play mode and/or before the extended display reel area 1907 was shown. In this example, the extended display reel area 1907 has increased the third active display area 1906 by 2 reel spaces and created an expanded third active display area 1906A. Further, the extended display reel area 1907 has increased the fourth active display area 1908 by 3 reel spaces and created an expanded fourth active display area 1908A. These extended and/or expanded areas may now be utilized to form one or more winning payline outcomes and/or to obtain addition bonus symbols to trigger a bonus game. For example in FIG. 19D, a third bonus symbol 1928 was displayed in the extended display reel area 1907 on one or more expanded reel spaces relating to the expanded fourth active display area 1908A. In this example, a fourth message 1930 may state "CONGRATULATIONS! THE SECOND CHANCE GENERATED A THIRD BONUS SYMBOL! YOU WIN 10 FREE SPINS!" In addition, the second chance may be triggered based on a random number generated, a predetermined pattern, a length of game play by a player, a time of day, an amount of credits played since the last second chance triggering event, and/or any combination thereof. In one example, a bonus symbol and a special symbols relative location may be utilized to trigger a secondary base game. In another example, the second chance base game play mode may not result in a third bonus symbol (and/or any item required for the generation of a bonus game play and/or a winning event). In this example, no bonus game play was triggered because none of the expanded reel area spaces had a bonus symbol. Further as seen in FIG. 19G, a second special bonus symbol 1928 may be generated in the extended display reel area 1907 which may trigger an enhanced bonus game play (e.g., normal 10 free spins are won but now 20 free spins are won).

Figure 19E:
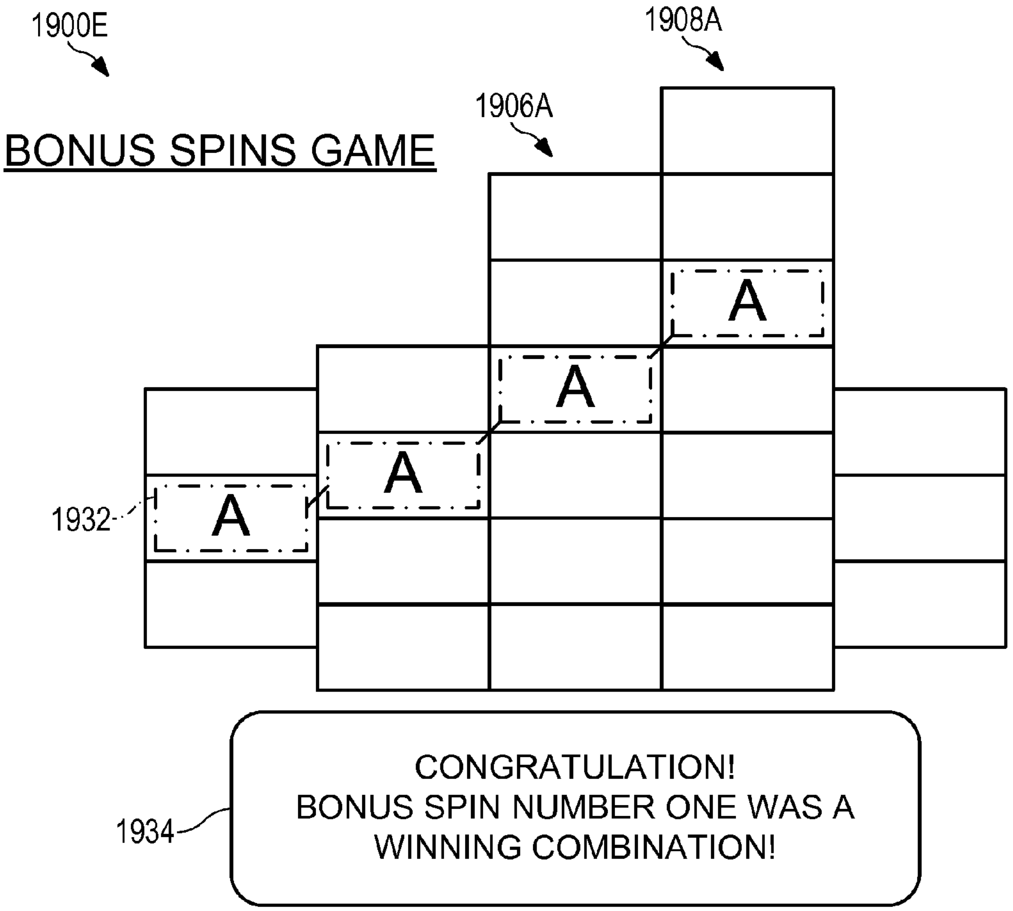
FIG. 19E is an illustration of bonus game with extended reels on a gaming device, according to one embodiment.
Figure 19F:
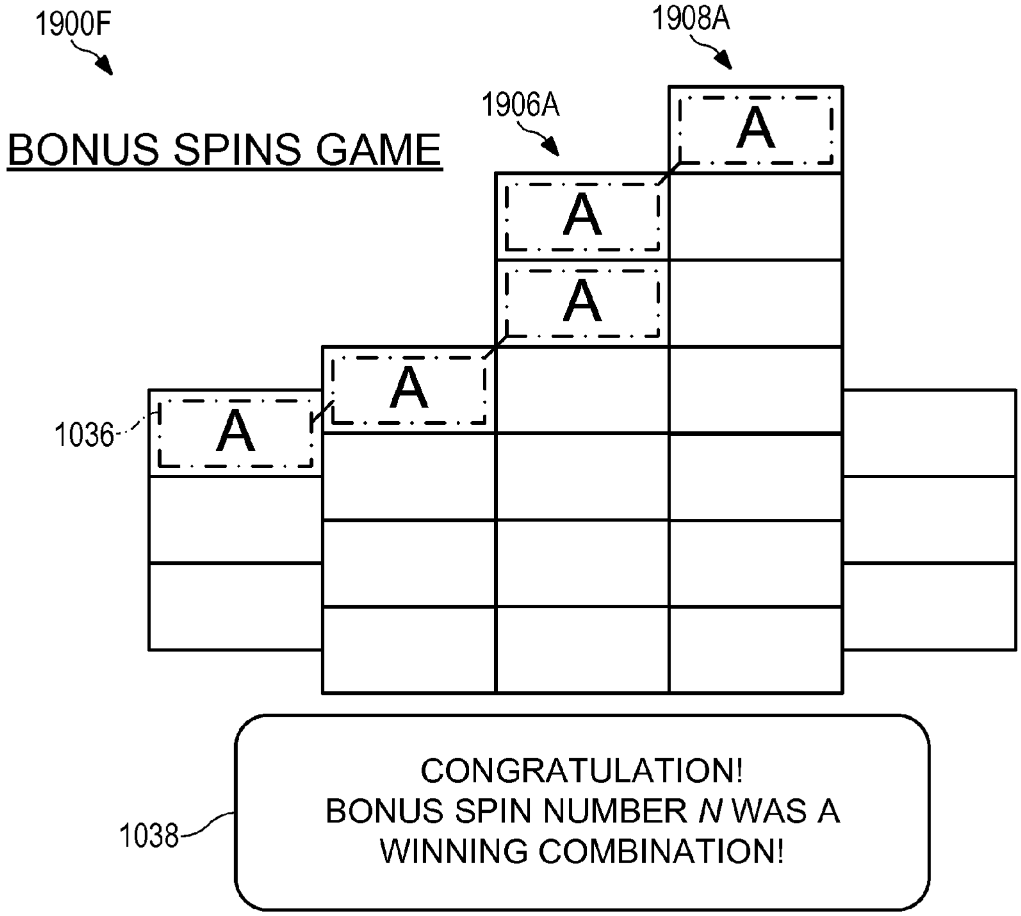
FIG. 19F is another illustration of bonus game with extended reels on a gaming device, according to one embodiment.
Figure 19G:
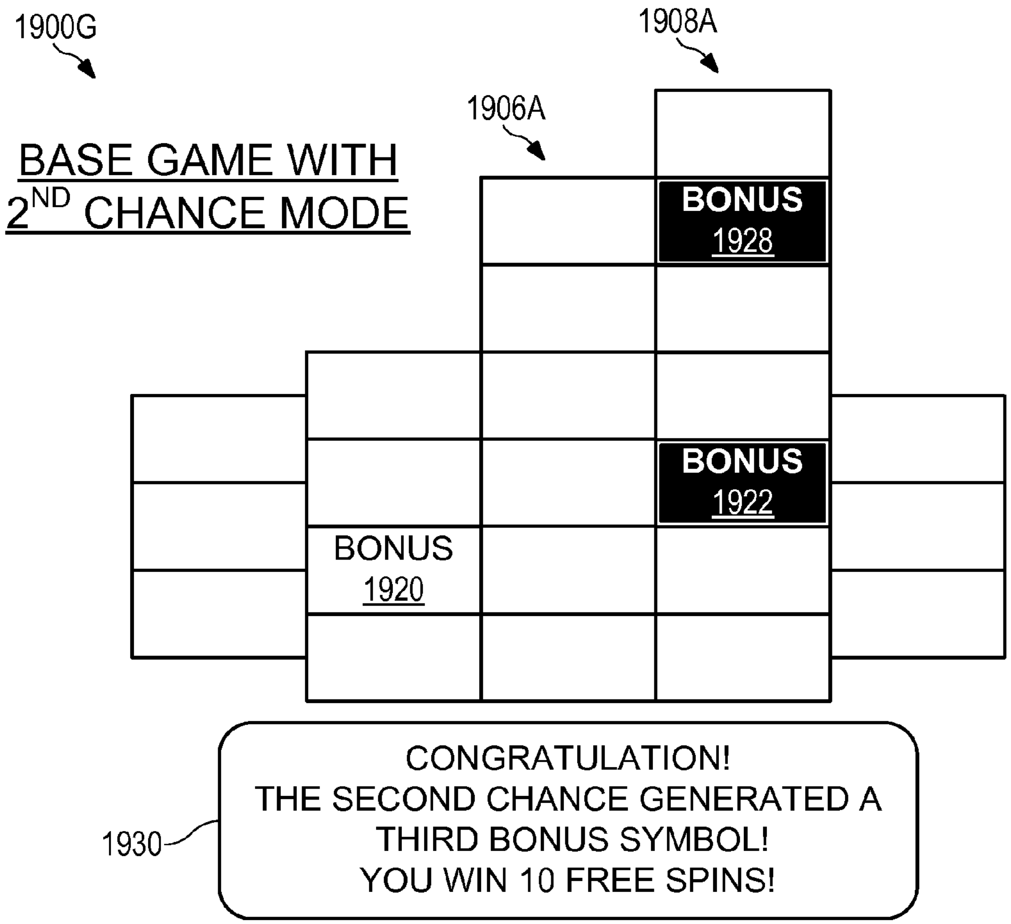
FIG. 19G is another illustration of a base game with a second chance base game on a gaming device, according to one embodiment.

In FIG. 19E, a bonus game play is shown, according to one embodiment. A first bonus game play image 1900E may include a base game area (the area utilized in FIG. 6F) which is utilized with extended display reel area 707 (see FIG. 7S) during a bonus game play. In this example, the extended display reel area 707 has increased the third active display area 706 by 2 reel spaces and created an expanded third active display area 706A. Further, the extended display reel area 707 has increased the fourth active display area 708 by 3 reel spaces and created an expanded fourth active display area 708A. These extended and/or expanded areas may now be utilized to form one or more winning payline outcomes. In this example, a first winning outcome 1932 included three A symbols in the base game area (the area utilized in FIG. 6F) and one A symbol in the extended display reel area 707 to form a winning outcome with 4 A symbols which had a first prize amount. It should be noted that if the bonus game did not include the expanded areas, then the first winning outcome 776 may have included only three A symbols in the base game area (the area utilized in FIG. 6F) which had a second prize amount which would be less than the first prize amount. In another example, the first winning outcome 1932 may not have been a winning outcome if the extended display reel area 707 was not utilized when game play requires that four A symbols are generated to form a winning outcome. In FIG. 19F, another bonus game play is shown, according to one embodiment. A second bonus game play image 1900F may include a base game area (the area utilized in FIG. 6F) which is utilized with extended display reel area 707 during a bonus game play. In this example, the extended display reel area 707 has increased the third active display area 706 by 2 reel spaces and created an expanded third active display area 706A. Further, the extended display reel area 707 has increased the fourth active display area 708 by 3 reel spaces and created an expanded fourth active display area 708A. These extended and/or expanded areas may now be utilized to form one or more winning payline outcomes. In this example, a second winning outcome 1036 included two A symbols in the base game area (the area utilized in FIG. 6F) and three A symbols in the extended display reel area 707 to form a winning outcome with 5 A symbols which had a first prize amount. It should be noted that if the bonus game did not include the expanded areas, then the second winning outcome 1036 may have included only two A symbols in the base game area (the area utilized in FIG. 6F) which had a second prize amount which would be less than the first prize amount. In another example, the second winning outcome 1036 may not have been a winning outcome if the extended display reel area 707 was not utilized when game play requires that three A symbols are generated to form a winning outcome.

Figure 20A:
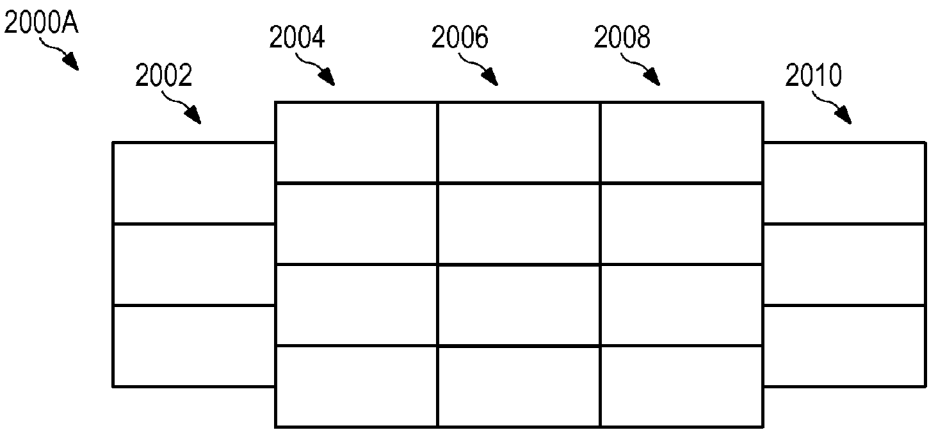
FIG. 20A is an illustration of a second chance base game and/or a bonus game structure on a gaming device, according to one embodiment.

In FIG. 20A, an illustration of second chance base game play on a gaming device is shown, according to one embodiment. A first electronic game display area image 2000A may include a plurality of display areas including a first active display reel 2002, a second active display reel 2004, a third active display reel 2006, a fourth active display reel 2008, and/or a fifth active display reel 2010 utilized during a base game play mode. The active display reel areas are portions of the reels that can be seen by the player and/or utilized to determine one or more winning combinations on one or more active paylines (and/or one or more bonus triggering events). For example, a reel may consists of 50 reel spaces where each reel space has a specific symbol (e.g., an Ace, a King, a diamond, a wild, a scatter, etc.) located in each reel space. During a reel spin, one or more of these symbols are shown passing one or more active display reel areas until the reel stops spin and the reel spaces that have stopped onto the active display reel areas are shown and/or utilized to determine one or more payouts and/or winning combinations based on one or more active paylines (and/or one or more bonus triggering events). In addition, the reel locations outside of the active display reel areas are not shown to the player and/or are not utilized to determine one or more payouts and/or winning combinations based on one or more active paylines (and/or one or more bonus triggering events). In normal game play, the symbols in these areas may not been seen by the player. Further, the reels may be video display reels and/or mechanical display reels.

Figure 20B:
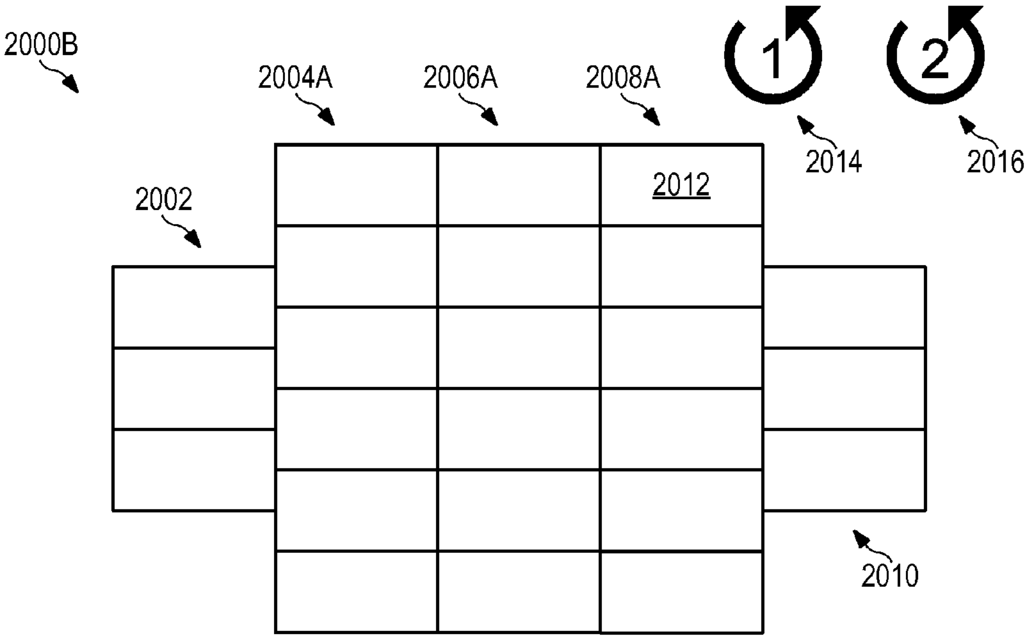
FIG. 20B is another illustration of a second chance base game and/or a bonus game structure on a gaming device, according to one embodiment.

In FIG. 20B, another illustration of second chance base game play on a gaming device is shown, according to one embodiment. A second chance base game play mode image 2000B may include an expanded active reel area 2011. In this example, a first plurality of reel strips 2014 was utilized for game play in the base game but a second plurality of reel strips 2016 was utilized for second chance base game play. In this example, the probability to obtain a bonus symbol and/or any other symbol may be different for the first plurality of reel strips 2014 versus the second plurality of reel strips 2016. Therefore, when the electronic gaming device is in second chance base game play mode the probability of obtaining a bonus symbol may be increased and/or decrease based on utilizing the second plurality of reel strips 2016 versus utilizing the first plurality of reel strips 2014. Further, the probability may be kept constant for the bonus symbol and/or any other symbol. In addition, one or more probabilities for one or more symbols may be kept constant while the one or more probabilities for one or more symbols may be varied. The utilization of different plurality of reel strips may be utilized with any example in this disclosure. For example, the first plurality of reel strips 2014 may include 10 bonus symbols where the second plurality of reel strips 2016 may include 20 bonus symbols. Therefore, based on both reel strips having the same number of reel spaces, the second plurality of reel strips 2016 has twice the probability of generating a bonus symbol as the first plurality of reel strips 2014. Any probability differences may be utilized.

Figure 21A:
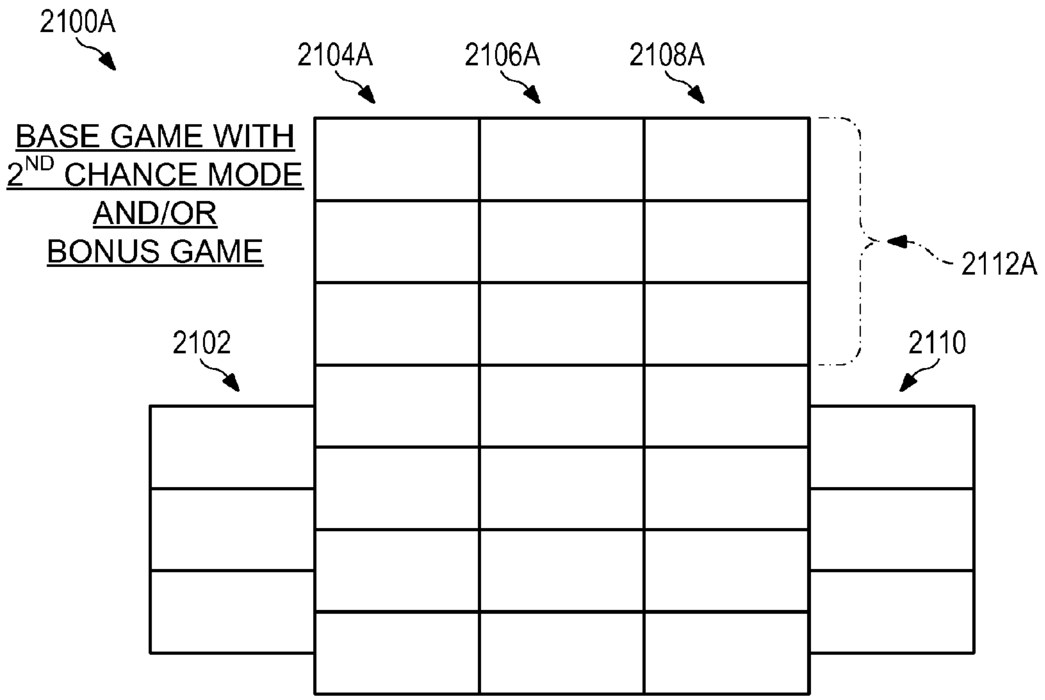
FIG. 21A is another illustration of a base game, a second chance base game, and/or a bonus game structure on a gaming device, according to one embodiment.
Figure 21B:
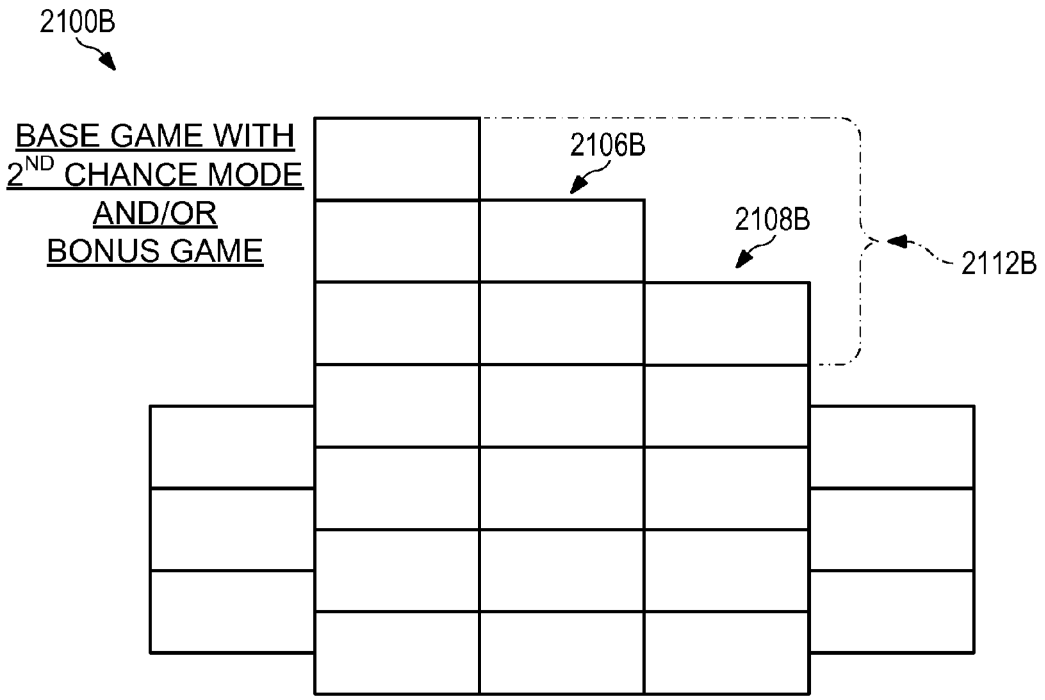
FIG. 21B is another illustration of a base game, a second chance base game, and/or a bonus game structure on a gaming device, according to one embodiment.
Figure 21C:
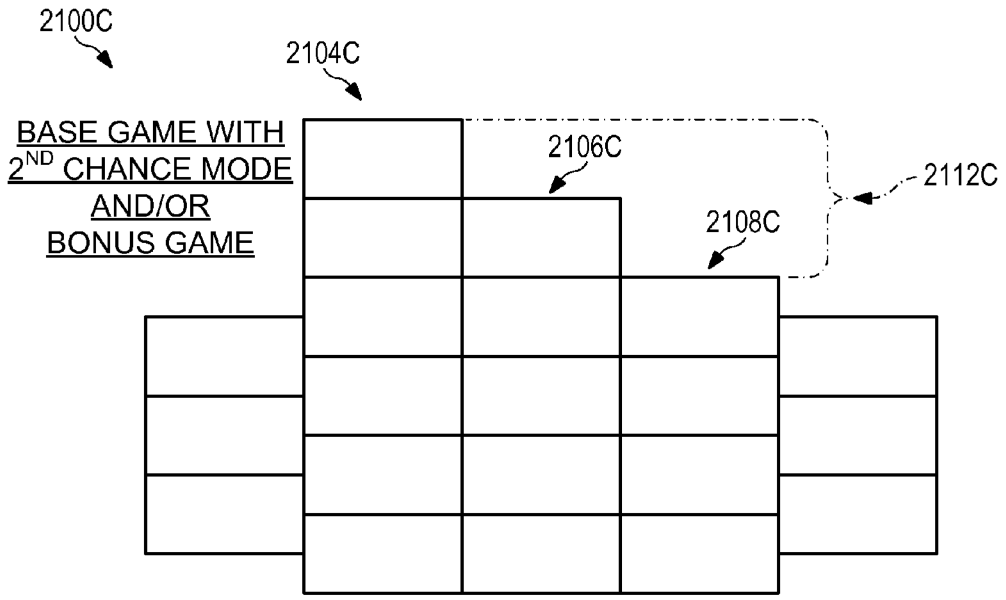
FIG. 21C is another illustration of a base game, a second chance base game, and/or a bonus game structure on a gaming device, according to one embodiment.
Figure 21D:
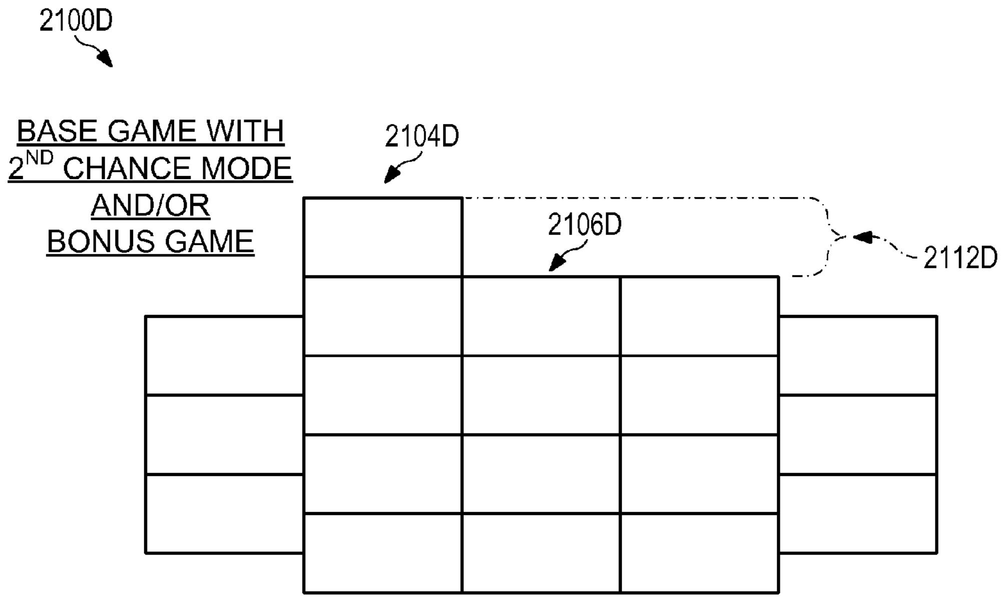
FIG. 21D is another illustration of a base game, a second chance base game, and/or a bonus game structure on a gaming device, according to one embodiment.

In FIG. 21A, another illustration of second chance base game play on a gaming device is shown, according to one embodiment. A first second chance base game play mode image 2100A may include a first stage extended active reel area 2112A which is utilized for a first second chance base game play. In this example, the 3×3 extended reel matrix forms a portion of the extended second reel area 2104A, the extended third reel area 2106A, and the extended fourth reel area 2108A for the first second chance base game play. This first stage extended active reel area 2112A may decay (e.g., become smaller) on sequent second chance base game play spins and/or games. For example, on a second second chance base game play image 2100B (see FIG. 21B), the first stage extended active reel area 2112A has decreased to a second stage extended active reel area 2112B for a second game play in the second chance base game play mode. In this example, the second stage extended active reel area 2112B has decreased by 3 reel area spaces (e.g., 1 reel space in extended third reel area 2106A and 2 reel spaces in the extended fourth reel area 2108A). In another example, on a third second chance base game play image 2100C (see FIG. 21C), the second stage extended active reel area 2112B has decreased to a third stage extended active reel area 2112C for a third game play in the second chance base game play mode. In this example, the third stage extended active reel area 2112C has decreased by 3 reel area spaces (e.g., 1 reel space in extended second reel area 2104A, 1 reel space in extended third reel area 2106A, and 1 reel space in the extended fourth reel area 2108A). In another example, on a fourth second chance base game play image 2100D (see FIG. 21D), the third stage extended active reel area 2112C has decreased to a fourth stage extended active reel area 2112D for a fourth game play in the second chance base game play mode. In this example, the fourth stage extended active reel area 2112D has decreased by 2 reel area spaces (e.g., 1 reel space in extended second reel area 2104A, 1 reel space in extended third reel area 2106A, and 1 reel space in the extended fourth reel area 2108A). It should be noted that any number of second chance opportunities may be utilized from 1 to N. Further, the decaying procedure, and/or the decreasing procedure, and/or an increasing procedure for the extended reel area may be in any pattern. In one example, there may be multiple secondary game plays (e.g., 0 to N) during the secondary game play mode (see FIG. 21A-21D for a decaying expanding area mode where the secondary game play mode has 4 chances).

Figure 21E:
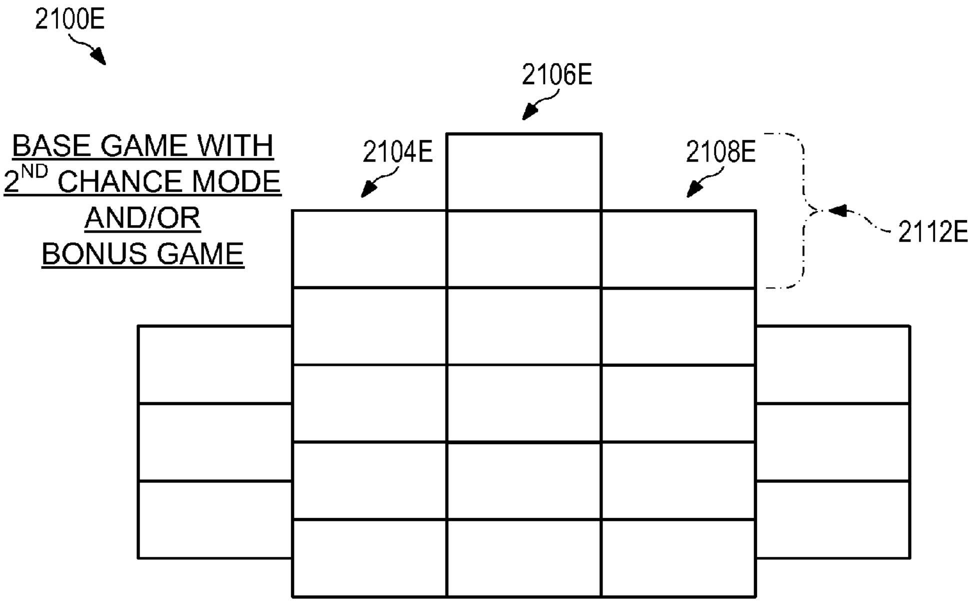
FIG. 21E is another illustration of a base game, a second chance base game, and/or a bonus game structure on a gaming device, according to one embodiment.
Figure 21F:
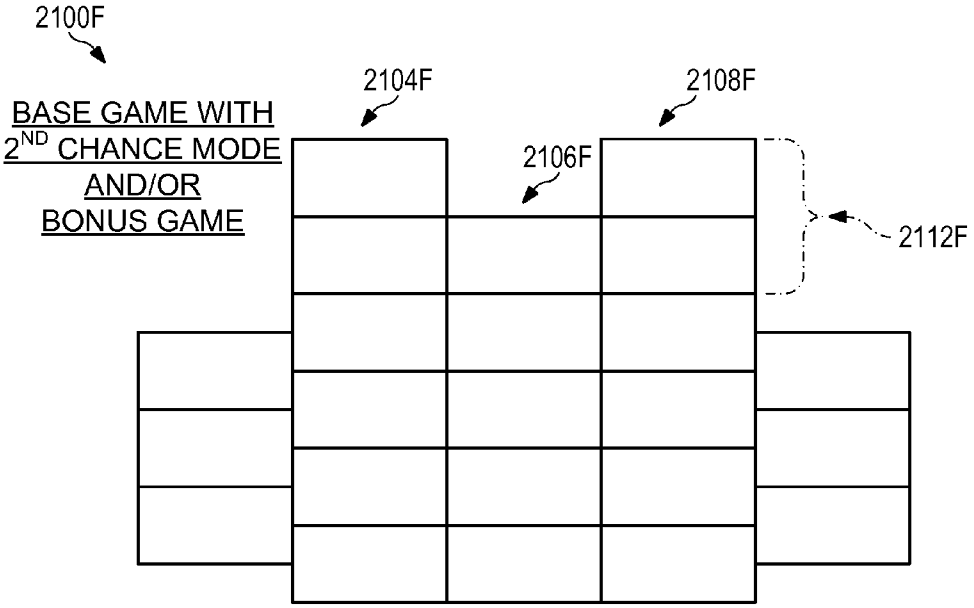
FIG. 21F is another illustration of a base game, a second chance base game, and/or a bonus game structure on a gaming device, according to one embodiment.
Figure 21G:
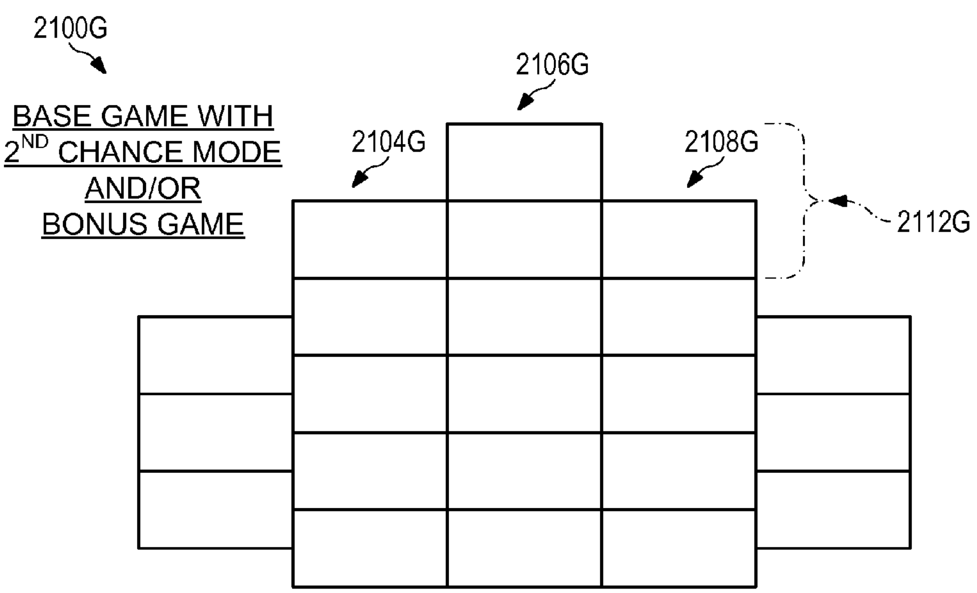
FIG. 21G is another illustration of a base game, a second chance base game, and/or a bonus game structure on a gaming device, according to one embodiment.

In FIG. 21E, another illustration of second chance base game play on a gaming device is shown, according to one embodiment. A second chance base game play mode image 2100E may include a first extended area 2112E where the first extended area 2112E increase one additional reel space area being active in the second extended reel 2104E and the fourth extended reel 2108E while two additional reel space areas are active in the third extended reel 2106E for a first second chance base game play and/or first second chance spin. In another example, the system, device, and/or method may flip these around for a second second chance base game play and/or second second chance spin (see FIG. 21F). In FIG. 21F, first extended area 2112E where the first extended area 2112E increases two additional reel spaces area being active in the second extended reel 2104E and the fourth extended reel 2108E while one additional reel space area is active in the third extended reel 2106E for a second second chance base game play and/or second second chance spin. In another example, the system, device, and/or method may flip these around for a third second chance base game play and/or third second chance spin (see FIG. 21G). In FIG. 21G, first extended area 2112E where the first extended area 2112E increases one additional reel space area being active in the second extended reel 2104E and the fourth extended reel 2108E while two additional reel space areas are active in the third extended reel 2106E for a third second chance base game play and/or third second chance spin.

Figure 21H:
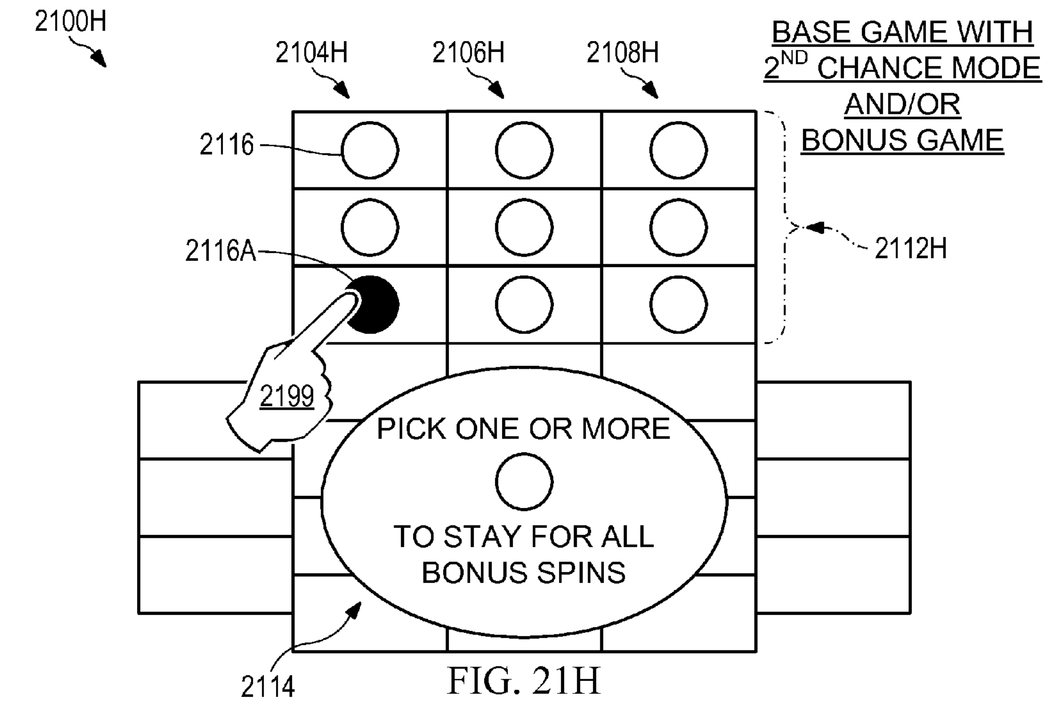
FIG. 21H is another illustration of a base game, a second chance base game, and/or a bonus game structure on a gaming device, according to one embodiment.

In FIG. 21H, another illustration of second chance base game play on a gaming device is shown, according to one embodiment. In this example, after a second chance base game play has generated a bonus game triggering and/or initiation event, the system, device, and/or method may allow the player and/or automatically select one or more areas in the extend active reel area to remain active for one or more of the bonus spins. In this example, the player selects 2199 a first extended reel area 2116A to be active during one or more bonus spins. This active reel area may be utilized to form winning combinations. In addition, the player could have selected a second extended reel area 2116 and/or any other reel area in the extended reel 2112H. In this example, one or more of the expanded areas may remain active during the bonus game. In addition, the second chance functionality described in this disclosure may be utilized with the base game and/or the bonus game. Therefore, the secondary game may be a secondary bonus game in one embodiment. The examples shown in FIGS. 21A-21H may be utilized for: base game play; base game play with second chance mode game play; base game play with bonus game play; and/or base game play with second chance mode game play and bonus game play.

Figure 22A:
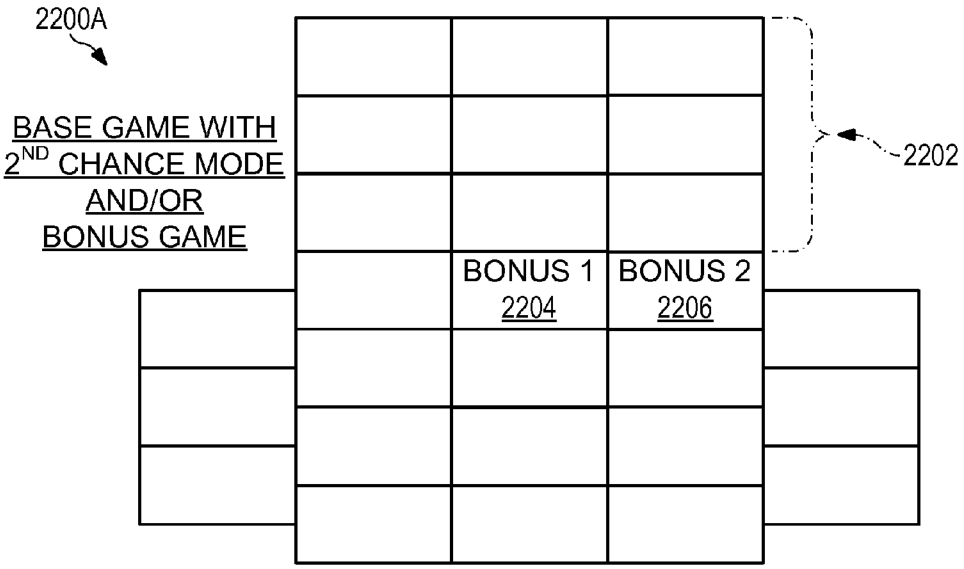
FIG. 22A is another illustration of a base game, a second chance base game, and/or a bonus game structure on a gaming device, according to one embodiment.

In FIG. 22A, another illustration of second chance base game play on a gaming device is shown, according to one embodiment. A first secondary base game image 2200A (e.g., second chance base game play mode) may include a first bonus symbol 2204 being located next to (e.g., within one unit of) a second bonus game symbol 2206 during the completion of a base game play. Based on the first bonus symbol 2204 being located next to (e.g., within one unit of) second bonus game symbol 2206, a maximum extended reel area 2202 may be utilized for one or more secondary base game play (e.g., one or more second chance spins).

Figure 22B:
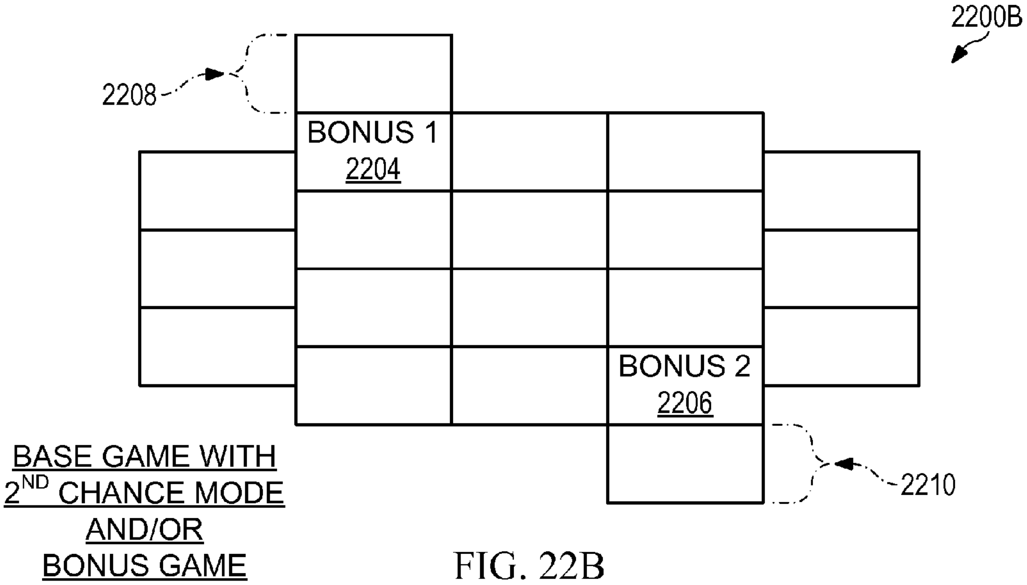
FIG. 22B is another illustration of a base game, a second chance base game, and/or a bonus game structure on a gaming device, according to one embodiment.

In another example shown in FIG. 22B, a second secondary base game image 2200B (e.g., second chance base game play mode) may include first bonus symbol 2204 being located at a maximum distance from (e.g., within four unit of) second bonus game symbol 2206 during the completion of a base game play. Based on the first bonus symbol 2204 being located at a maximum distance from second bonus game symbol 2206, a minimum extended reel area (either reference number 2208 and/or reference number 2210) may be utilized for one or more secondary base game play (e.g., one or more second chance spins).

Figure 22C:
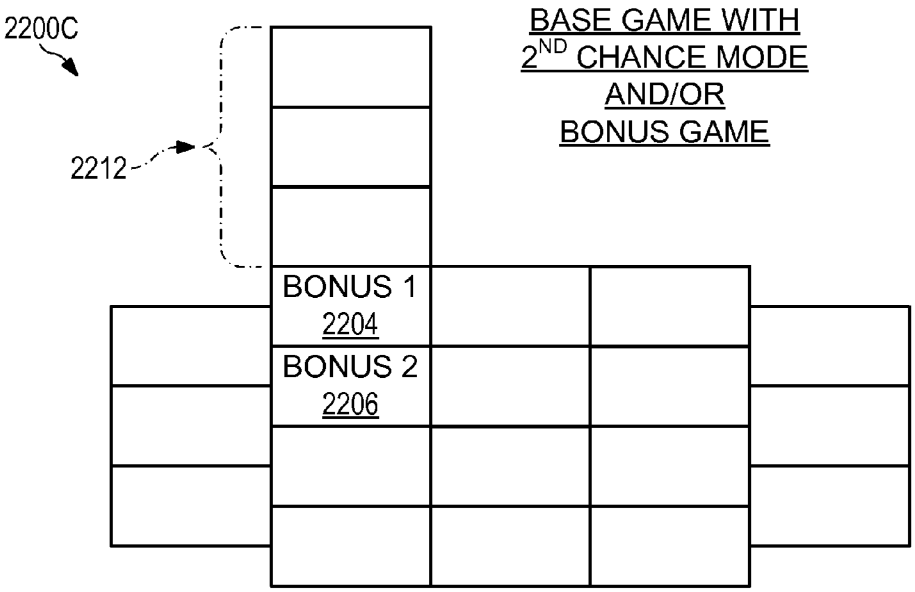
FIG. 22C is another illustration of a base game, a second chance base game, and/or a bonus game structure on a gaming device, according to one embodiment.

In another example, a third secondary base game image 2200C (e.g., second chance base game play mode) may include first bonus symbol 2204 being located next to (e.g., within one unit of) second bonus game symbol 2206 and on the same reel during the completion of a base game play (see FIG. 22C). Based on the first bonus symbol 2204 being located next to (e.g., within one unit of) second bonus game symbol 2206 and on the same reel, an extended reel area 2212 for the reel in which both the first bonus symbol 2204 and the second bonus symbol 2206 was located may be utilized for one or more secondary base game play (e.g., one or more second chance spins).

Figure 22D:
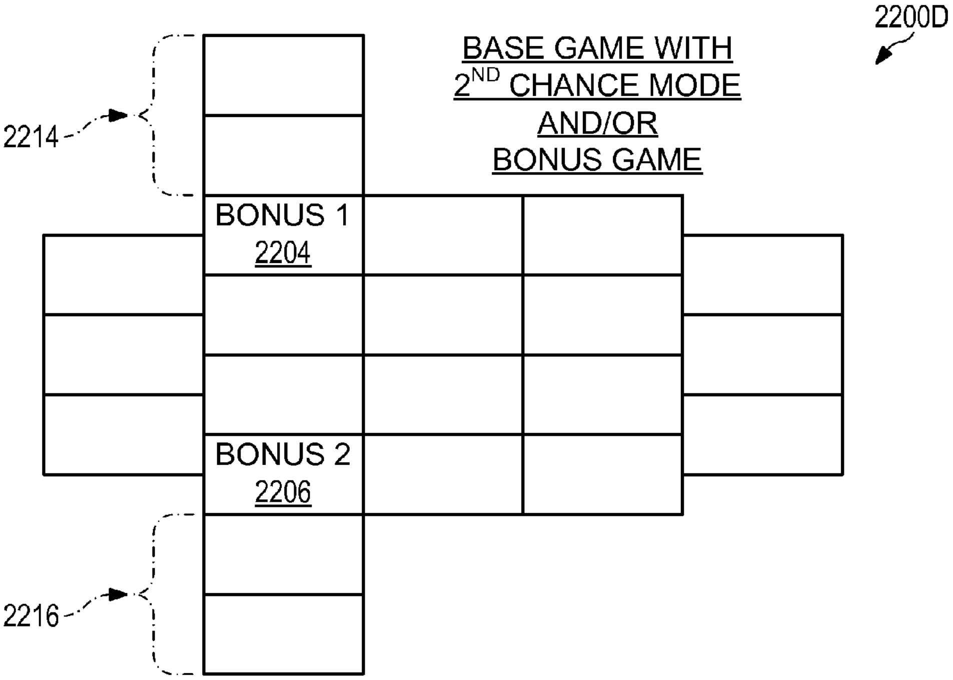
FIG. 22D is another illustration of a base game, a second chance base game, and/or a bonus game structure on a gaming device, according to one embodiment.

In FIG. 22D, another illustration of second chance base game play on a gaming device is shown, according to one embodiment. In this example, a fourth secondary base game image 2200D (e.g., second chance base game play mode) may include first bonus symbol 2204 being located within 3 units from second bonus game symbol 2206 and on the same reel during the completion of a base game play (see FIG. 22C). Based on the first bonus symbol 2204 being located within 3 units from second bonus game symbol 2206 and on the same reel, a first extended reel area 2214 and a second extended reel area 2216 for the reel in which both the first bonus symbol 2204 and the second bonus symbol 2206 was located may be utilized for one or more secondary base game play (e.g., one or more second chance spins).

Figure 22E:
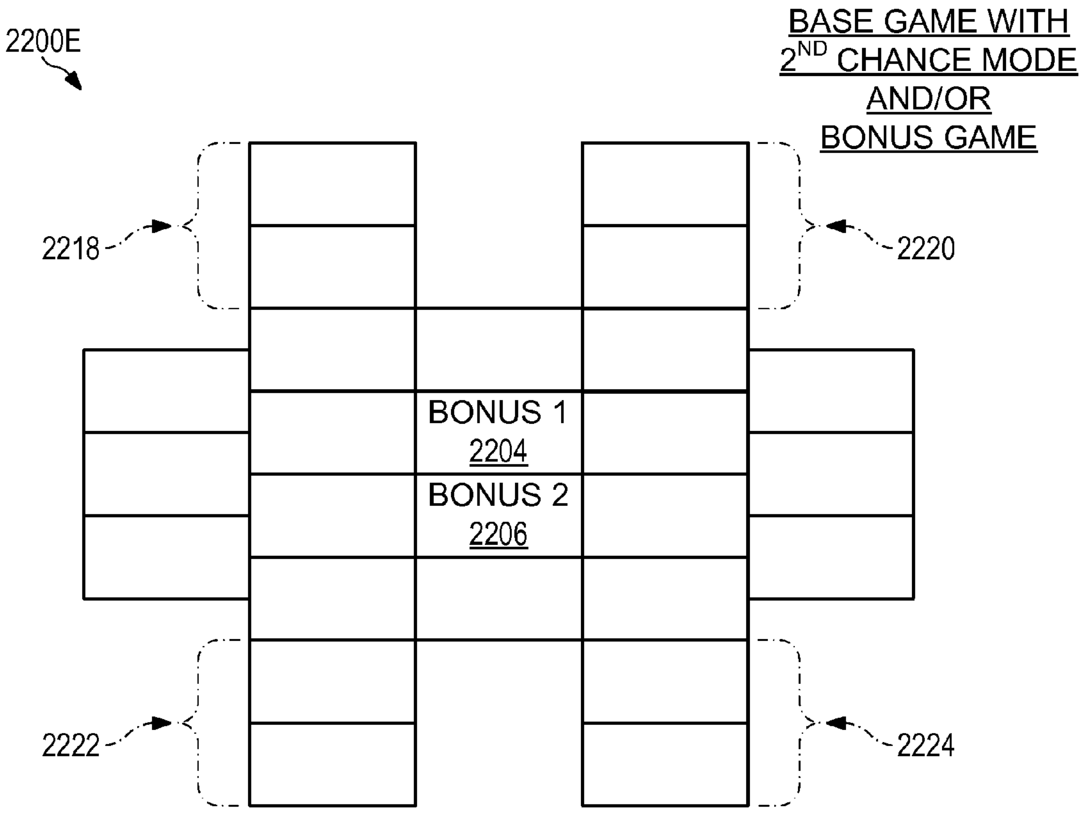
FIG. 22E is another illustration of a base game, a second chance base game, and/or a bonus game structure on a gaming device, according to one embodiment.

In FIG. 22E, another illustration of second chance base game play on a gaming device is shown, according to one embodiment. A fifth secondary base game image 2200E (e.g., second chance base game play mode) may include first bonus symbol 2204 being located next to (e.g., within one unit of) second bonus game symbol 2206 in a predetermined area (e.g., in this example, in the middle of the base reel utilized for the base game play) during the completion of a base game play. Based on the first bonus symbol 2204 being located next to (e.g., within one unit of) second bonus game symbol 2206 in the predetermined area, a predetermined formation for an extended reel area may be utilized for one or more secondary base game play (e.g., one or more second chance spins). In this example, the predetermined formation may include a first extended reel area 2218, a second extended reel area 2220, a third extended reel area 2222, and/or a fourth extended reel area 2224. The examples shown in FIGS. 22A-22E may be utilized for: base game play; base game play with second chance mode game play; base game play with bonus game play; and/or base game play with second chance mode game play and bonus game play.

In one example, the system, device, and/or method may award a bonus prize to the player in the case of a near miss by expanding the visible reel section. In another example, a certain symbol in a slot machine will award free spins if a certain number of that symbol appears in the visible reel space. A common occurrence may be that the player is short one or more of these symbols necessary to trigger the special event. In that circumstance, one or more reels in play may expand a random number of symbols vertically, revealing more symbols to the player and giving the player a better chance to win the special bonus prize. In addition to enhancing the probability that the player may win the bonus prize, there may also be incidental wins (e.g., payline wins) from revealing more symbols, which yields heightened anticipation for the player.

In another example, a game is played on an interface with 3 symbols displayed to the player vertically on the first and last reel, and 4 symbols displayed to the player vertically on the middle 3 reels. During a player paid-for spin, if there are 3 bonus symbols on the middle 3 reels, the player is awarded 8 free spins. In this example, whenever 2 of the 3 necessary bonus symbols are visible on the reel interface, these middle 3 reels expand between 1 or 4 vertical positions (and/or any other number), showing more symbols to the player and increasing the likelihood that the player will enter the free games. If the third bonus symbol appears, the player is awarded 8 free spins, in addition to any incidental wins that appear as a result of the expanded reels. In this example, additional opportunities are generated for free by the expansion of the vertical reels.

In various embodiments, any conceivable symbol-driven prize can have a "second chance" enhanced reel state, including progressives in a WAP or LAP or an MLP, special pick bonuses driven by a symbol, etc. In these embodiments, the enhanced reel state may be triggered in cases where the player is more than one symbol short of the goal. The reels may expand one tier when the player lands only 1 bonus symbol and a second tier when the player lands 2 bonus symbols, causing a cascade effect of the player accumulating more and more bonus symbols. Further in one example, instead of the reel space expanding randomly, any number of ways can be used to determine how many extra visible symbols the player is given, including: current wager; landing position of the existing triggering symbols; a progressive-like meter that increments the number of vertical symbols to expand as more games pass since the last expansion; subsymbol indicators on the symbol itself; any and all combinations noted above. Further, the reels may expand in synchronicity or independently, and may expand vertically in either the up direction or down directions. In addition, the revealed reel space or reel(s) still spinning may also be taken from a different set of reels and outcomes to either increase the probability of landing a valuable symbol or decreasing to control the overall contribution. In addition, the expansion areas from base game into the secondary base game play may be kept for the bonus game (and/or into free spin mode).

Figure 23:
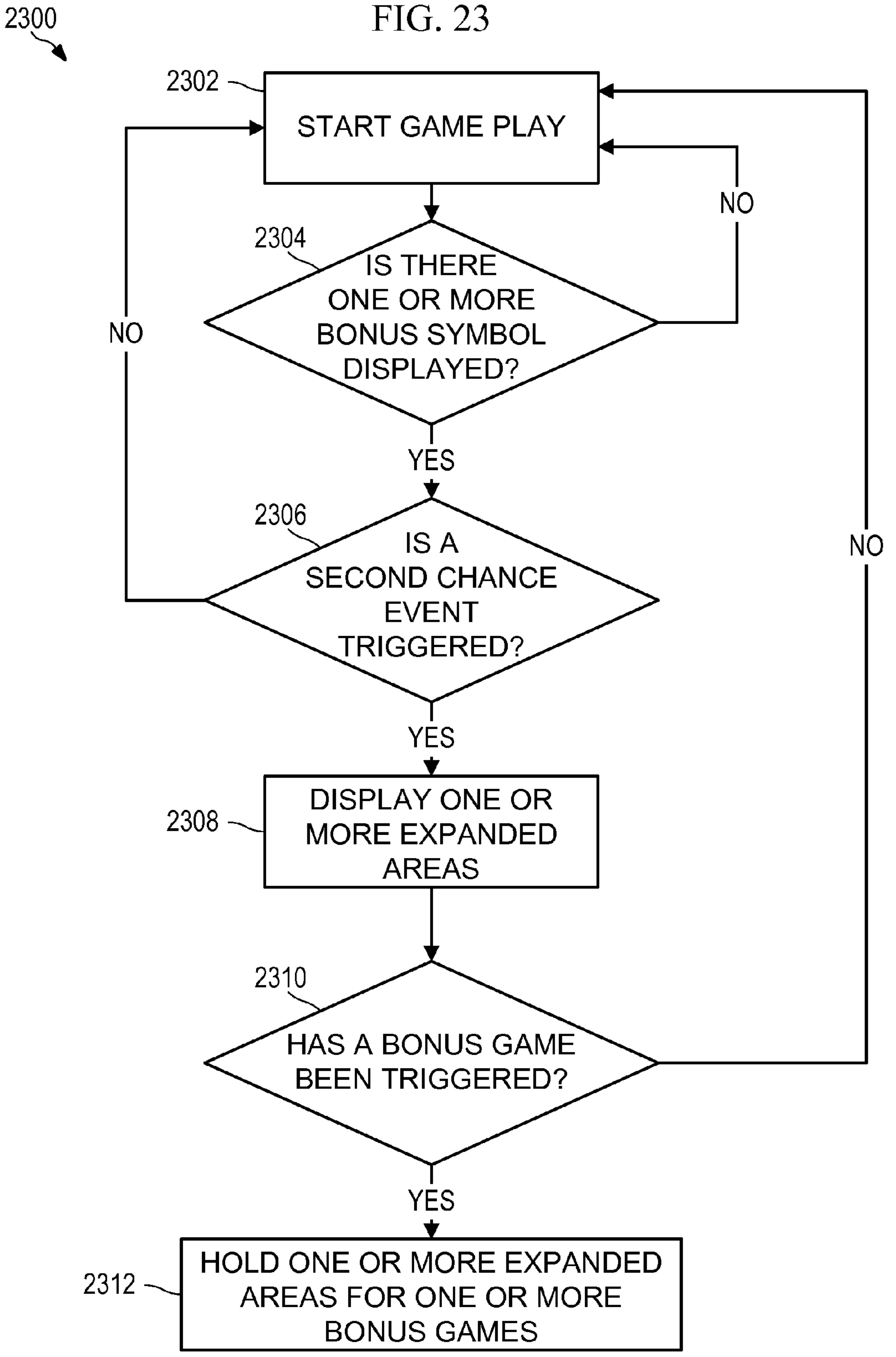
FIG. 23 is a game play flow diagram, according to one embodiment.

In FIG. 23, a game play flow diagram is shown, according to one embodiment. The method may include starting game play (step 2302). The method may include one or more processors determining whether there is one or more bonus symbols displayed (step 2304). If there are not one or more bonus symbols displayed, then the method may move back to step 2302. If there is one or more bonus symbols displayed, then the method may include one or more processors determining whether there is a second chance event triggered (step 2306). If there is not a second chance triggered event, then the method may move back to step 2302). If there is a second chance triggered event, then the method may display one or more expanded areas (step 2308). The method may include one or more processors determined whether a bonus game has been triggered (step 2310). If no bonus game has been triggered, then the method may move back to step 2302. If the bonus game has been triggered, then the method may hold one or more expanded areas for one or more bonus games (step 2312).

Figure 24:
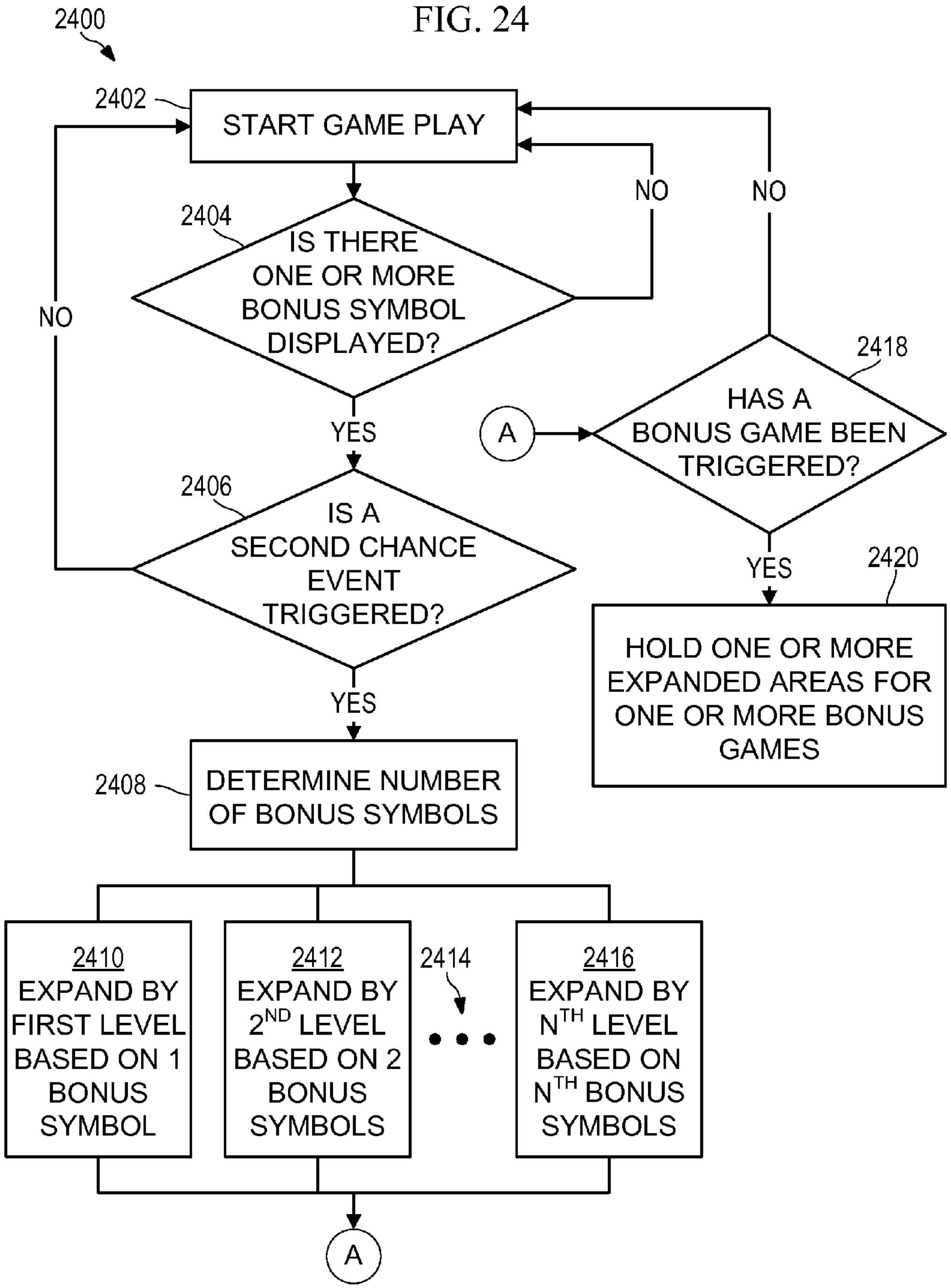
FIG. 24 is a game play flow diagram, according to one embodiment.

In FIG. 24, a game play flow diagram is shown, according to one embodiment. The method may include starting game play (step 2402). The method may include one or more processors determining whether there is one or more bonus symbols displayed (step 2404). If no bonus symbols are displayed, then the method may move back to step 2402. If there is at least one bonus symbol displayed, then the method may include one or more processors determining whether a second chance event has triggered (step 2406). If no second chance event has been triggered, then the method may move back to step 2402. If a second chance event has been triggered, then the method may include determining the number of bonus symbols displayed (step 2408). The method may include: expanding by a first level based on 1 bonus symbol being displayed (step 2410); expanding by a second level based on 2 bonus symbols being displayed (step 2412); and/or expanding by an Nth level based on an Nth bonus symbols being displayed (step 2416). The method may include one or more processors determined whether a bonus game has been triggered (step 2418). If no bonus game has been triggered, then the method may move back to step 2402. If a bonus game has been triggered, then the method may include holding one or more expanded areas for one or more bonus games (step 2420).

Figure 25:
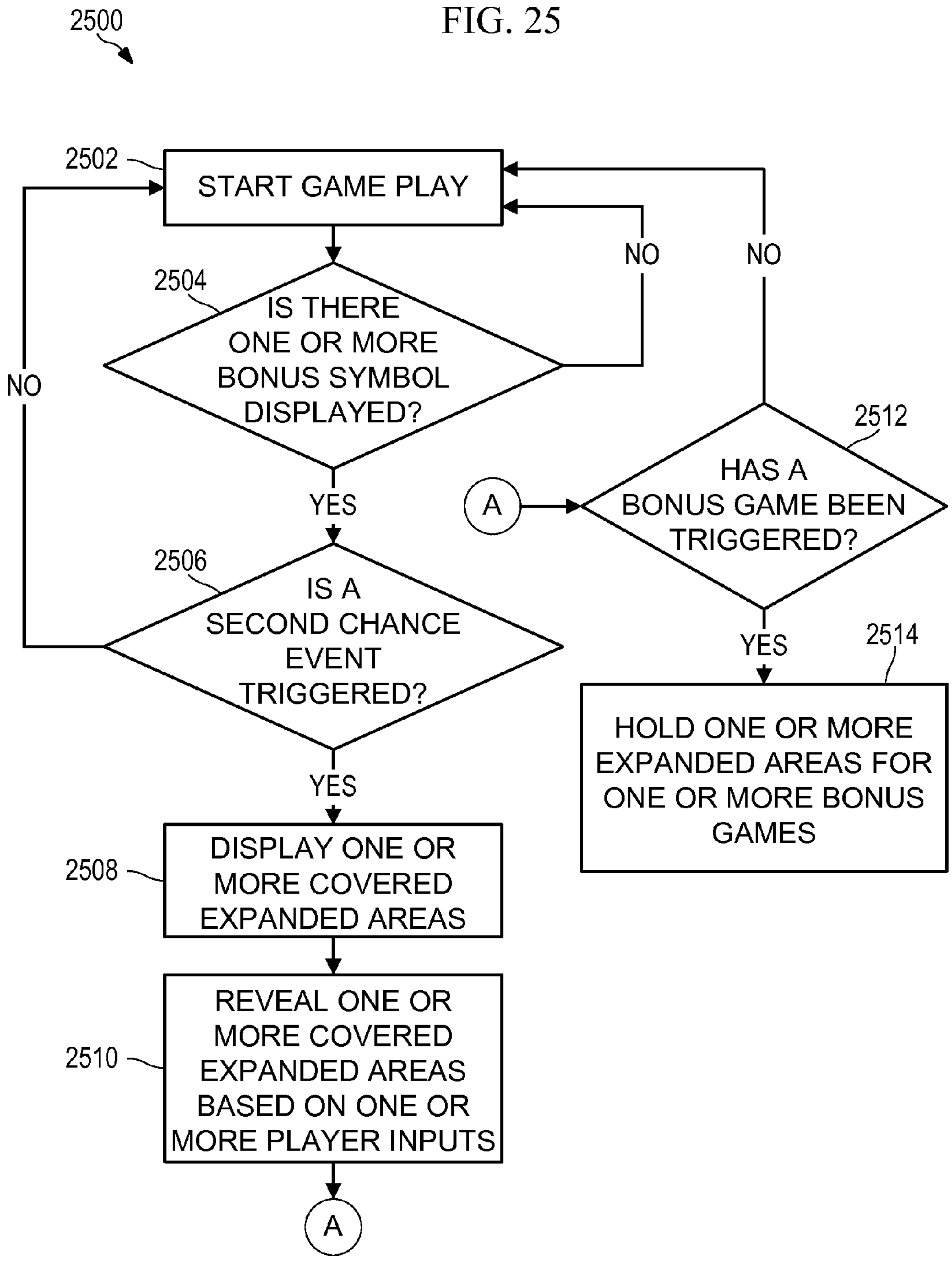
FIG. 25 is a flow diagram for game play, according to one embodiment.

In FIG. 25, a flow diagram for game play is shown, according to one embodiment. The method may include starting game play (step 2502). The method may include one or more processors determining whether there is one or more bonus symbols displayed (step 2504). If no bonus symbols are displayed, then the method may move back to step 2502. If there is at least one bonus symbol displayed, then the method may include one or more processors determining whether a second chance event has triggered (step 2506). If no second chance event has been triggered, then the method may move back to step 2502. If a second chance event has been triggered, then the method may include displaying one or more covered expanded areas (step 2508). The method may include revealing one or more covered expanded areas based on one or more player inputs (step 2510). The method may include one or more processors determined whether a bonus game has been triggered (step 2512). If no bonus game has been triggered, then the method may move back to step 2502. If a bonus game has been triggered, then the method may include holding one or more expanded areas for one or more bonus games (step 2514).

Figure 26:
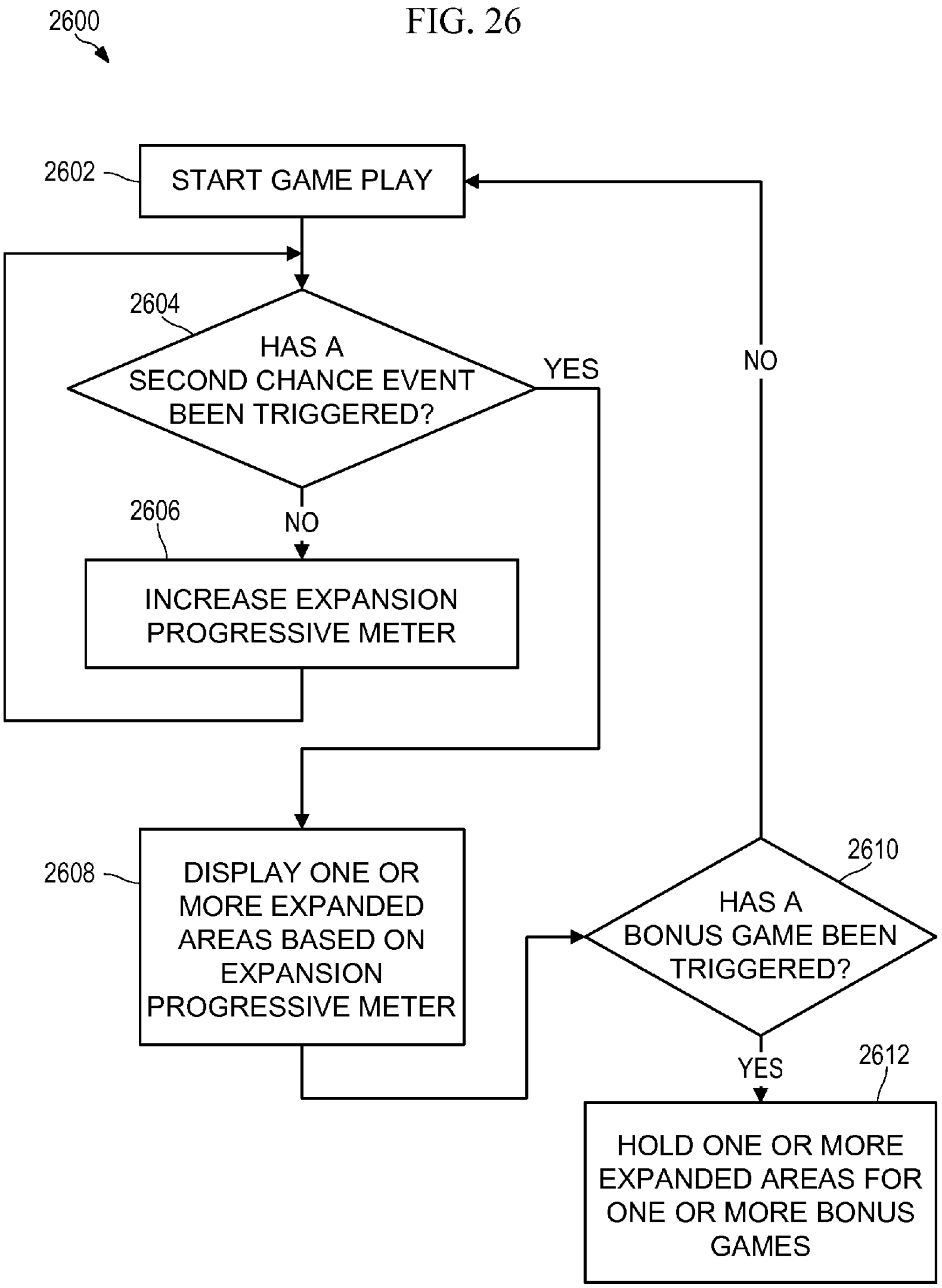
FIG. 26 is a flow diagram for game play, according to one embodiment.

In FIG. 26, a flow diagram for game play is shown, according to one embodiment. The method may include starting game play (step 2602). The method may include one or more processors determining whether a second chance even has been triggered (step 2604). If no second chance has been triggered, then the method may include increasing an expansion meter (step 2606) and moving back to step 2602). If the second chance has been triggered, then the method may include displaying one or more expanded areas based on the expansion meter (step 2608). The method may include one or more processors determined whether a bonus game has been triggered (step 1610). If no bonus game has been triggered, then the method may move back to step 2602. If a bonus game has been triggered, then the method may include holding one or more expanded areas for one or more bonus games (step 2612).

Figure 27:
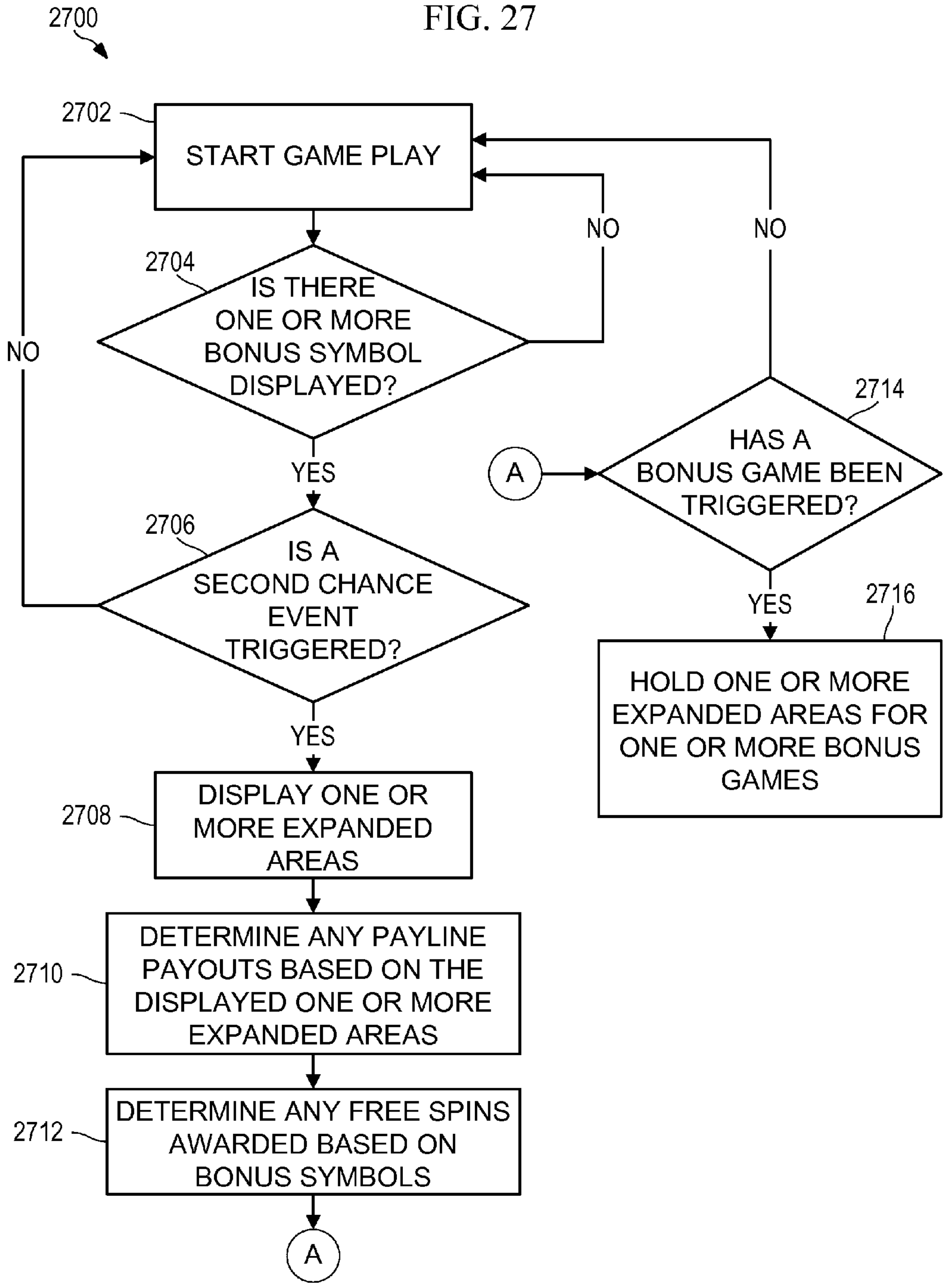
FIG. 27 is a flow diagram for game play, according to one embodiment.

In FIG. 27, a flow diagram for game play is shown, according to one embodiment. The method may include starting game play (step 2702). The method may include one or more processors determining whether there is one or more bonus symbols displayed (step 2704). If no bonus symbols are displayed, then the method may move back to step 2702. If there is at least one bonus symbol displayed, then the method may include one or more processors determining whether a second chance event has triggered (step 2706). If no second chance event has been triggered, then the method may move back to step 2702. If a second chance event has been triggered, then the method may include displaying one or more expanded areas (step 2708). The method may include determining any payline payouts based on the displayed one or more expanded areas along with the base display area (step 2710). The method may include one or more processors determined any free spins awarded based on the bonus symbols (step 2712). The method may include one or more processors determined whether a bonus game has been triggered (step 2714). If no bonus game has been triggered, then the method may move back to step 2702. If a bonus game has been triggered, then the method may include holding one or more expanded areas for one or more bonus games (step 2716).

In one embodiment, the electronic gaming device may include a memory, a processor, a plurality of reels, and a display. The display may include active areas and inactive areas where the active areas may be utilized for payout determinations and bonus game initiation determinations and where the inactive areas may not be utilized for the payout determinations and the bonus game initiation determinations. The processor may initiate a base game, a bonus game, and a secondary base game. The base game may include a spin where the spin moves the plurality of reels and stops a movement of the plurality of reels to display at least a portion of the plurality of reels in the active areas. The processor may initiate a bonus game based on a predetermined number of a predetermined symbol being located in the active areas after the spin. The processor may initiate a secondary base game based on a number of the predetermined symbol being less than the predetermined number and a secondary base game triggering event where the secondary base game converts a first inactive area of the inactive areas to a first secondary base game active area where the first secondary base game active area is utilized for the bonus game initiation determinations.

In another example, the processor may initiate the bonus game based on the predetermined number of the predetermined symbol being located in the active areas and the first secondary base game active area. The processor may determine one or more payouts based on one or more symbols located in the active areas. The processor may determine one or more payouts based on one or more symbols located in the active areas and the first secondary base game active area. In another example, the plurality of reels may include a first reel, a second reel, a third reel, a fourth reel, and a fifth reel. The display may include three active areas for the first reel, four active areas for the second reel, four active areas for the third reel, four active areas for the fourth reel, and three active areas for the fifth reel during the base game (and/or any other configuration shown in this disclosure). In another example, the processor may initiate the bonus game based on the predetermined number of the predetermined symbol being located in a grouped area which includes the four active areas of the second reel, the four active areas of the third reel, and the four active areas of the fourth reel after the spin. Further, the secondary base game triggering event may be based on one or more symbols in the active areas. In addition, a number of secondary base game active areas may be based on one or more symbols in the active areas. Further, a number of secondary base game active areas and/or one or more locations for the secondary base game active areas may be based on an interaction between a first symbol with a second symbol. In addition, the interaction may be based on a distance from the first symbol to the second symbol. Further, the interaction may be based on a presentation path from the first symbol to the second symbol. In addition, the secondary base game may include a first secondary base game, a second secondary base game, a third secondary base game, and/or an Nth secondary base game. Further, a first set of plurality of reels may be utilized for the base game and a second set of plurality of reels may be utilized for the secondary base game. In addition, the first set of plurality of reels and the second set of plurality of reels may have different symbol configurations. Further, the second set of plurality of reels includes a first number of the predetermined symbol which is greater than a second number of the predetermined symbol utilized with the first set of plurality of reels. In addition, the plurality of reels may be digital reels.

In another embodiment, the method of providing gaming options via an electronic gaming device may include: determining via one or more processors one or more wagers relating to one or more game plays; initiating a base game, the base game including a spin where the spin moves a plurality of reels and stops a movement of the plurality of reels to display at least a portion of the plurality of reels in active areas of a display, the display including the active areas and inactive areas where the active areas are utilized for payout determinations and bonus game initiation determinations and where the inactive areas are not utilized for the payout determinations and the bonus game initiation determinations; initiating a bonus game based on a predetermined number of a predetermined symbol being located in the active areas after the spin; initiating a secondary base game based on a number of the predetermined symbol being less that the predetermined number and a secondary base game triggering event; and/or converting a first inactive area of the inactive areas to a first secondary base game active area where the first secondary base game active area is utilized for the bonus game initiation determinations.

In addition, the method may further include: initiating the bonus game based on the predetermined number of the predetermined symbol being located in the active areas and the first secondary base game active area; determining one or more payouts based on one or more symbols located in the active areas and the first secondary base game active area; and/or determining one or more payouts based on one or more symbols located in the active areas.

In one embodiment, the electronic gaming system may include a server memory, a server processor, and one or more gaming devices with a plurality of reels and a display. The display may include active areas and inactive areas where the active areas may be utilized for payout determinations and bonus game initiation determinations and where the inactive areas may not be utilized for the payout determinations and the bonus game initiation determinations. The server processor may initiate a base game, a bonus game, and a secondary base game. The base game may include a spin where the spin moves the plurality of reels and stops a movement of the plurality of reels to display at least a portion of the plurality of reels in the active areas. The server processor may initiate a bonus game based on a predetermined number of a predetermined symbol being located in the active areas after the spin. The server processor may initiate a secondary base game based on a number of the predetermined symbol being less than the predetermined number and a secondary base game triggering event where the secondary base game converts a first inactive area of the inactive areas to a first secondary base game active area where the first secondary base game active area is utilized for the bonus game initiation determinations.

In another example, the server processor may initiate the bonus game based on the predetermined number of the predetermined symbol being located in the active areas and the first secondary base game active area. The server processor may determine one or more payouts based on one or more symbols located in the active areas. The server processor may determine one or more payouts based on one or more symbols located in the active areas and the first secondary base game active area. In another example, the plurality of reels may include a first reel, a second reel, a third reel, a fourth reel, and a fifth reel. The display may include three active areas for the first reel, four active areas for the second reel, four active areas for the third reel, four active areas for the fourth reel, and three active areas for the fifth reel during the base game (and/or any other configuration shown in this disclosure). In another example, the server processor may initiate the bonus game based on the predetermined number of the predetermined symbol being located in a grouped area which includes the four active areas of the second reel, the four active areas of the third reel, and the four active areas of the fourth reel after the spin. Further, the secondary base game triggering event may be based on one or more symbols in the active areas. In addition, a number of secondary base game active areas may be based on one or more symbols in the active areas. Further, a number of secondary base game active areas and/or one or more locations for the secondary base game active areas may be based on an interaction between a first symbol with a second symbol. In addition, the interaction may be based on a distance from the first symbol to the second symbol. Further, the interaction may be based on a presentation path from the first symbol to the second symbol. In addition, the secondary base game may include a first secondary base game, a second secondary base game, a third secondary base game, and/or an Nth secondary base game. Further, a first set of plurality of reels may be utilized for the base game and a second set of plurality of reels may be utilized for the secondary base game. In addition, the first set of plurality of reels and the second set of plurality of reels may have different symbol configurations. Further, the second set of plurality of reels includes a first number of the predetermined symbol which is greater than a second number of the predetermined symbol utilized with the first set of plurality of reels. In addition, the plurality of reels may be digital reels.

In one embodiment, the electronic gaming device may include a memory, a display, a plurality of reels including active areas and inactive areas where the active areas are utilized for payout determinations and bonus game initiation determinations and where the inactive areas are not utilized for the payout determinations and the bonus game initiation determinations, and a processor which may initiate a base game. The base game including a spin where the spin moves the plurality of reels and stops a movement of the plurality of reels to display at least a portion of the plurality of reels on the display where a display area includes a base reel area and an expanded reel area. The may initiate a bonus game utilizing the base reel area and the expanded reel area.

In addition, the processor may initiate the bonus game based on a predetermined number of a predetermined symbol being located in the base reel area and the expanded reel area. Further, the processor may determine one or more payouts based on one or more symbols located in the base reel area and the expanded reel area. In addition, the plurality of reels may include a first reel, a second reel, a third reel, a fourth reel, and a fifth reel. The display may include three active areas for the first reel, four active areas for the second reel, four active areas for the third reel, four active areas for the fourth reel, and three active areas for the fifth reel during the base game. Further, the processor may initiate the bonus game based on the predetermined number of the predetermined symbol being located in a grouped area which includes the four active areas of the second reel, the four active areas of the third reel, and the four active areas of the fourth reel after the spin. In addition, a secondary base game triggering event may be based on one or more symbols in the base reel area and the expanded reel area. Further, a number of secondary base game active areas may be based on one or more symbols in the base reel area and the expanded reel area. In addition, at least one of a number of secondary base game active areas and one or more locations for the secondary base game active areas may be based on an interaction between a first symbol with a second symbol. Further, the expanded reel area may be based on a distance from the first symbol to the second symbol. In addition, the expanded reel area may be based on a presentation path from the first symbol to the second symbol. In addition, the bonus base game may include a first bonus base game and a second bonus base game. Further, a first set of plurality of reels may be utilized for the base game and a second set of plurality of reels may be utilized for the bonus base game. In addition, the first set of plurality of reels and the second set of plurality of reels have different symbol configurations. In addition, the second set of plurality of reels may include a first number of the predetermined symbol which is greater than a second number of the predetermined symbol utilized with the first set of plurality of reels. Further, the plurality of reels may be digital reels, mechanical reels, and/or a combination thereof. In addition, a first set of plurality of reels may be utilized for the base game, a second set of plurality of reels may be utilized for the bonus base game, and a third set of plurality of reels may be utilized for a secondary base game.

In another embodiment, a method of providing gaming options via an electronic gaming device may include: determining via one or more processors one or more wagers relating to one or more game plays; initiating a base game, the base game including a spin where the spin moves a plurality of reels and stops a movement of the plurality of reels to display at least a portion of the plurality of reels in active base reel areas and active expanded reel areas of a display where the active areas are utilized for payout determinations and bonus game initiation determinations and where the inactive areas are not utilized for the payout determinations and the bonus game initiation determinations; and/or initiating a bonus game utilizing the active base reel areas and the active expanded reel areas based on a predetermined number of a predetermined symbol being located in the active areas after the spin.

In addition, a first set of plurality of reels may be utilized for the base game and a second set of plurality of reels may be utilized for the bonus base game. Further, the first set of plurality of reels and the second set of plurality of reels have different symbol configurations. In addition, the second set of plurality of reels may include a first number of the predetermined symbol which is greater than a second number of the predetermined symbol utilized with the first set of plurality of reels.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples. While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed. Further, one or more gaming options may be Internet based gaming options. Therefore, all of the examples and/or embodiments may be utilized via an Internet based gaming system.

The invention claimed is:

1. An electronic gaming device comprising:

a memory;

at least one wager accepting device configured to accept a physical item associated with a monetary value to increase a credit balance at the electronic gaming device;

a display;

a plurality of reels that are at least partially viewable on the display; and a processor configured to execute machine readable instruction stored on the memory to cause the electronic gaming device to initiate a base game comprising the display of active symbol locations and inactive symbol locations, the base game including a spin where the spin moves the plurality of reels and stops a movement of the plurality of reels to display symbols in at least one of the active symbol locations, after the spin, evaluate whether a second chance event has been triggered, wherein said inactive symbol locations are not utilized to determine if the second chance event has been triggered or for any base game payout determination, when the second chance event has been triggered, convert at least a first of said inactive symbol locations to a second chance event active symbol location and evaluate symbols displayed in said active symbol locations and each second chance event active symbol location for whether a bonus event has been triggered, when the bonus event has been triggered, initiate at least one bonus game comprising the display of the active symbol locations and the converted second chance event active symbol locations, the bonus event including a bonus spin where the bonus spin moves the plurality of reels and stops a movement of the plurality of reels to display symbols in at least one of the active symbol locations and the second chance event active symbol locations, and award a payout for a base game winning outcome and a bonus event winning outcome by increasing said credit balance.

2. The electronic gaming device of claim 1, wherein said first inactive symbol location comprises an expansion of active symbol locations of at least one of said plurality of reels.

3. The electronic gaming device of claim 1, wherein the second chance event is triggered by achieving a first predetermined number of bonus symbols displayed in the active symbol locations.

4. The electronic gaming device of claim 3, wherein said bonus event is triggered by achieving a second predetermined number of bonus symbols displayed in said active symbol locations and each second chance event active symbol location.

5. The electronic gaming device of claim 1 wherein said processor is configured to evaluate said symbols displayed in said at least one active symbol location for said base game payout determination and award a base game payout for a winning base game payout determination by increasing the credit balance.

6. The electronic gaming device of claim 1 wherein said active symbol locations and said inactive symbol locations comprise displayed reel symbol positions.

7. The electronic gaming device of claim 1 wherein said spin results in symbols being displayed in said inactive symbol locations.

8. The electronic gaming device of claim 1 wherein symbols are not visible to said player in said inactive symbols locations as a result of said spin and wherein symbols are made visible in said second chance event active symbol locations.

9. The electronic gaming device of claim 1 wherein said display comprises an electronic video display and said plurality of reels comprise graphically represented reels displayed by said video display.

10. A method of providing gaming options via an electronic gaming device comprising:

accepting, via at least one wager accepting device configured to accept a physical item associated with a monetary value and increasing a credit balance associated with said electronic gaming device;

determining via one or more processors one or more wagers placed from said credit balance relating to one or more game plays;

initiating a base game, the base game comprising the displaying of active symbol locations and inactive symbol locations and comprising a spin where the spin moves a plurality of reels and stops a movement of the plurality of reels to display symbols in at least one of the active symbol locations, after the spin, evaluating whether a second chance event has been triggered, wherein said inactive symbol locations are not utilized to determine if the second chance event has been triggered or for any base game payout determination;

when the second chance event has been triggered, converting at least a first of said inactive symbol locations to a second chance event active symbol location and evaluating symbols displayed in said active symbol locations and each second chance event active symbol location for a whether a bonus event has been triggered;

when the bonus event has been triggered, initiating at least one bonus game comprising the display of the active symbol locations and the converted second chance event active symbol locations, the bonus event including a bonus spin where the bonus spin moves the plurality of reels and stops a movement of the plurality of reels to display symbols in at least one of the active symbol locations and the second chance event active symbol locations; and awarding a payout for a base gaming winning outcome and a bonus event winning outcome by increasing said credit balance.

11. The electronic gaming device of claim 1 wherein said plurality of reels comprise physical spinning reels.

12. The method of claim 10 wherein the displaying said active symbol locations and said inactive symbol locations comprises displaying positions for symbols.

13. The method of claim 10 wherein said step of converting at least one inactive symbol location into a second chance event active symbol location further comprises displaying at least one symbol in said second chance event active symbol location.

14. The method of claim 10 the second chance event is triggered by achieving a first predetermined number of bonus symbols displayed in the active symbol locations.

15. The method of claim 10 further comprising the step of awarding base game winnings by evaluating only the symbols displayed in said active symbol areas.

16. The method of claim 14 wherein wherein said bonus event is triggered by achieving a second predetermined number of bonus symbols displayed in said active symbol locations and each second chance event active symbol location.

* * * * *